United States Patent
Kaneda et al.

(10) Patent No.: US 6,674,066 B1
(45) Date of Patent: Jan. 6, 2004

(54) ENCODER

(75) Inventors: Yasushi Kaneda, Urawa (JP); Hidejiro Kadowaki, Yokohama (JP); Ko Ishizuka, Omiya (JP); Shigeki Kato, Utsunomiya (JP); Takayuki Kadoshima, Utsunomiya (JP); Sakae Horyu, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/550,165

(22) Filed: Apr. 14, 2000

(30) Foreign Application Priority Data

Apr. 16, 1999 (JP) .......................... 11-109463
Apr. 16, 1999 (JP) .......................... 11-110067

(51) Int. Cl.[7] ................................ G01D 5/34
(52) U.S. Cl. .................. 250/231.13; 250/237 G
(58) Field of Search .................. 250/231.13, 231.16, 250/231.14, 231.17, 231.18, 237 G

(56) References Cited

U.S. PATENT DOCUMENTS

| | | | |
|---|---|---|---|
| 4,097,734 A | | 6/1978 | Erickson ................ 250/231.17 |
| 5,017,777 A | * | 5/1991 | Ishizuka et al. ....... 250/231.16 |
| 5,026,985 A | * | 6/1991 | Ishizuka et al. ....... 250/231.16 |
| 5,036,192 A | * | 7/1991 | Ishizuka et al. ....... 250/231.16 |
| 5,283,434 A | | 2/1994 | Ishizuka et al. ....... 250/231.16 |
| 5,390,022 A | | 2/1995 | Ishizuka et al. ......... 250/237 G |
| 5,448,358 A | | 9/1995 | Ishizuka et al. ............. 356/399 |
| 5,481,106 A | | 1/1996 | Nyui et al. ............ 250/231.16 |
| 5,483,332 A | | 1/1996 | Takamiya et al. .......... 356/28.5 |
| 5,483,377 A | | 1/1996 | Kaneda et al. ........... 250/237 G |
| 5,498,870 A | | 3/1996 | Ishizuka ................ 250/231.16 |
| 5,502,466 A | | 3/1996 | Kato et al. ................. 356/28.5 |
| 5,557,396 A | | 9/1996 | Ishizuka et al. ............. 356/28.5 |
| 5,569,913 A | | 10/1996 | Ishizuka et al. ............. 250/205 |
| 5,621,527 A | | 4/1997 | Kaneda et al. ........... 250/237 G |
| 5,629,793 A | | 5/1997 | Takamiya et al. ........... 356/486 |
| 5,640,239 A | | 6/1997 | Takamiya et al. .......... 356/28.5 |
| 5,663,794 A | | 9/1997 | Ishizuka ................ 250/237 G |
| 5,666,196 A | | 9/1997 | Ishii et al. .............. 250/237 G |
| 5,680,211 A | | 10/1997 | Kaneda et al. ......... 250/231.17 |
| 5,737,070 A | | 4/1998 | Kato ......................... 356/28.5 |
| 5,737,116 A | | 4/1998 | Kadowaki et al. .......... 359/359 |
| 5,754,282 A | | 5/1998 | Kato et al. ................. 356/28.5 |

(List continued on next page.)

FOREIGN PATENT DOCUMENTS

| | | |
|---|---|---|
| EP | 0 303 008 | 2/1989 |
| EP | 0 361 867 | 4/1990 |
| EP | 0 381 658 | 8/1990 |
| EP | 0 453 971 | 10/1991 |
| EP | 0 896 206 | 2/1999 |
| GB | 2 288 015 | 10/1995 |
| JP | 01-147319 | 6/1989 |
| JP | 02-093324 | 4/1990 |
| JP | 03-115920 | 5/1991 |
| JP | 5-157583 | 6/1993 |
| JP | 07-294214 | 11/1995 |

*Primary Examiner*—David V. Bruce
*Assistant Examiner*—Courtney Thomas
(74) *Attorney, Agent, or Firm*—Fitzpatrick, Cella, Harper & Scinto

(57) ABSTRACT

An optical type encoder includes a light-emitting element, a scale, a light receiving element for detecting light from the scale when a light beam from the light-emitting element is projected onto the scale, an incremental signal resulting from displacement of the scale being obtained by detection by the light receiving element, two or more mark portions for producing an origin signal formed on the scale, and an origin detecting system for detecting the mark portions for producing the origin signal. The rising position or the falling position of at least one pulse signal indicative of the origin is determined by the detection signals of the two or more mark portions for producing the origin signal by the origin detecting system.

55 Claims, 39 Drawing Sheets

U.S. PATENT DOCUMENTS

| | | | |
|---|---|---|---|
| 5,774,218 A | 6/1998 | Takamiya et al. | 356/28 |
| 5,796,470 A | 8/1998 | Ueda et al. | 356/28.5 |
| 5,815,267 A | 9/1998 | Kato et al. | 356/28.5 |
| 5,880,839 A | 3/1999 | Ishizuka et al. | 250/237 G |
| 5,883,384 A * | 3/1999 | Kato et al. | 250/231.13 |
| 5,926,276 A | 7/1999 | Takamiya et al. | 356/28.5 |
| 5,956,140 A | 9/1999 | Ishizuka et al. | 250/237 G |
| 6,198,534 B1 * | 3/2001 | Hofer et al. | 250/237 G |

* cited by examiner

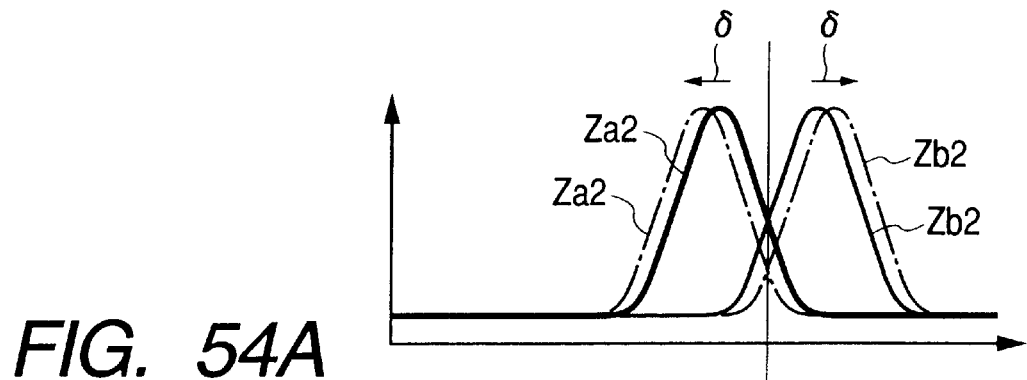
FIG. 54A
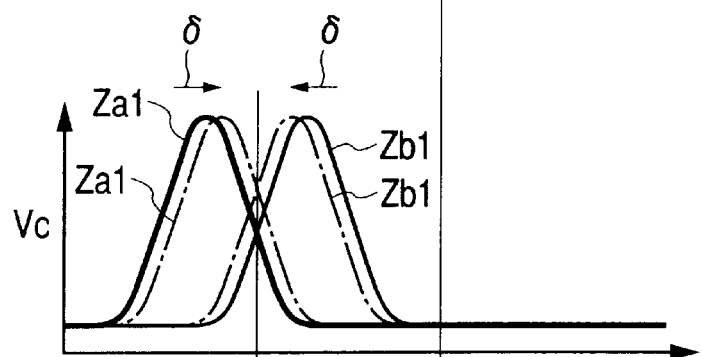
FIG. 54B
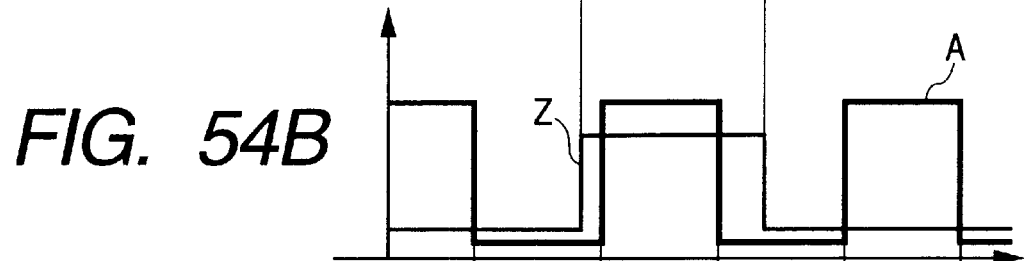
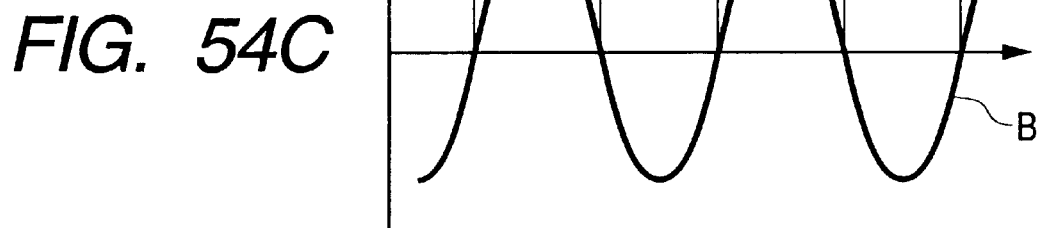
FIG. 54C

ENCODER

BACKGROUND OF THE INVENTION

1. Field of the Invention

This invention relates to an incremental encoder for use in a highly accurate length or angle measuring apparatus for industry such as FA, and particularly to an encoder for applying light to an object and utilizing information of the light obtained from the object.

2. Related Background Art

In a light pickup or an optical measuring apparatus in a highly accurate positioning apparatus for industry such as FA, there has heretofore been widely utilized an encoder for irradiating an object, receiving transmitted light through or reflected light from the object, and obtaining information of the object which transmits or reflects light. In the encoder, any positional deviation is converted into a pulse train, and this pulse number is counted to thereby detect the relative positional deviation, but the absolute position is found by generating an origin position signal, and resetting the counter to zero by the origin signal.

The above-described encoder is called an incremental encoder, and a linear encoder for detecting linear displacement and a rotary encoder for detecting rotational displacement are known. What are required of these optical measuring apparatuses today are items such as downsizing and higher accuracy.

In recent years, in the field of FA, in compliance with the requirement for higher accuracy, there has been adopted an encoder of the "grating interference type" which detects the generation of an incremental encoder signal by the utilization of the phase shift of the wave front of diffracted light by the relative movement of a diffraction grating. In the encoder of the "grating interference type", a grating of a minute pitch of the order of $\mu$m is utilized, and a value of sub $\mu$m is achieved as resolving power per pulse (period).

In the field of the above-described detecting apparatus utilizing light, and particularly the field of displacement detection, the accuracy of the measurement of the origin which is the reference position has come to be required as higher accuracy is advanced. In the origin detection of an incremental encoder of high resolving power, in order to secure the same degree of resolving power, there has been adopted a method of detecting the origin by applying to a minute slit pattern formed on a scale or a disc at the order of $\mu$m a minute condensed light beam of the same degree of size as the minute slit.

Referring to FIG. 1 of the accompanying drawings which shows the reference position measuring technique of an optical type rotary encoder disclosed in Japanese Patent Application Laid-Open No. 2-93324, a light beam emitted from a light-emitting element 1 passes through a collimator lens 2, and is reflected by a half mirror 3, and a light beam transmitted through the half mirror 3 is reflected by a mirror 4, and the two light beams are reflected by half mirrors 5a and 5b, respectively, are linearly condensed by cylindrical lenses 6a and 6b, and are incident on a disc 7. When the disc 7 is rotated and slits 8a and 8b formed on the disc 7 are irradiated by the light beams, the light beams reflected by the slits 8a and 8b are incident on light receiving elements 9a and 9b, and an origin signal is outputted.

Also, Japanese Patent Application Laid-Open No. 3-115920 discloses an encoder in which slits are disposed while being deviated from each other.

In the embodiment of the origin signal of an optical type linear encoder disclosed in Japanese Patent Application Laid-Open No. 7-294214, a light beam emitted from a light-emitting element is incident on the grating portion of a scale, whereupon it is reflected and diffracted, and the light beam is incident on a light receiving element. When the scale is moved and the end of a slit goes beyond a portion being irradiated by the light beam, the light beam is no longer incident on a sensor. By the above-described principle, an origin signal is outputted.

In the origin measuring sensor of the encoder according to the prior art, when the encoder itself is made considerably compact and higher in accuracy, for example, the adjustment for making a minute condensed light beam for detection coincident with a minute slit pattern in the detection of the origin signal is delicate, and high accuracy is required of the mutual position adjustment of the scale and the measuring sensor.

In some of highly accurate grating interference methods, in order to make detection accuracy good, a minute slit has been detected at different timings by two light receiving elements positionally deviated relative to each other, and an origin signal has been generated by the utilization of the two differential signals. In this case, when a method of generating a pulse waveform as the origin signal when the levels of the two signals coincide with each other is adopted, the origin is defined as "the edge portion of the rising (falling) of the pulse".

On the other hand, in an incremental encoder of low accuracy, usually the detection signal of a slit is utilized as an origin signal synchronized with the waveform of one of incremental signals of A and B phases.

Both in the highly accurate grating interference methods and in the incremental encoder of low accuracy, there is required the production of a signal providing the information of the origin position which is better in accuracy and stable and easy to decide upon the pulse width. Particularly when the incremental signal is minute as the signal providing the information of the origin, there is required a signal stably having a width equal to that of this incremental signal. Further, even when the output positions of the incremental signal and the origin information signal are deviated from each other as by a variation in the quantity of light of a light source portion, it is required that synchronism can be taken stably.

SUMMARY OF THE INVENTION

A first object of the present invention is to provide an encoder of a construction in which a signal of a pulse width equal to that of an incremental signal can be stably provided as a signal providing the information of the origin.

A second object of the present invention is to provide an encoder in which, in addition to the foregoing, synchronism between the incremental signal and the signal having the information of the origin can be stably taken irrespective of any fluctuation in the quantity of light or the like.

Another object of the present invention is to provide a rotary encoder in which a stable origin signal accurately synchronizable with a minute displacement signal irrespective of the vibration or eccentricity of a disc is produced and synchronized with a rotational displacement signal.

Further objects of the present invention will become apparent from the following description of the embodiments of the invention.

BRIEF DESCRIPTION OF THE DRAWINGS

FIGS. 54A, 54B and 54C are graphs of output signals by eccentricity.

DESCRIPTION OF THE PREFERRED EMBODIMENTS

Figure 2A:
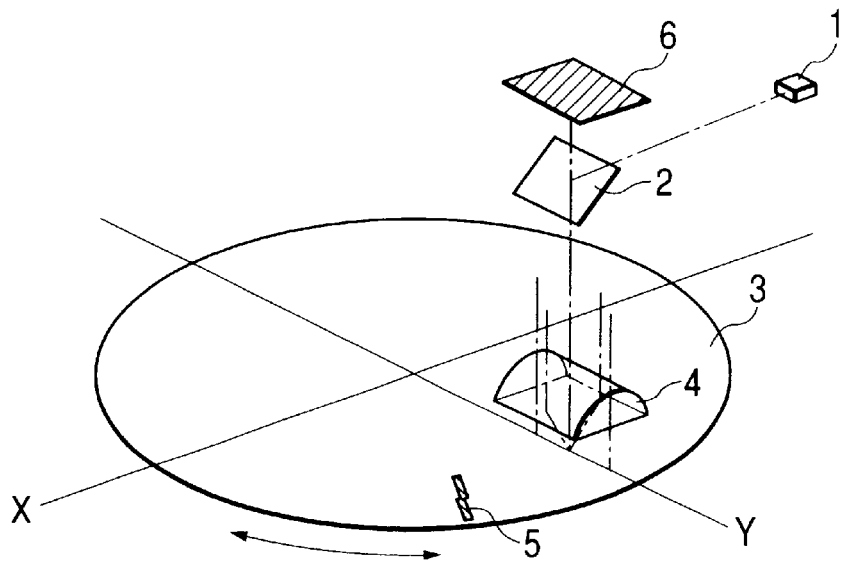
FIG. 2A shows the origin detecting system of a rotary encoder according to Embodiment 1.
Figure 2B:
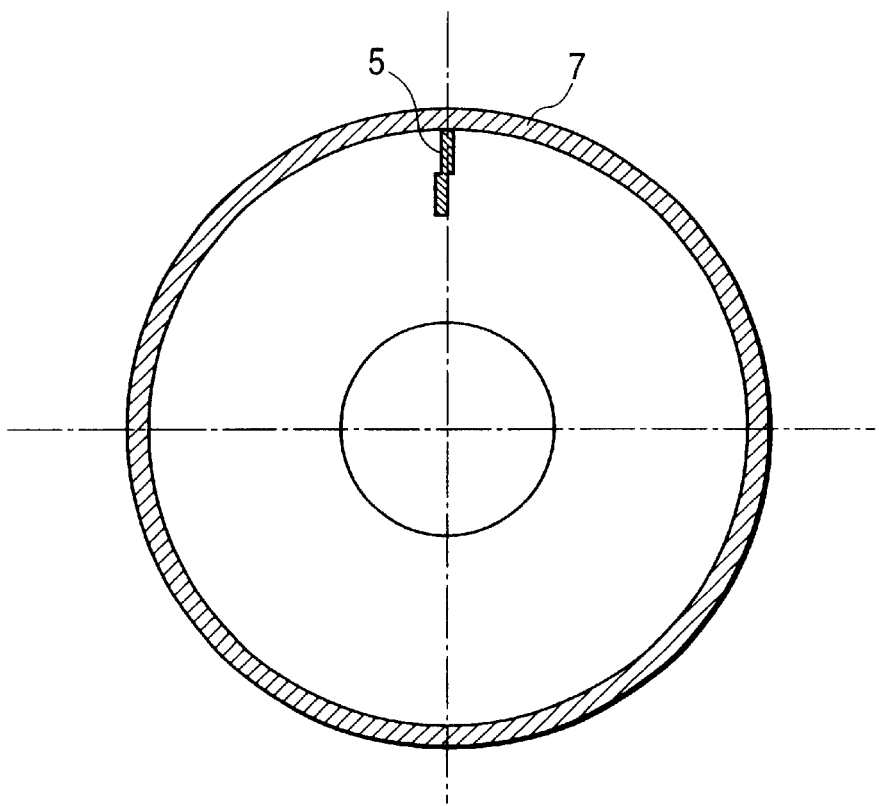
FIG. 2B shows the disc of the encoder used in Embodiment 1.
Figure 3:
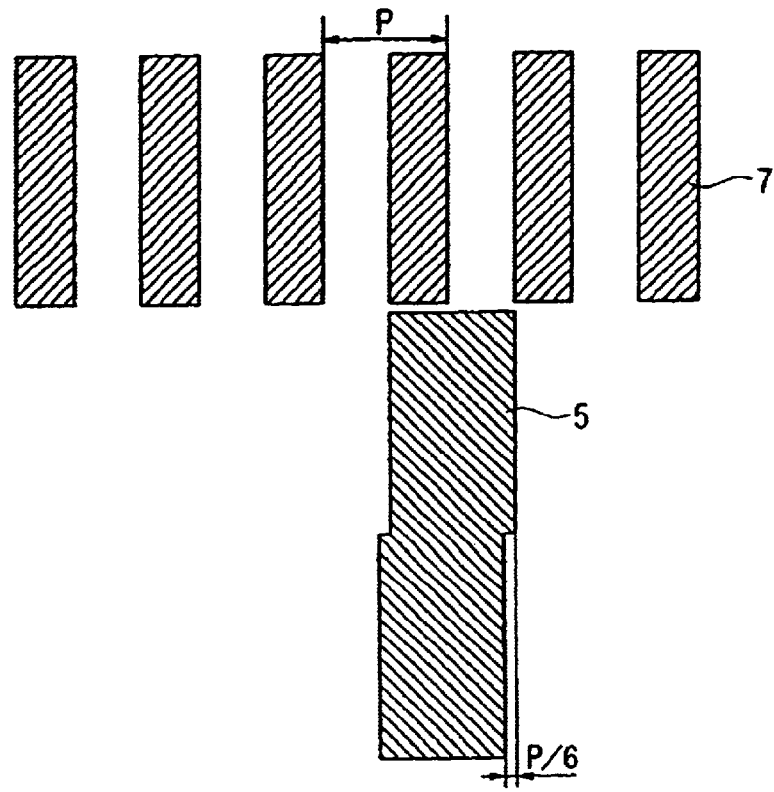
FIG. 3 shows a grating for an incremental signal and a slit for producing an origin signal.

FIG. 2A shows the construction of the origin measuring sensor of an optical type rotary encoder according to Embodiment 1 of the present invention. FIG. 2B shows a disc in Embodiment 1, and FIG. 3 shows a slit for producing an origin signal.

In FIG. 2A, reference numeral 1 designates a light-emitting element, reference numeral 2 denotes a half mirror, reference numeral 3 designates a disc provided with a grating for a main signal and a slit for an origin signal, reference numeral 4 denotes a cylindrical lens for condensing a light beam into a linear shape, reference numeral 5 designates a slit for producing an origin signal, and reference numeral 6 denotes a light receiving element. Also, is FIG. 3, reference numeral 7 designates a grating portion for detecting a position displacement signal, i.e., detecting an incremental signal, on the disc 3. The detecting portion of the grating for detecting the incremental signal is known and therefore is not shown.

Figure 4:
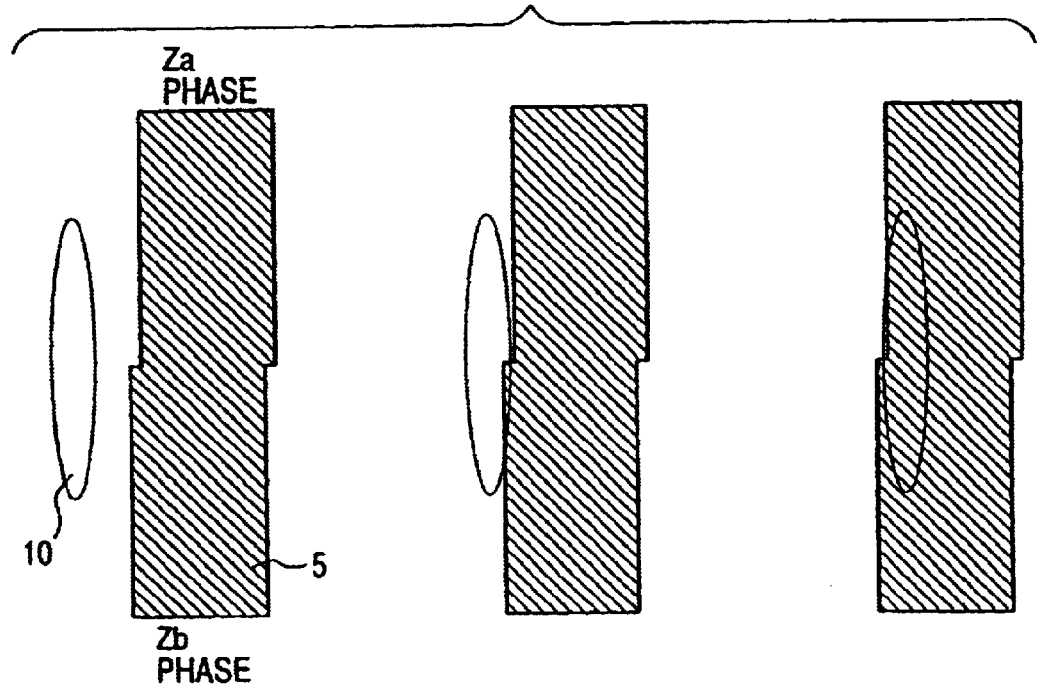
FIG. 4 shows the relation between a detection beam and the slit for producing the original signal.

A light beam emitted from the light-emitting element 1 is bent by the half mirror 2 and enters the cylindrical lens 4. The cylindrical lens 4 is disposed so that the longitudinal (extending) direction of the light beam condensed by the cylindrical lens 4 coincides with the lengthwise direction of the slit 5 for the origin. FIG. 4 shows the state of the light beam incident on the disc 3, and reference numeral 10 in FIG. 4 designates the light beam condensed by the cylindrical lens 4. When the disc is rotated and the slit for producing the origin signal is moved to the irradiated position of the light beam from left to right as shown in FIG. 4, the light beam reflected by the slit is incident on the sensor 6 which is a light receiving element, and an output for the origin signal is obtained.

Figure 5:
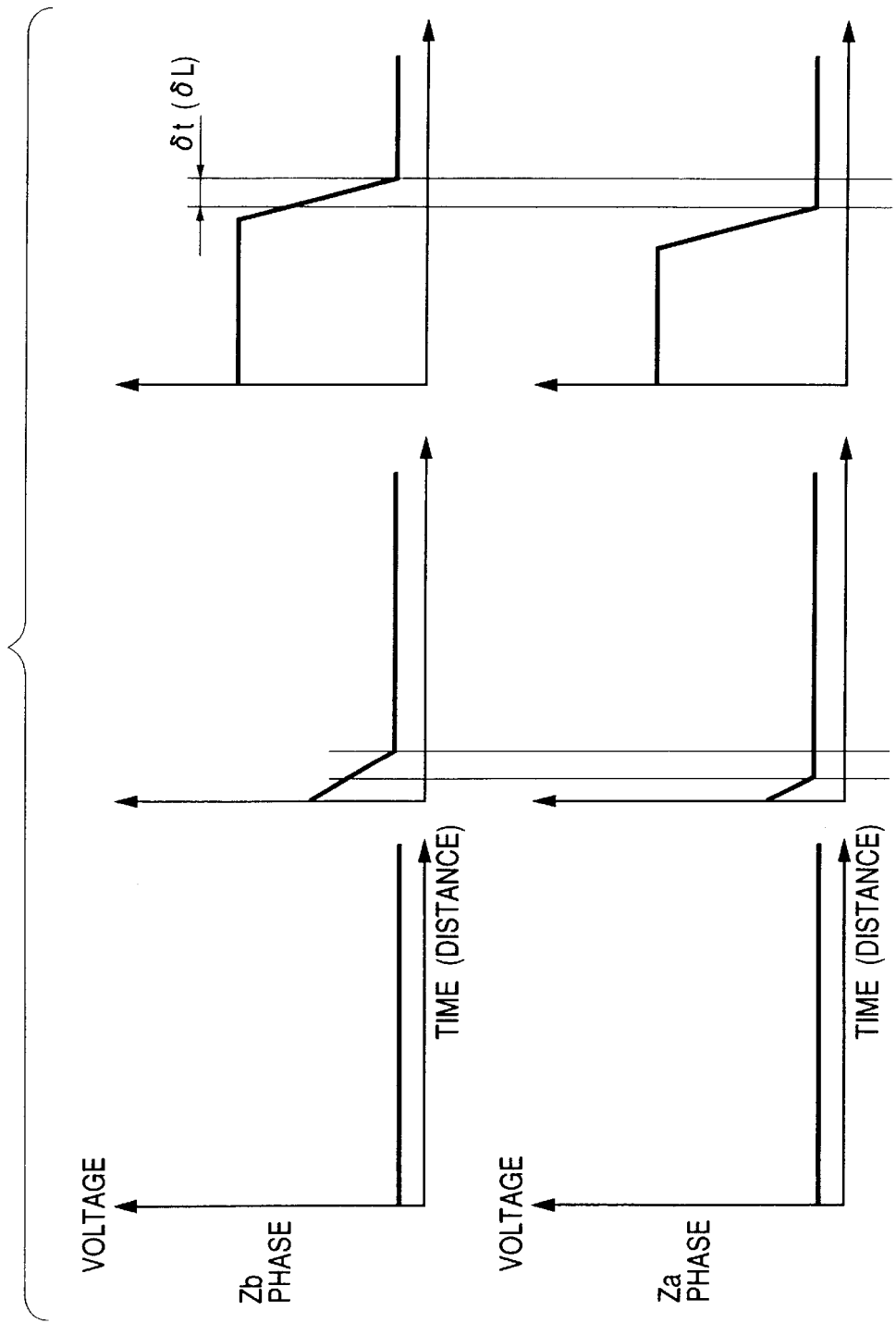
FIG. 5 shows signal outputs of Za phase and Zb phase.

FIG. 5 shows sensor outputs corresponding to FIG. 4. When as shown in FIG. 3, P is the pitch of the slit for detecting the incremental signal, the present embodiment is characterized in that the slit 5 for producing the origin signal is divided into two, which are disposed while being deviated by P/6 from each other.

The light beam for producing the origin signal is applied so as to substantially equally spread over both of the slits divided into two. When here, the sensor 6 is made into a two-division sensor and each sensor is disposed so as to correspond to each of the slits for producing the origin signal which are divided into two, the output from each sensor becomes the signal of FIG. 5 wherein the phases of Za phase and Zb phase are shifted by P/6, Δt in terms of time, and ΔL in terms of distance.

Figure 6:
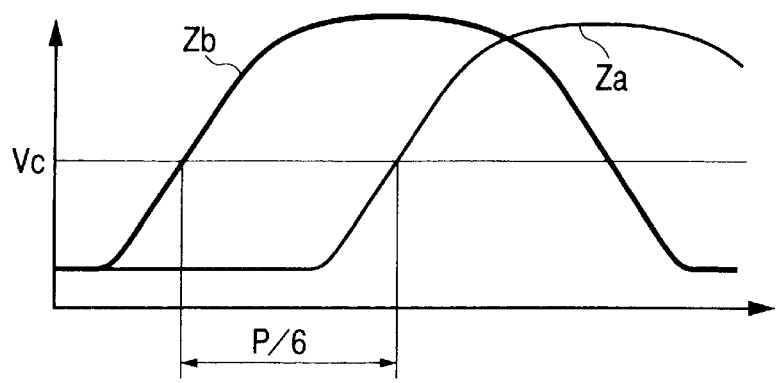
FIG. 6 shows the relative relation between the signals of Za phase and Zb phase.
Figure 7:
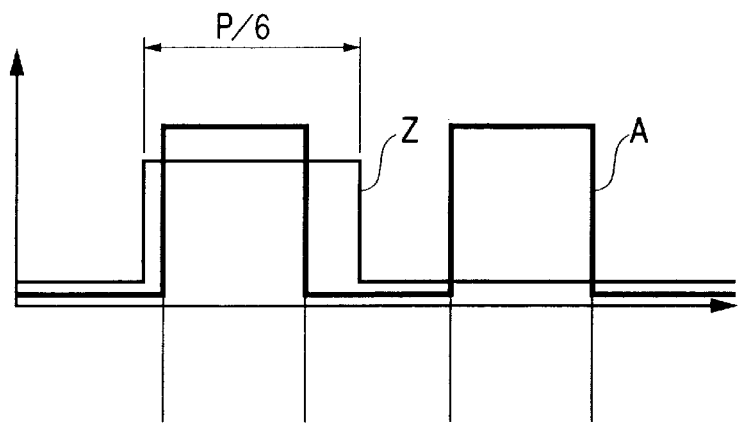
FIG. 7 shows Z signal of origin detection and the A signal of the incremental signal.

When by the use of two origin signals Za and Zb, as shown in FIG. 6, a rectangular wave origin signal is made at a threshold value voltage Vc, there can be formed the Z signal (pulse signal) of FIG. 7 in which the rectangular portion becomes P/6.

Figure 8:
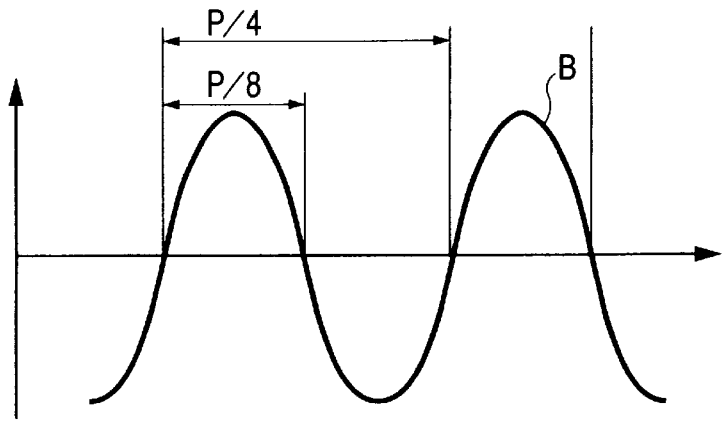
FIG. 8 shows the B signal of the incremental signal.

The detection of the incremental signal is performed by a detecting system, not shown, on the basis of a principle similar to that of Japanese Patent Application Laid-Open No. 2-93324, and as shown in FIG. 8, the incremental signal becomes an incremental signal (position displacement signal) B of a sine wave of ¼ of the grating pitch P. When a rectangular wave signal is made from the position displacement signal B of FIG. 8, it becomes the A signal of FIG. 7, and when the logic sum is taken by the A signal and the Z signal of a pulse width roughly equal to that thereof and this is newly made into an origin signal, the synchronism between the incremental signal which has become a rectangular wave signal and the origin signal can be taken.

Embodiment 1 has the following characteristics:

1-1) In spite of a very simple construction in which an origin detecting optical system is only required, accurate synchronism between the position displacement signal which has become a rectangular wave signal and the origin signal can be taken.

1-2) Since the slit for producing the origin signal is contrived, an improvement in the detection accuracy of the origin position of the encoder can be achieved by almost the similar construction as that of the prior art.

1-3) Since the construction of the optical system hardly differs from that of the prior art, low-cost manufacture having the ease of assembly equal to that of the prior art is possible.

1-4) By varying the threshold value Vc necessary to make a rectangular wave from the origin signals Za and Zb, the synchronizing adjustment with the incremental signal can be effected simply.

Figure 9:
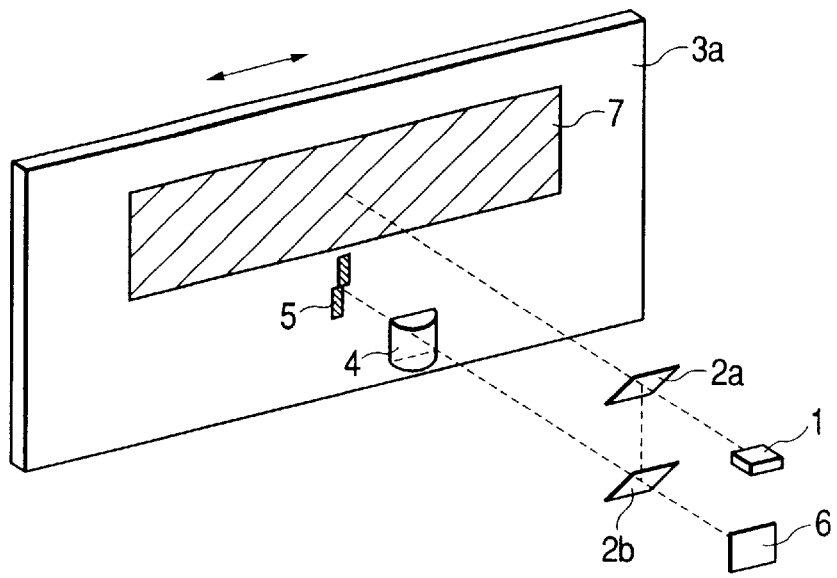
FIG. 9 shows the origin detecting system of a linear encoder according to Embodiment 2.
Figure 10:
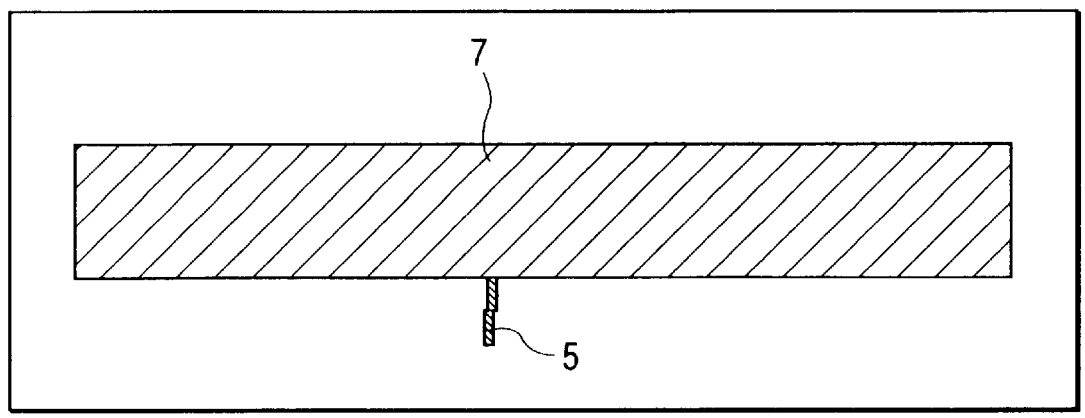
FIG. 10 shows the scale of the encoder used in Embodiments 2 and 3.

FIG. 9 shows the construction of the origin measuring sensor of an optical type linear encoder according to Embodiment 2 of the present invention. FIG. 10 shows a scale plate in Embodiment 2. The slit for producing the origin signal is similar to that in FIG. 3. For the sake of description, the same constituent members as those in the previous embodiment are designated by the same reference characters.

In FIG. 9, reference numeral 1 designates a light-emitting element, reference numeral 2 denotes half mirrors, reference character 3a designates a scale provided with a grating for an incremental signal and a slit for an origin signal, reference numeral 4 denotes a cylindrical lens for condensing a light beam into a linear shape, reference numeral 5 designates a slit for producing an origin signal, reference numeral 6 denotes a light receiving element, and reference numeral 7 designates a grating portion for detecting position displacement on the scale 3a.

A light beam emitted from the light-emitting element 1 has its optical path divided by half mirrors 2a and 2b. The light beam transmitted through the half mirror 2a is directly directed toward the grating portion 7 for the incremental signal. An incremental signal detecting system is known and therefore is not shown. The light beam reflected by the half mirror 2a and further reflected by the half mirror 2b enters the cylindrical lens 4. The cylindrical lens 4 is disposed so that the lengthwise direction of the light beam condensed by the cylindrical lens 4 coincides with the lengthwise direction of the slit 5 for producing the origin signal. The state of the light beam entering the slit 5 is similar to that in FIG. 4, and reference numeral 10 in FIG. 4 designates the light beam condensed by the cylindrical lens 4. When the scale 3a is moved and the slit for producing the origin signal is moved to the irradiated position of the light beam from left to right, the light beam reflected by the slit enters the sensor 6 which is a light receiving element, and an origin output is obtained.

Again the present embodiment is characterized in that the slit for producing the origin signal is divided into two deviated by P/6 from each other, and the light beam for detecting the origin signal is applied so as to substantially equally spread over both of the slits divided into two. The sensor 6 is a two-division sensor corresponding to each of the slits for producing the origin signal which are divided into two, and as indicated by the Za phase and Zb phase of FIG. 5, the origin signal becomes a signal of which the phase is shifted by P/6, Δt in terms of time and ΔL in terms of distance.

When in FIG. 6, by the use of the threshold value voltage Vc, a rectangular wave origin signal is made from two origin signals Za and Zb, there can be formed the Z signal of FIG. 7 in which the rectangular portion becomes P/6.

The incremental signal (position displacement signal) is taken out by a detecting system, not shown, on the basis of a known principle similar to that in Japanese Patent Application Laid-Open No. 2-93324, and becomes an incremental signal B of a sine wave of ¼ of the grating pitch P shown in FIG. 8, and the A signal of the rectangular wave of FIG. 7 is produced. When the logic sum is taken by the A signal and the Z signal and this is newly made into an origin signal, synchronism between the incremental signal which has become a rectangular wave signal and the origin signal can be taken.

Embodiment 2, in addition to the effect of Embodiment 1, has the effect that the slit for detecting the origin provided on the scale 3a can be set at any position and therefore, the origin signal can be obtained at any position and the threshold value Vc used when a rectangular wave is produced from origin signals of Za phase and Zb phase is varied, whereby the position at which the origin position signal is outputted can be adjusted easily.

Figure 11:
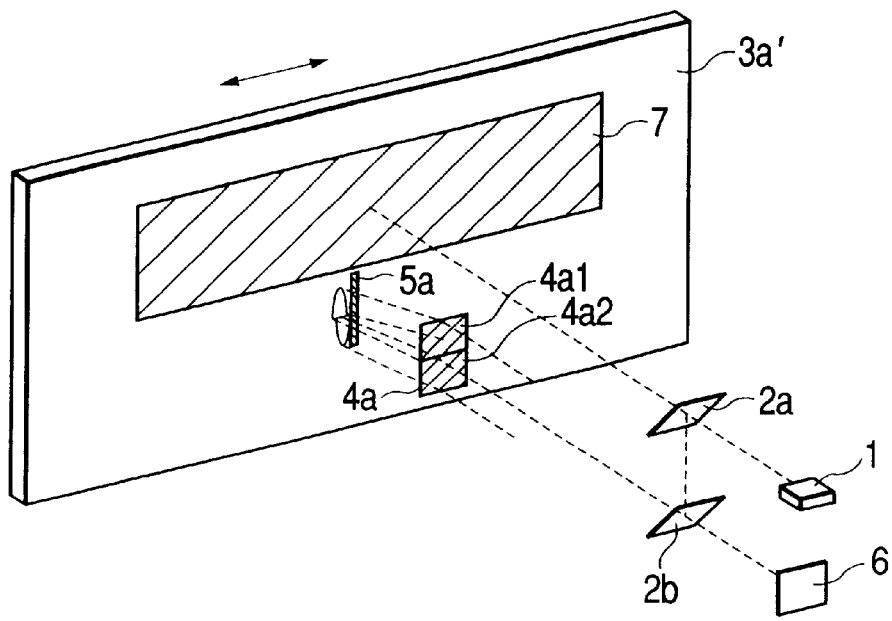
FIG. 11 shows the origin detecting system of a linear encoder according to Embodiment 3.

FIG. 11 shows the construction of the origin measuring sensor of an optical type linear encoder according to Embodiment 3 of the present invention. For the convenience of description, the same constituent members as those in the previous embodiment are designated by the same reference characters.

In FIG. 11, reference numeral 1 designates a light-emitting element, reference numeral 2 denotes half mirrors, reference character 3a' designates a scale provided with a grating for an incremental signal and a slit for producing an origin signal, and reference character 4a denotes a dividing Fresnel lens having the action of a cylindrical lens of dividing an incident light beam into two which is a feature of the present embodiment, and converting the incident light beam into two linear beams shifted in a direction perpendicular to a slit line direction. Reference character 5a designates a slit for producing an origin signal, reference numeral 6 denotes a light receiving element, and reference numeral 7 designates a grating portion for an incremental signal on the scale 3a'.

A light beam emitted from the light-emitting element 1 has its optical path divided by the half mirrors 2a and 2b. The light beam transmitted through the half mirror 2a is directly directed toward the grating portion 7 for the incremental signal. An incremental signal detecting system is known and therefore is not shown.

The light beam reflected by the half mirror 2a and further reflected by the half mirror 2b enters the dividing Fresnel lens 4a, and is condensed onto the origin signal producing slit 5a having the shape of a simple line. The dividing Fresnel lens 4a is comprised of two Fresnel lenses 4a1 and 4a2. The Fresnel lenses 4a1 and 4a2 are Fresnel lenses having the action of a cylindrical lens, and form beams of a shape extending in the same direction as the lengthwise direction of the origin signal producing slit 5a at the position of this slit 5a. The beams condensed by Fresnel lenses 4a1 and 4a2 are shifted each other in a direction perpendicular to the lengthwise direction of the slit 5a. Accordingly, as shown in FIG. 11, the slit 5a is of a shape of a straight line while the light beams incident on the slit 5a are shifted each other, conversely to FIG. 4. When the scale 3a' is moved and the origin signal producing slit 5a is moved relatively to the beam irradiated position from left to right, the light beam reflected by the slit enters the sensor 6 which is a light receiving element, and an origin output is obtained.

The present embodiment is characterized in that when the pitch of the grating for forming an incremental signal is P, the two light beams by the dividing Fresnel lens 4a are formed while being shifted each other by P/6, and are applied so as to substantially equally spread over the origin signal producing slit. The sensor 6 is a two-division sensor corresponding to each of the light beams divided into two, and the signal thereof becomes a signal in which the phases indicated by the Za phase and Zb phase of FIG. 5 are shifted by P/6, Δt in terms of time and ΔL in terms of distance. When as shown in FIG. 6, by the use of the threshold value voltage Vc, a rectangular wave origin signal is made from two origin signals Za and Zb, the Z signal of FIG. 7 of which the rectangular portion is P/6 can be formed, and the subsequent signal processing using the incremental signal A in the same as that in Embodiment 2.

In Embodiment 3, contrivance is done in the shape of a light beam and therefore, in addition to the effect of the previous embodiment, there is the effect that the conventional single slit is also usable, since the slit provided on the scale 3a' is of a shape of straight line.

Figure 12:
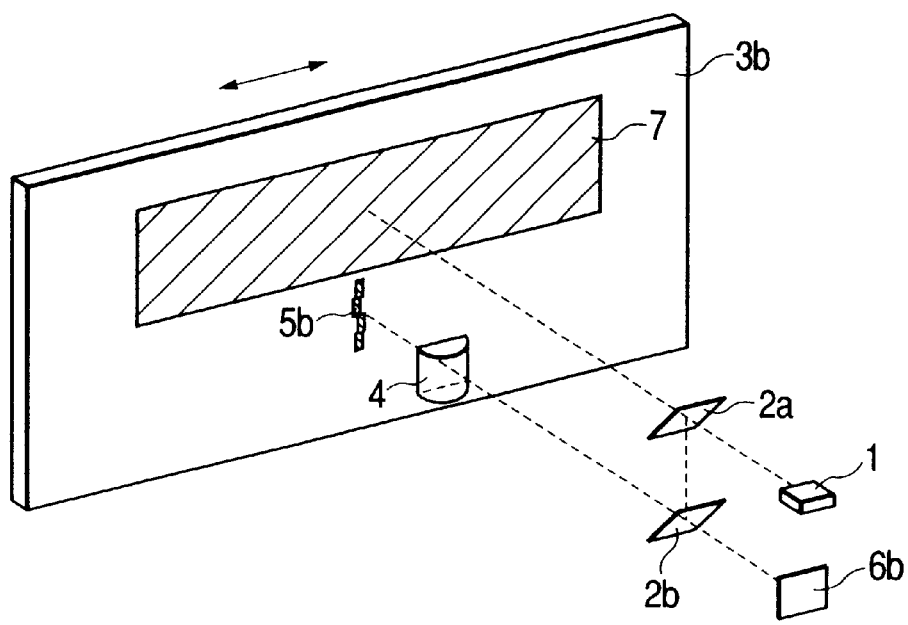
FIG. 12 shows the origin detecting system of a linear encoder according to Embodiment 4.
Figure 13:
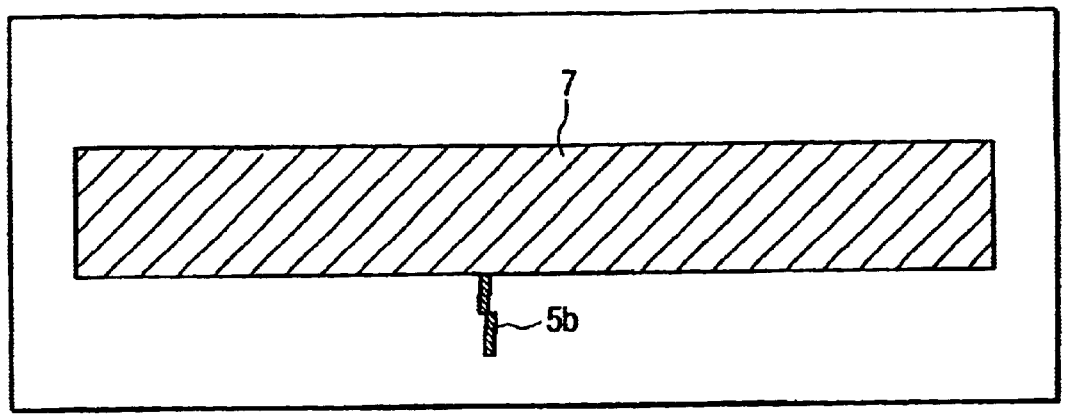
FIG. 13 shows the scale of the encoder used in Embodiment 4.
Figure 14:
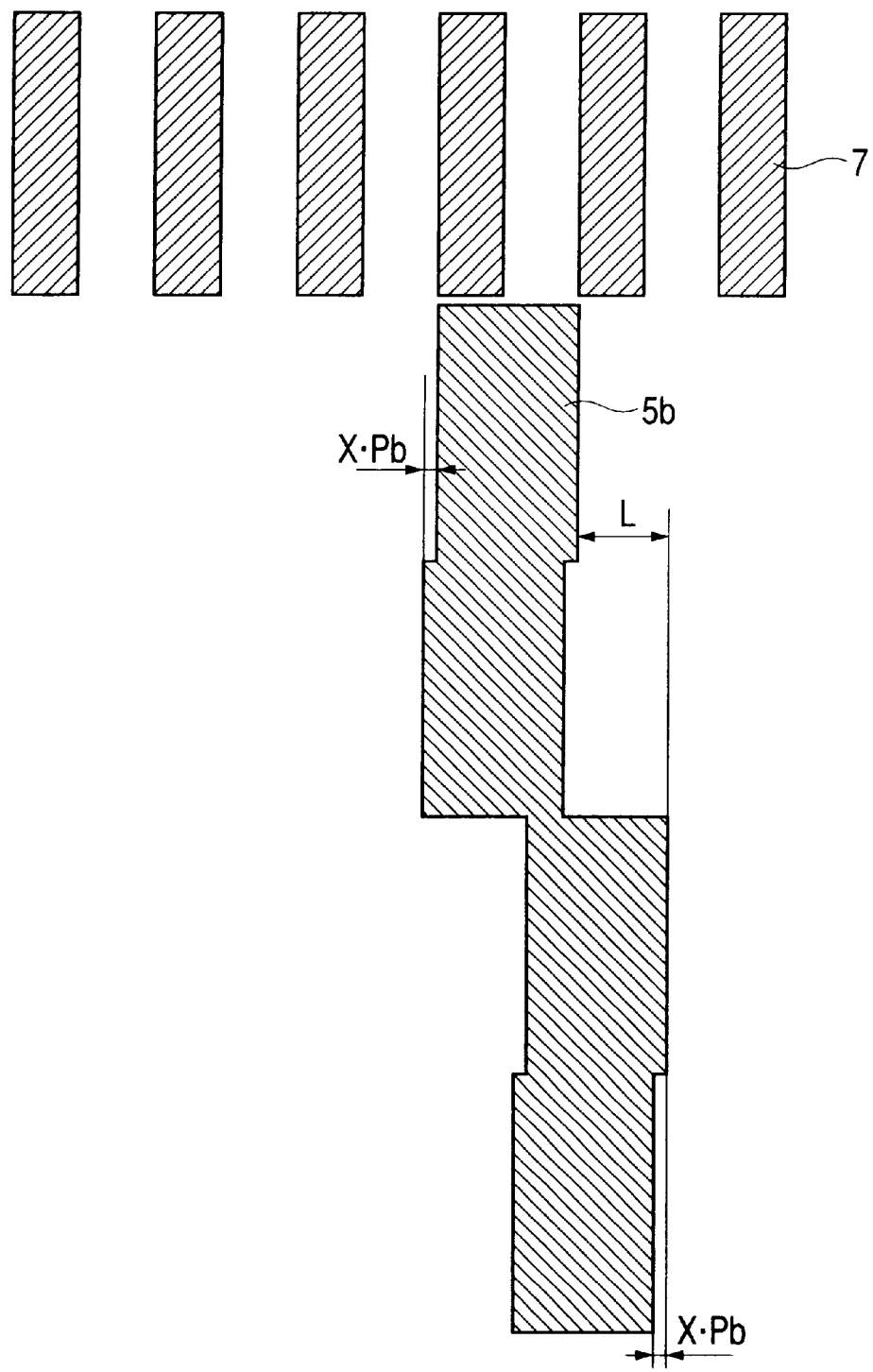
FIG. 14 shows a grating for detecting the incremental signal and a slit for producing an origin signal.

FIG. 12 shows the construction of the origin measuring sensor of an optical type linear encoder according to Embodiment 4 of the present invention. FIG. 13 shows a scale plate in Embodiment 4, and FIG. 14 shows an origin signal measuring slit, and for the convenience of description, the same constituent members as those in the previous embodiment are designated by the same reference characters.

In FIG. 12, reference numeral 1 designates a light-emitting element, reference numeral 2 denotes half mirrors, reference character 3b designates a scale provided with a grating for an incremental signal and a slit for an origin signal, reference numeral 4 denotes a cylindrical lens for condensing a light beam into a linear shape, reference character 5b designates a slit for producing an origin signal, reference character 6b denotes a light receiving element, and reference numeral 7 designates a grating portion for the incremental signal on the scale 3b.

A light beam emitted from the light-emitting element 1 has its optical path divided by the half mirrors 2a and 2b. The light beam transmitted through the half mirror 2 is directly directed toward the grating portion 7 for the incremental signal. The incremental signal detecting system is known and therefore is not shown.

The light beam reflected by the half mirror 2a and further reflected by the half mirror 2b is incident on the cylindrical lens 4. The cylindrical lens 4 is disposed so that the lengthwise direction of the condensed light beam coincides with the lengthwise direction of the slit 5b for producing the origin signal.

The present embodiment is characterized in that the slit 5b for producing the origin signal is of a shape divided into four. When as shown in FIG. 14, the uppermost slit is regarded as the reference, the disposition is such that the second slit is deviated by −X·Pb, the third slit is deviated by L and the fourth slit is deviated by L−X·Pb. The first slit and the second slit form a pair, and the third slit and the fourth slit form a pair and thus, the slit for producing the origin signal is comprised of two groups. The deviation between the slits in the same group corresponds to X·Pb, and the deviation between the groups corresponds to L. It is to be understood hereinafter that the second slit is named Za1, the first slit is named Za2, the fourth slit is named Zb1 and the third slit is named Zb2, and these are made to correspond to the phases of signals which will be described later. Pb indicates the pitch of a sine wave signal obtained from the incremental signal, and X is a proportion constant indicative of the rate of the deviation to the pitch.

Figure 15:
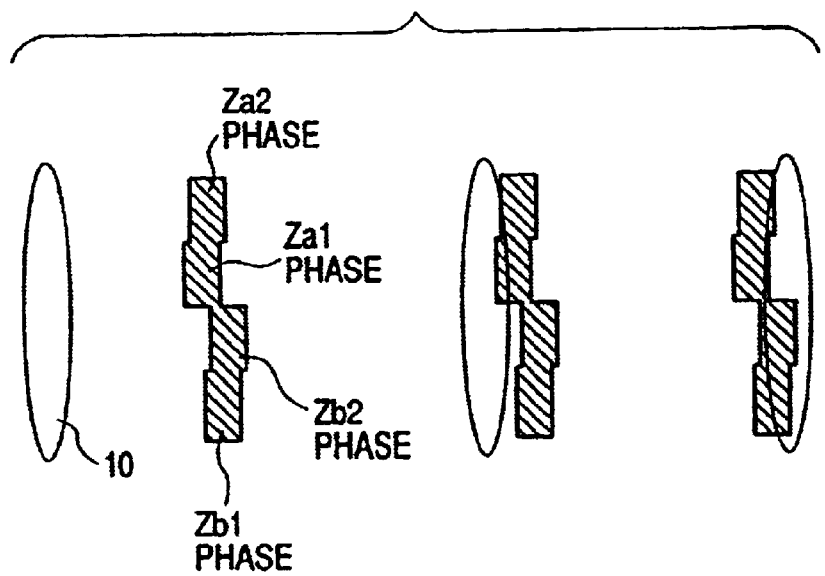
FIG. 15 shows the relation between a detection beam and the slit for producing the origin signal.

FIG. 15 shows the state of the light beam incident on the slit 5b, and reference numeral 10 in FIG. 15 designates the light beam condensed by the cylindrical lens 4. The light beam for producing the origin signal is applied so as to substantially equally spread over the whole of the slit 5b divided into four. When the scale 3b is moved and the slit for detecting the origin signal is moved relatively to the beam irradiated position from left to right, the light beam reflected by the slit enters the sensor 6b which is a light receiving element. The sensor 6b is a four-division sensor corresponding to the slit for detecting the origin divided into four, and outputs origin signals of Za1 phase, Za2 phase, Zb1 phase and Zb2 phase shown in FIG. 16.

Figure 16:
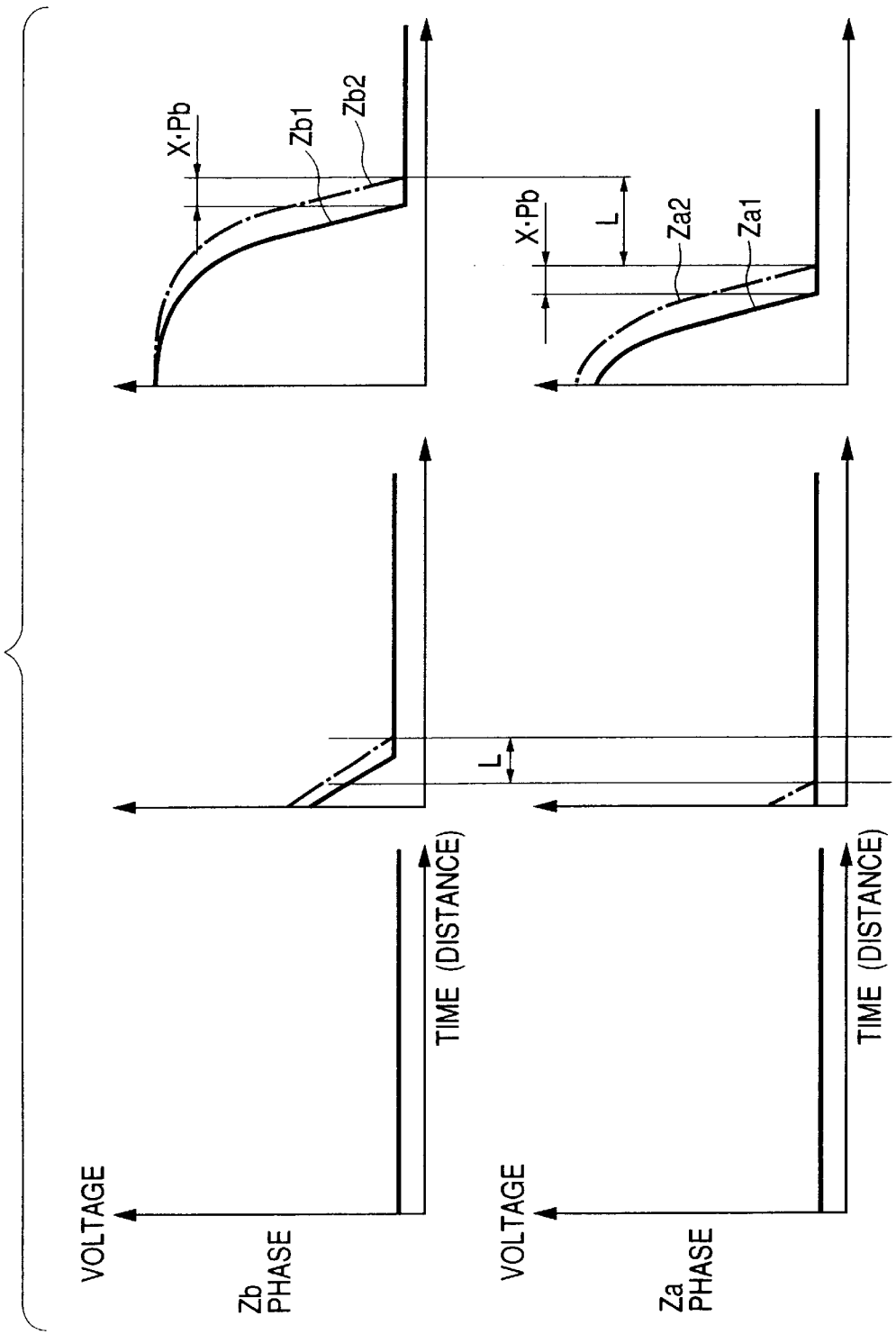
FIG. 16 shows signal outputs of Za phase and Zb phase.
Figure 17:
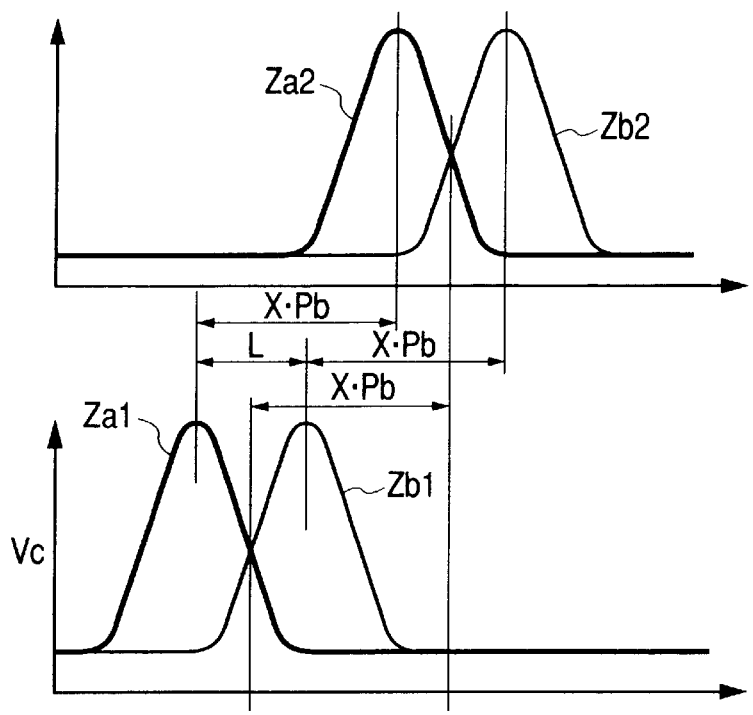
FIG. 17 shows the relative relation between signals of Za1 phase to Zb2 phase.

From FIG. 16, the signals indicated by Za1 phase and Za2 phase, and the signals indicated by Zb1 phase and Zb2 phase are signals deviated from each other by X·Pb in terms of distance, and the signals indicated by Za1 phase and Zb1 phase, and the signals indicated by Za2 phase and Zb2 phase are signals deviated from each other by L in terms of distance. When as shown in FIG. 17, in the four origin signals (Za1, Za2, Zb1, Zb2) a rectangular wave origin signal is made with a position at which the signal output of Za1 phase and Zb1 phase and the signal output of Za2 phase and Zb2 phase become equal to each other, there can be formed the Z signal of FIG. 18 in which the rectangular portion is X·Pb.

Figure 18:
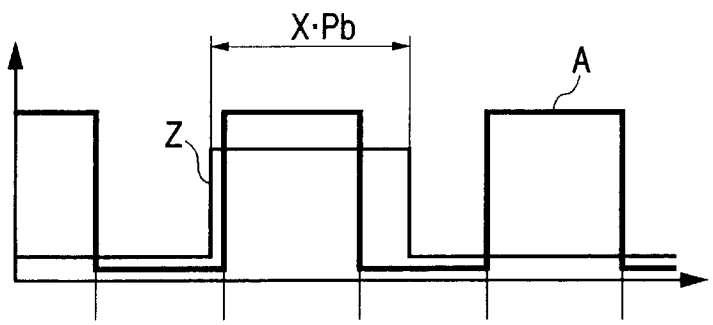
FIG. 18 shows Z signal of origin detection and the A signal of an incremental signal.
Figure 19:
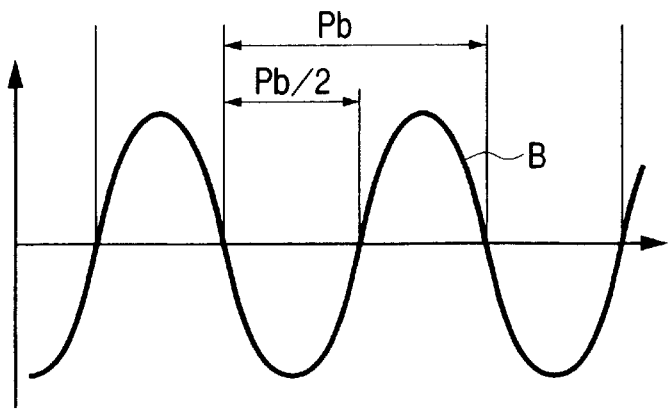
FIG. 19 shows the B signal of the incremental signal.

Assuming that an incremental signal B is a sine wave having a pitch Pb as shown in FIG. 19, and when a rectangular wave signal is made from the signal B, the A signal of FIG. 18 is formed. When the logic sum is taken by the A signal and Z signal of FIG. 18 and this is newly made into an origin signal, the synchronism between the incremental signal which has become a rectangular wave signal and the origin signal can be taken.

To take the synchronism between the Z signal and the incremental signal, the rectangular portion X·Pb of the rectangular wave origin signal must be set so as to have a width equal to, and specifically greater than that of the rectangular portion of a rectangular wave signal A made from a position displacement signal, and not to overlap the neighboring rectangular portion of the A signal. Accordingly, the magnitude of X·Pb need be set to between 0.5 Pb to 1.5 Pb.

Assuming that the detection of the incremental signal is the same as that in Japanese Patent Application Laid-Open No. 5-157583, the period Pb of the position displacement signal is 0.7 $\mu$m relative to the pitch 2.8 $\mu$m of the grating for the position displacement signal. Assuming here that X=1, the slit deviation of FIG. 14 is 0.7 $\mu$m. Further, assuming that L=3.0 $\mu$m, there are obtained four signals which are out of phase by 0.7 $\mu$m, 3.0 $\mu$m and 3.7 $\mu$m with respect to the first Za1 signal, and Z signal of a rectangular wave can be made.

In Embodiment 4, the rectangular wave Z phase signal of the origin signal overlaps only a rectangular wave signal produced from the incremental signal and does not overlap a plurality of signals and therefore, there is the effect that synchronism can be reliably taken with the incremental signal and the reproducibility of Z phase can be enhanced.

Figure 20:
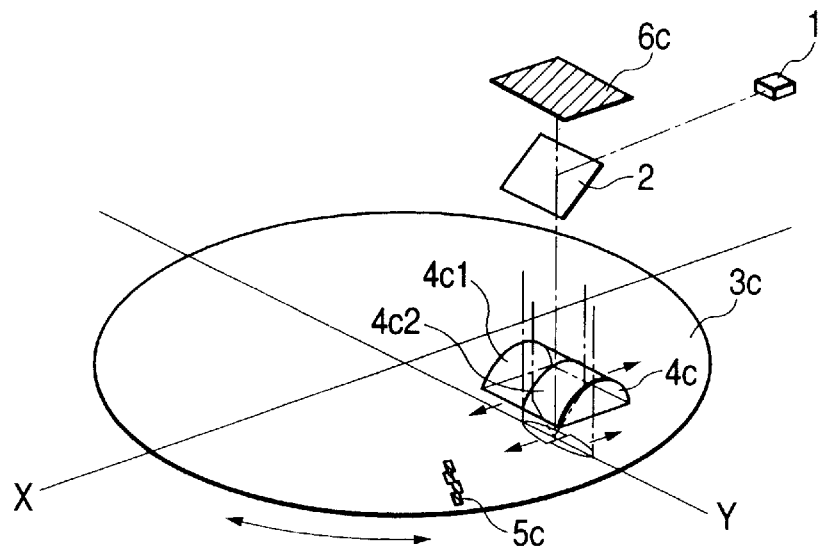
FIG. 20 shows the origin detecting system of a rotary encoder according to Embodiment 5.
Figure 21:
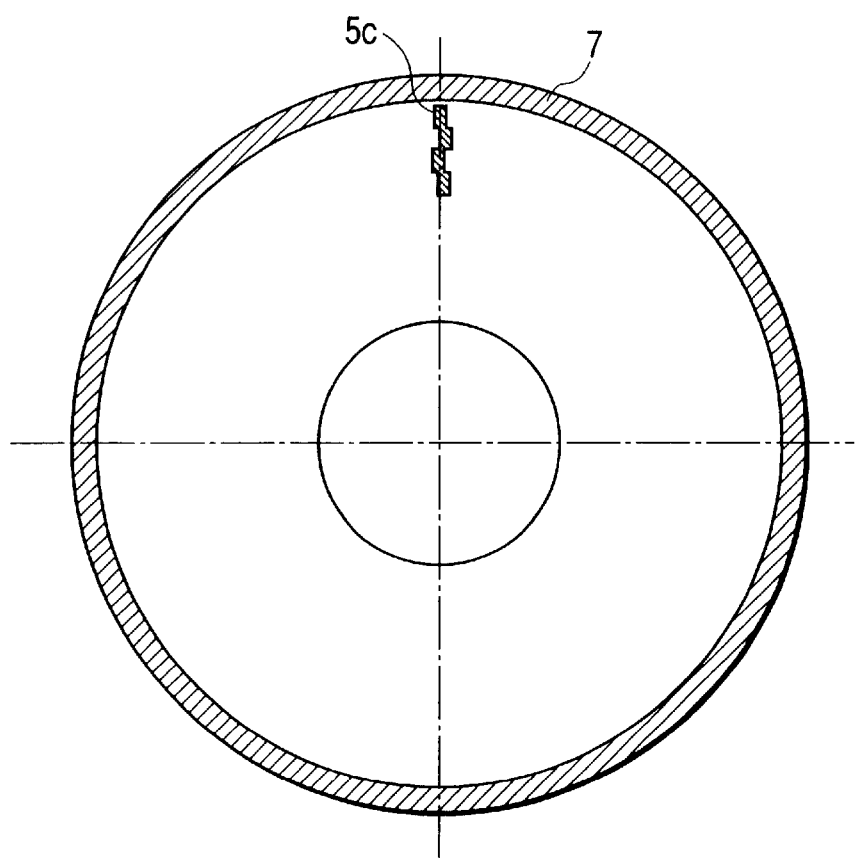
FIG. 21 shows the disc of the encoder used in Embodiments 5 and 6.
Figure 22:
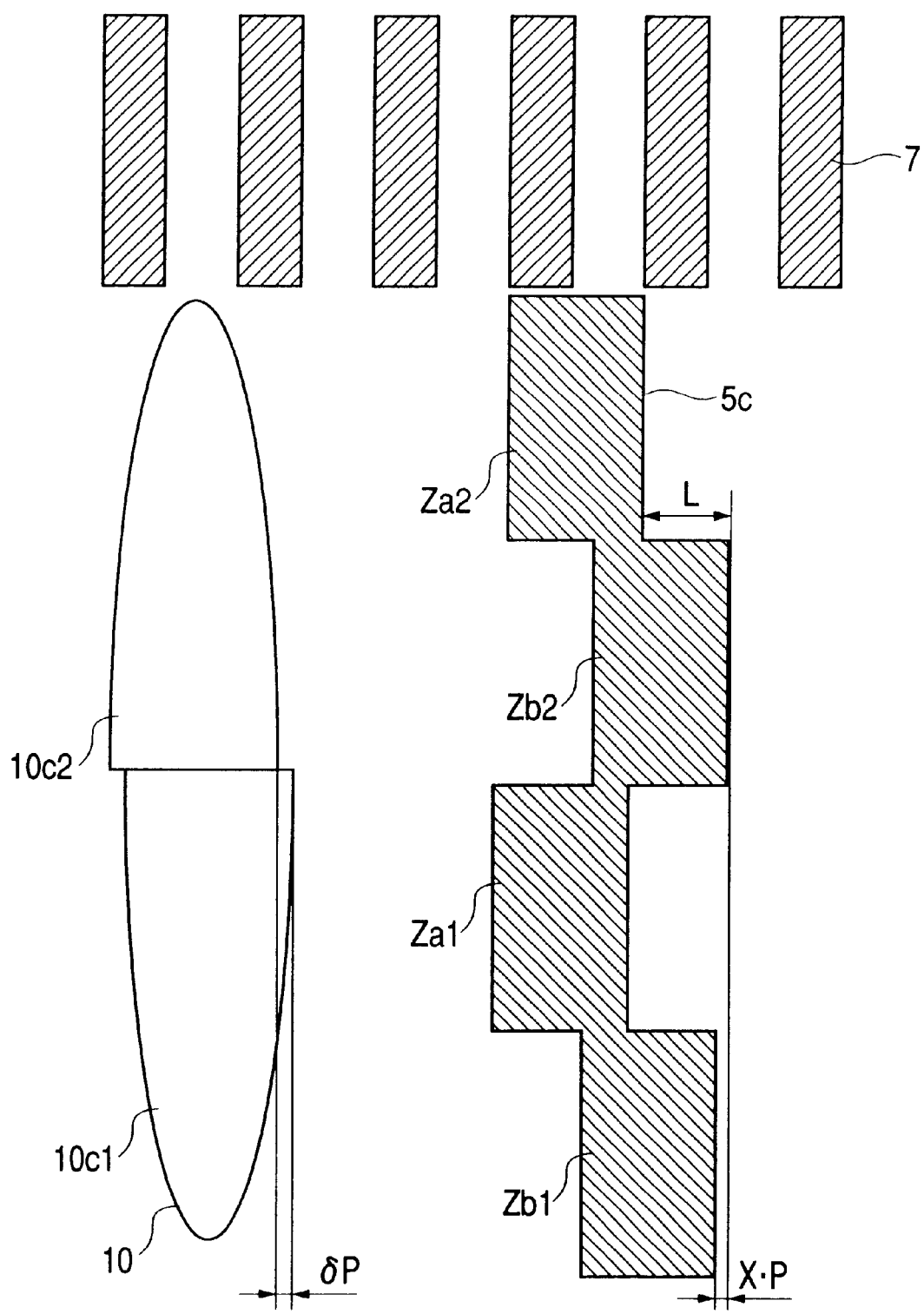
FIG. 22 shows a grating for detecting an incremental signal and a slit for producing an origin signal.

FIG. 20 shows the construction of the origin measuring sensor of an optical type rotary encoder according to Embodiment 5 of the present invention. FIG. 21 shows a disc in Embodiment 5, and FIG. 22 shows an origin signal measuring slit and a light beam applied to the slit. For the convenience of description, the same constituent members as those in the previous embodiment are designated by the same reference characters.

In FIG. 20, reference numeral 1 designates a light-emitting element, reference numeral 2 denotes a half mirror, reference character 3c designates a disc provided with a grating for an incremental signal and a slit for producing an origin signal, reference character 4c denotes a dividing cylindrical lens for condensing a light beam into two linear beams, reference character 5c designates a slit for producing an origin signal, reference character 6c denotes a light receiving element, and reference numeral 7 designates a grating portion for the incremental signal on the disc 3c.

A light beam emitted from the light-emitting element 1 is bent by the half mirror 2, and enters the dividing cylindrical lens 4c. The dividing cylindrical lens 4c is comprised of two cylindrical lenses 4c1 and 4c2, and forms a light beam extending in the same direction as the lengthwise direction of the slit Sc for producing the origin signal at the position of this slit 5c. The cylindrical lenses 4c1 and 4c2 condense the light beams with a deviation of $\delta$P in a direction perpendicular to the lengthwise direction of the slit 5c and further, the value of $\delta$P is adjustable as a variable amount.

The slit 5c for producing the origin signal is of a shape divided into four. When as shown in FIG. 22, the uppermost slit is regarded as the reference, the disposition is such that the second slit is deviated by L, the third slit is deviated by $-$X·Pb and the fourth slit is deviated by L$-$X·Pb. The first slit and the second slit form a pair, and the third slit and the fourth slit form a pair. It is to be understood that the third slit is named Za1, the first slit is named Za2, the fourth slit is named Zb1 and the second slit is named Zb2, and these are made to correspond to the phases of signals which will be described later. Pb indicates the pitch of a sine wave signal obtained from the incremental signal, and X is a proportion constant indicative of the rate of the deviation to the pitch.

Figure 23:
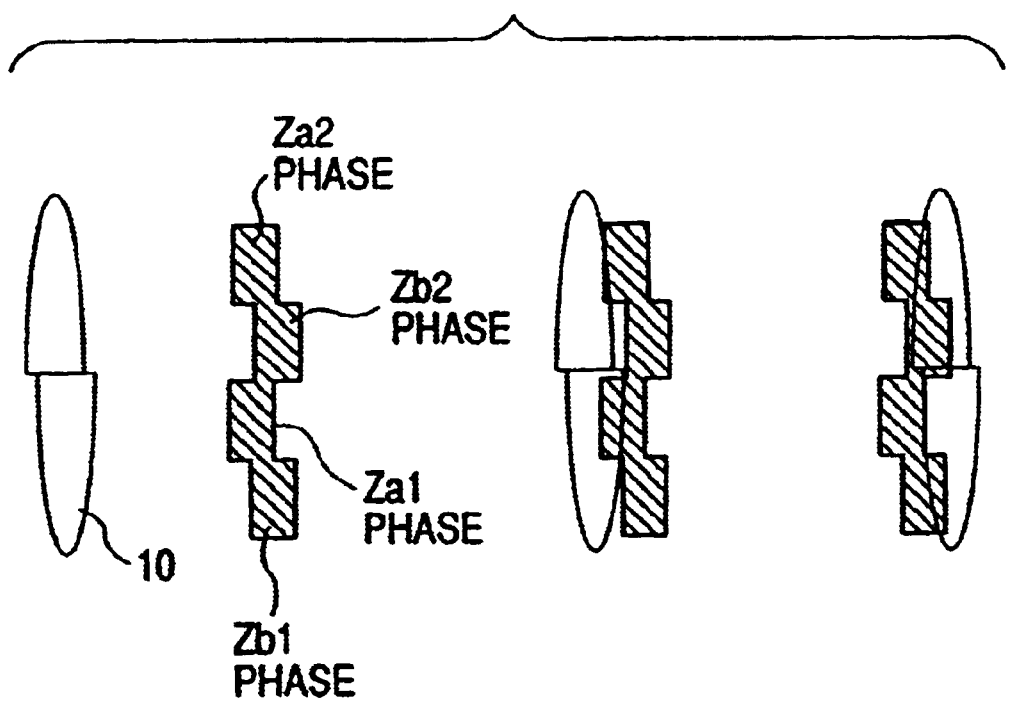
FIG. 23 shows the relation between a detection beam and the slit for the origin signal.

FIG. 22 shows the state of the light beam incident on the slit 5c. Reference numeral 10 in FIG. 22 denotes the light beam condensed by the dividing cylindrical lens 4c, and the light beam 10c1 formed by the cylindrical lens 4c1 and the light beam 10c2 formed by the cylindrical lens 4c2 are deviated by $\delta$P from each other. The light beam 10c1 for producing the origin signal corresponds to Za1 and Zb1, and the light beam 10c2 corresponds to Za2 and Zb2, and these light beams are applied so as to substantially equally spread over the corresponding slits. When the disc 3c is moved and as shown in FIG. 23, the slit for producing the origin signals is moved relatively to the beam irradiated position from left to right, the light beam reflected by the slit enters the sensor 6b which is a light receiving element. The sensor 6b is a four-division sensor and corresponds to each of the slits for producing the origin signals which are divided into four, and outputs origin signals of Za1 phase, Za2 phase, Zb1 phase and Zb2 phase shown in FIG. 24.

Figure 24:
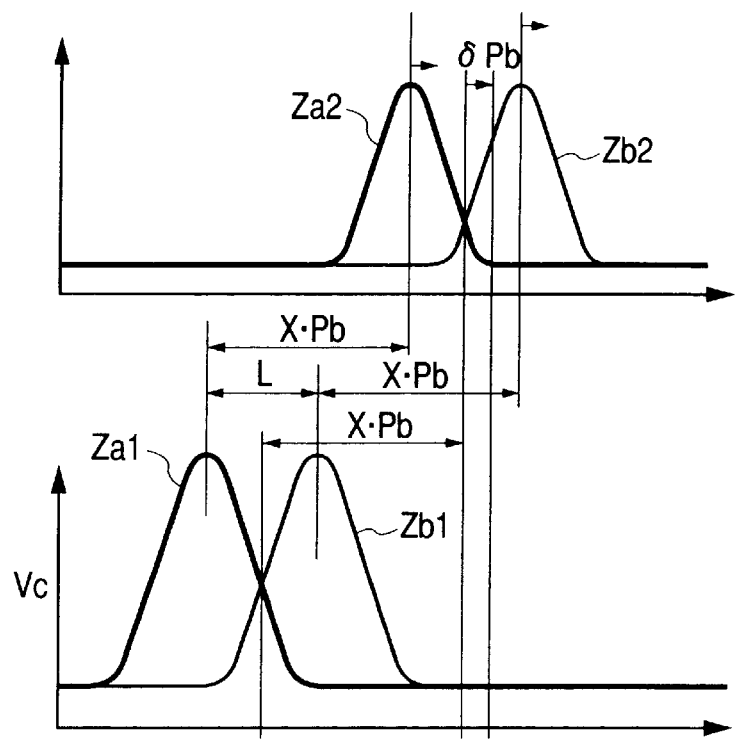
FIG. 24 shows the relative relation between signals of Za1 phase to Zb2 phase.

FIG. 24 first shows a case where $\delta$P=0. When $\delta$P=0, the signals indicated by Za1 phase and Za2 phase, and the signals indicated by Zb1 phase and Zb2 phase become signals deviated from each other by X·Pb in terms of distance, and the signals indicated by Za1 phase and Zb1 phase, and the signals indicated by Za2 phase and Zb2 phase become signals deviated from each other by L in terms of distance. When in the four origin signals Za1, Za2, Zb1, Zb2, a rectangular wave origin signal is made with a position at which the signal output of Za1 phase and Zb1 phase and the signal output of Za2 phase and Zb2 phase become equal to each other, there can be formed the Z signal of FIG. 25 in which the rectangular portion is X·Pb. When the deviation of $\delta$P between the light beams 10c1 and 10c2 is introduced, the signal of Za2 phase and Zb2 phase creates the deviation of $\delta$P relative to the signal of Za1 phase and Zb1 phase, as indicated by arrow, and the width of the rectangular portion of the Z signal becomes X·Pb+$\delta$P.

Figure 25:
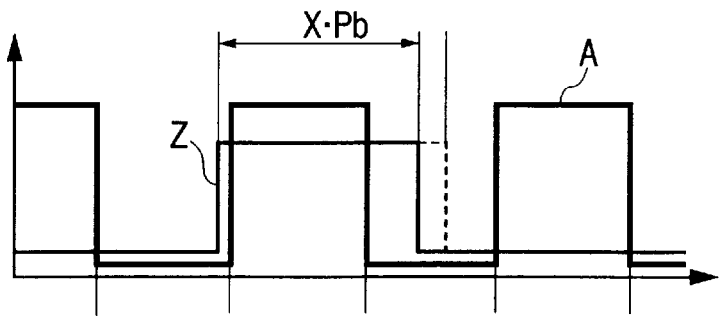
FIG. 25 shows Z signal of origin detection and the A signal of an incremental signal.
Figure 26:
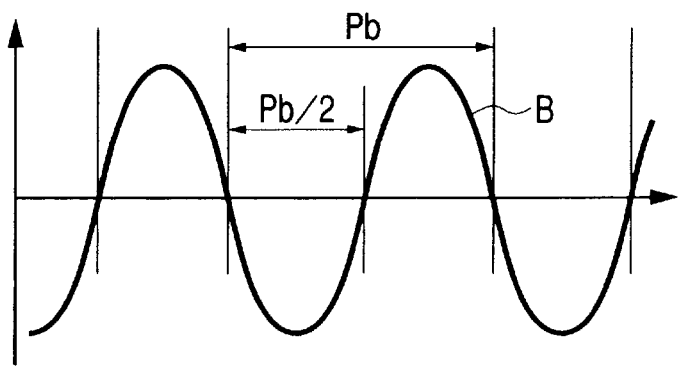
FIG. 26 shows the B signal of the incremental signal.

When the incremental signal B is made into a sine wave having a pitch Pb as shown in FIG. 26 and a rectangular wave signal is made from the B signal, the A signal of FIG. 25 is formed. When the logic sum is taken by the A signal and Z signal of FIG. 25 and this is newly made into an origin signal, the synchronism between the incremental signal which has become a rectangular wave signal and the origin signal can be taken.

In the present embodiment, by the deviation δP between the cylindrical lenses 4c1 and 4c2 being newly introduced, the produced position of the rectangular wave origin signal and the size of the rectangular portion can be optically adjusted and a desired rectangular wave origin signal can be obtained. The subsequent signal processing is the same as that in Embodiment 4, and for example, the magnitude of X·Pb is set within a range of 0.5 Pb to 1.5 Pb.

In Embodiment 5, the size of the rectangular portion of the rectangular wave Z phase signal of the origin signal can be adjusted and therefore, an origin signal sufficient to cope with even a case where the incremental signal is deteriorated by a variation or the like in the light source can be produced. Also, not only the size of the rectangular wave origin signal but also the output position thereof can be adjusted by δP and therefore, assembly becomes easy. Also, synchronism can be reliably taken with the incremental signal, whereby the reproducibility of the Z phase can be enhanced.

Figure 27:
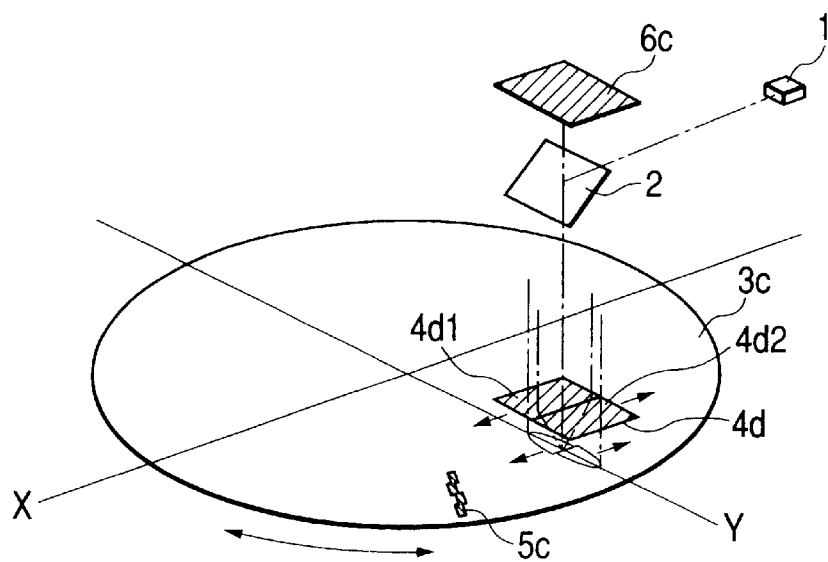
FIG. 27 shows the origin detecting system of a rotary encoder according to Embodiment 6.

FIG. 27 shows the construction of the origin measuring sensor of an optical type rotary encoder according to Embodiment 6 of the present invention. The disc is similar to that shown in FIG. 21, and the original signal measuring slit and the light beam applied thereto are similar to those shown in FIG. 22. For the convenience of description, in FIG. 27, the same constituent members as those in the previous embodiment are designated by the same reference characters.

In FIG. 27, reference numeral 1 designates a light-emitting element, reference numeral 2 denotes a half mirror, reference character 3c designates a disc provided with a grating for an incremental signal and a slit for producing an origin signal, reference character 4d denotes a dividing Fresnel lens for condensing a light beam into two linear beams, reference character 5c designates a slit for producing an origin signal, reference character 6c denotes a light receiving element, and reference numeral 7 designates a grating portion for the incremental signal on the disc 3c.

A light beam emitted from the light-emitting element 1 is bent by the half mirror 2, and is incident on the dividing Fresnel lens 4d. The dividing Fresnel lens 4d is comprised of two Fresnel lenses 4d1 and 4d2 having the action of a cylindrical lens, and forms light beams 10c1 and 10c2 extending in the same direction as the lengthwise direction of the slit 5c for producing the origin signal at the position of this slit 5c. The Fresnel lenses 4d1 and 4d2 condense the light beam with a deviation of δP in a direction perpendicular to the lengthwise direction of the slit 5c, and further the value of δP is adjustable as a variable amount.

In the present embodiment, the construction of the slit 5c and the relation between the light beams 10c1 and 10c2 formed by the Fresnel lenses 4d1 and 4d2 are the same as those in Embodiment 5 and therefore, the subsequent signal output and signal processing are also the same as those in Embodiment 5. Accordingly, the action of the amount of deviation δP and setting the magnitude of X·Pb within a range of 0.5 Pb to 1.5 Pb are also similar to those in Embodiment 5.

Embodiment 6 uses the Fresnel lenses and therefore has the feature that downsizing is possible and the construction of the optical system is easy.

Figure 28:
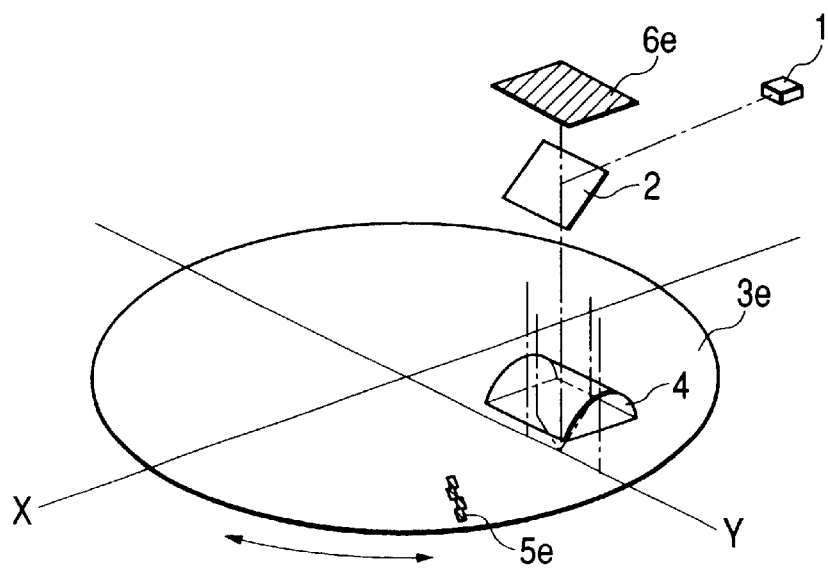
FIG. 28 shows the origin detecting system of a rotary encoder according to Embodiment 7.
Figure 29:
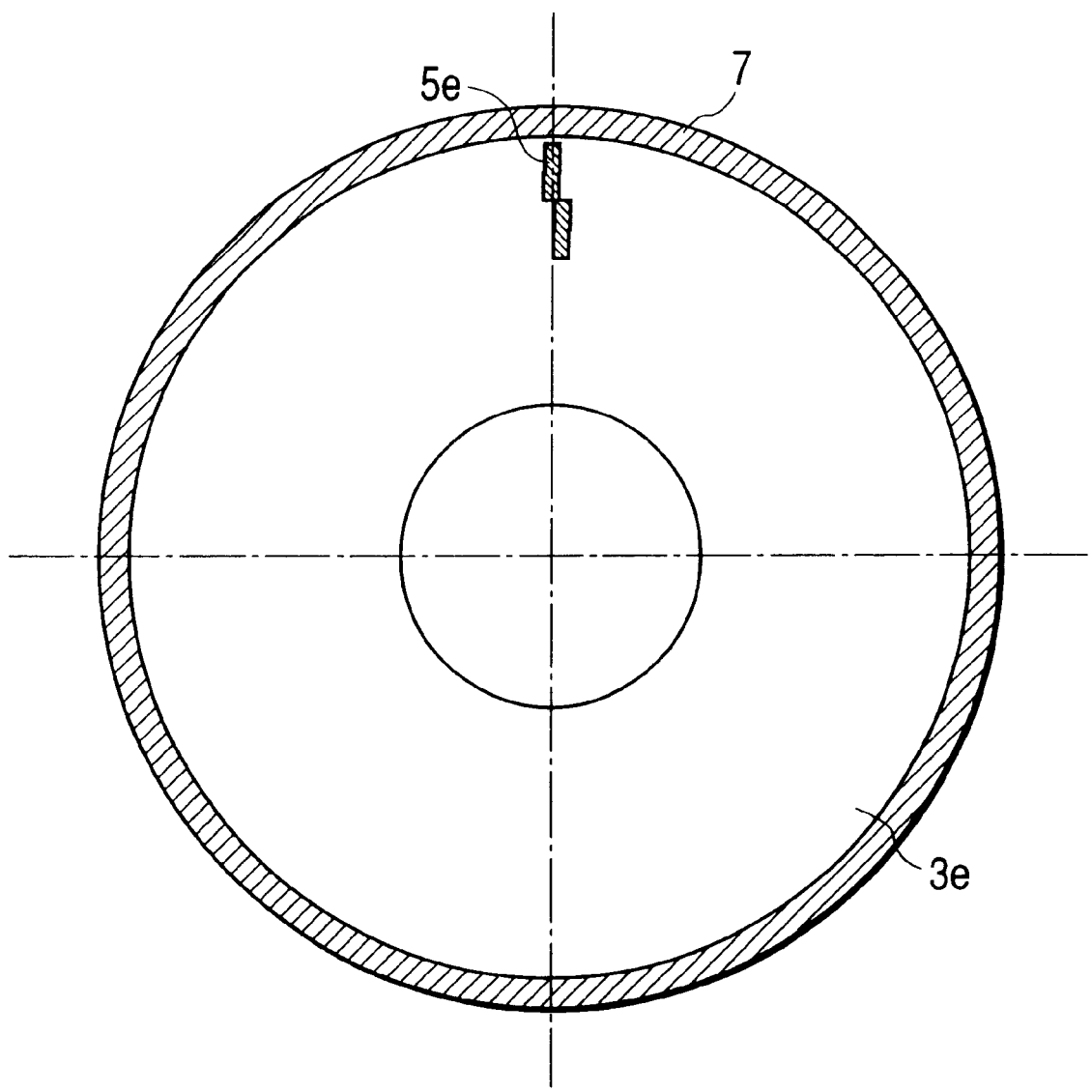
FIG. 29 shows the disc of the encoder used in Embodiment 7.

FIG. 28 shows the construction of the original measuring sensor of an optical type rotary encoder according to Embodiment 7 of the present invention. FIG. 29 shows a disc in Embodiment 7, and FIG. 30 shows a slit for measuring an original signal, and for the convenience of description, the same constituent members as those in the previous embodiment are designated by the same reference characters.

In FIG. 28, reference numeral 1 designates a light-emitting element, reference numeral 2 denotes a half mirror, reference character 3e designates a disc provided with a grating for an incremental signal and a slit for producing an origin signal, reference numeral 4 denotes a cylindrical lens for condensing a light beam into a linear shape, reference character 5e designates a slit for producing an origin signal, reference character 6e denotes a light receiving element, and reference numeral 7 designates a grating portion for the incremental signal on the disc 3e. The detecting portion for detecting the incremental signal of the grating is known and therefore is not shown.

A light beam emitted from the light-emitting element is bent by the half mirror 2 and is incident on the cylindrical lens 4. The cylindrical lens 4 is disposed so that the condensed light beam extends in the same direction as the lengthwise direction of the slit 5e for the origin signal.

Figure 30:
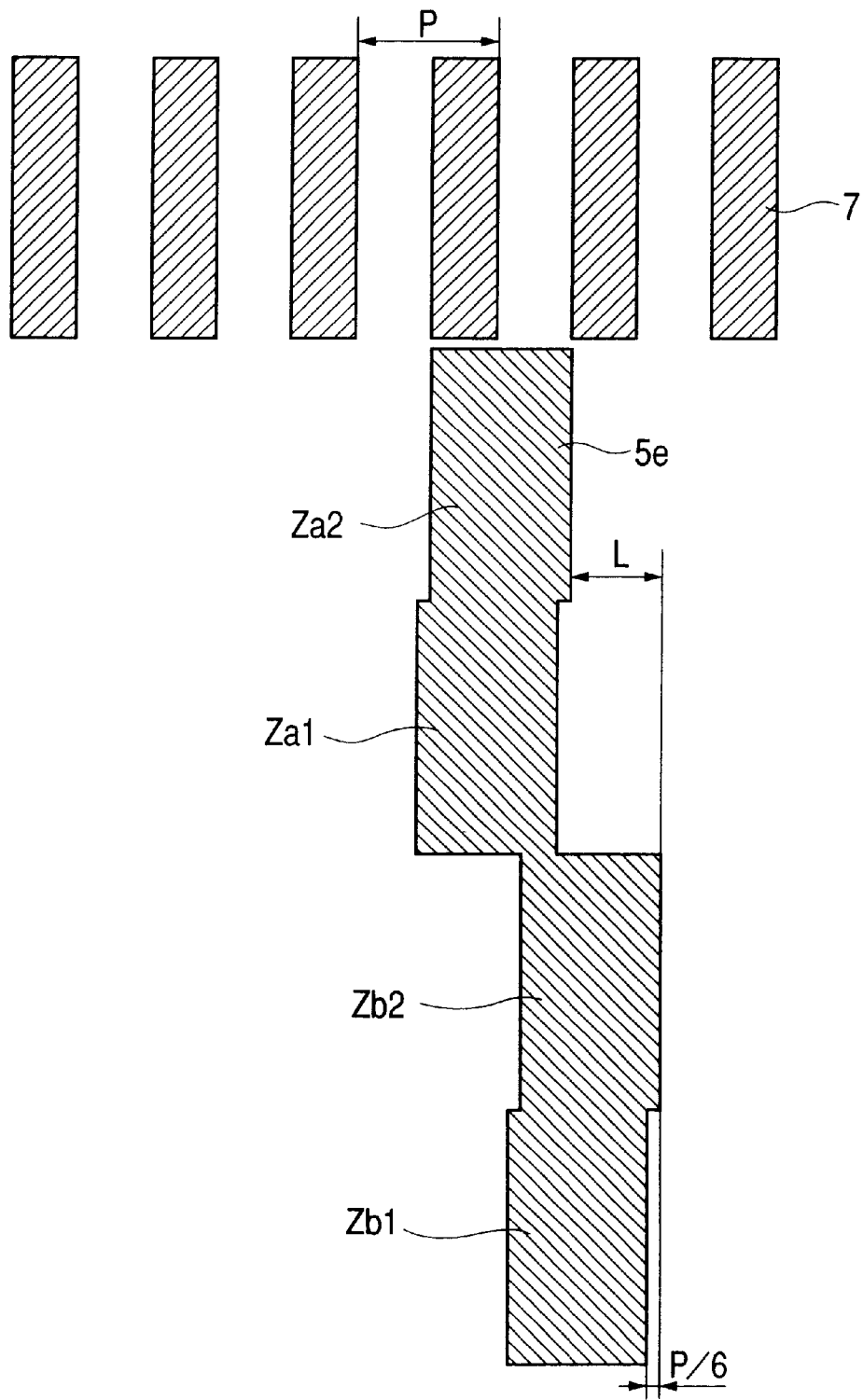
FIG. 30 shows a grating for detecting an incremental signal and a slit for producing an origin signal.

As shown in FIG. 30, the slit 5e for producing the origin signal having a shape divided into four is disposed near a grating with a pitch P for detection of positional displacement. The structure of the slit 5e is such that when the uppermost slit is regarded as the reference, the second slit is deviated by −P/6, the third slit is deviated by L and the fourth slit is deviated by L−P/6. The first slit and the second slit form a pair, and the third slit and the fourth slit form a pair. It is to be understood that the second slit is named Za1, the first slit is named Za2, the fourth slit is named Zb1 and the third slit is named Zb2, and these are made to correspond to the phases of signals which will be described later.

Figure 31:
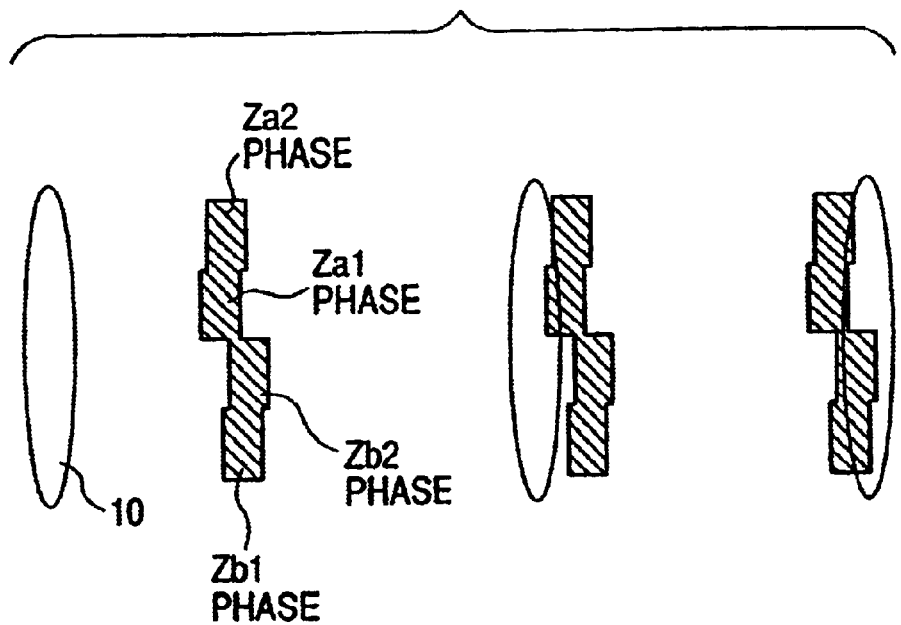
FIG. 31 shows the relation between a detection beam and the slit for producing the origin signal.

FIG. 31 shows the state of the light beam incident on the slit 5e, and reference numeral 10 designates the light beam condensed by the cylindrical lens 4. The light beam 10 for producing the origin signal is applied so as to substantially equal spread over the slits Za1, Za2, Zb1, Zb2 constituting the slit 5e. When the disc 3e is moved and as shown in FIG. 31, the slit for producing the origin signal is moved relatively to the beam irradiated position from left to right, the light beam reflected by the slit enters the sensor 6e which is a light receiving element. The sensor 6e is a four-division sensor corresponding to each of the slits for producing the origin signal which are divided into four, and outputs origin signals of Za1 phase, Za2 phase, Zb1 phase and Zb2 phase shown in FIG. 32.

Figure 32:
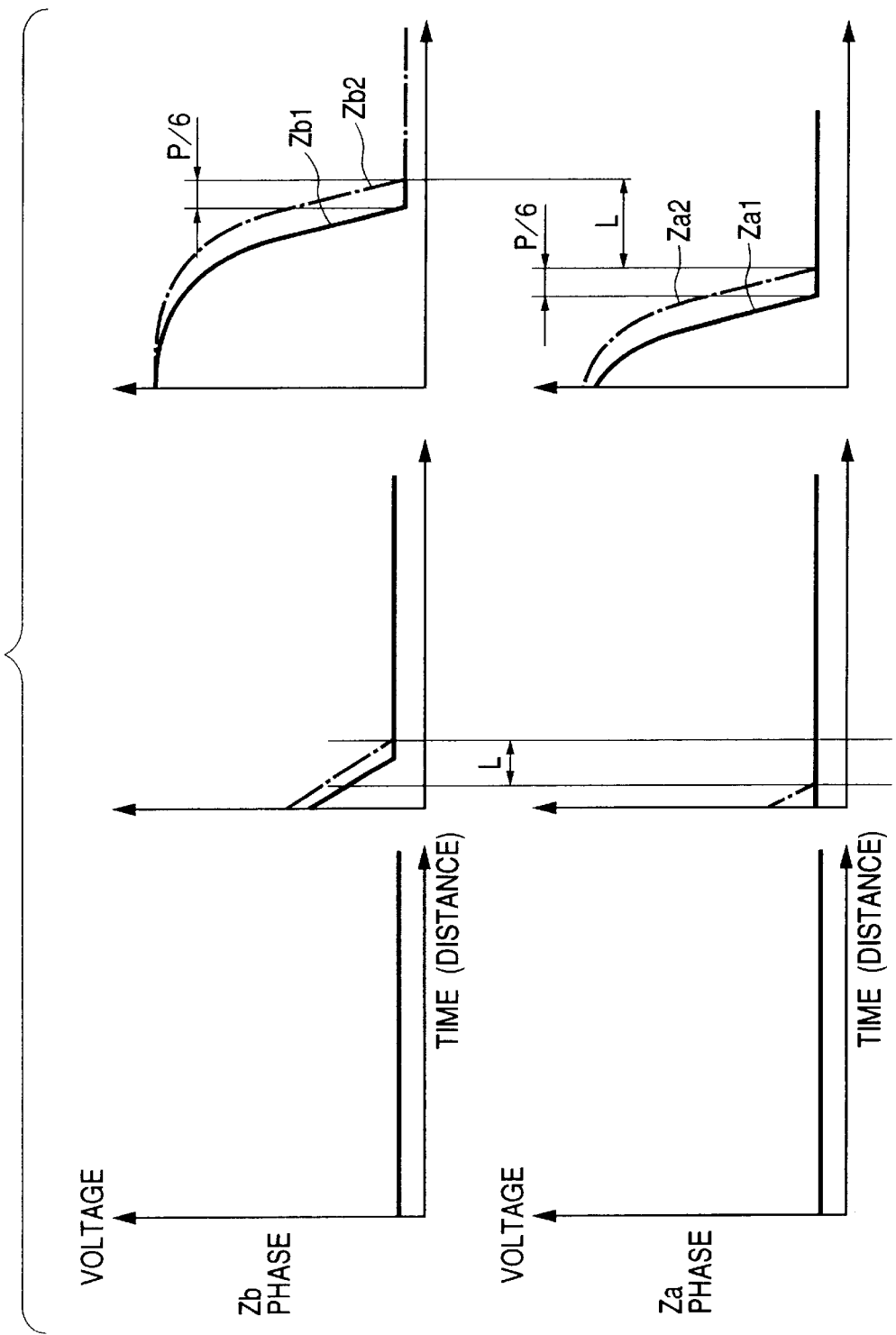
FIG. 32 shows signal outputs of Za1 phase to Zb2 phase.
Figure 33:
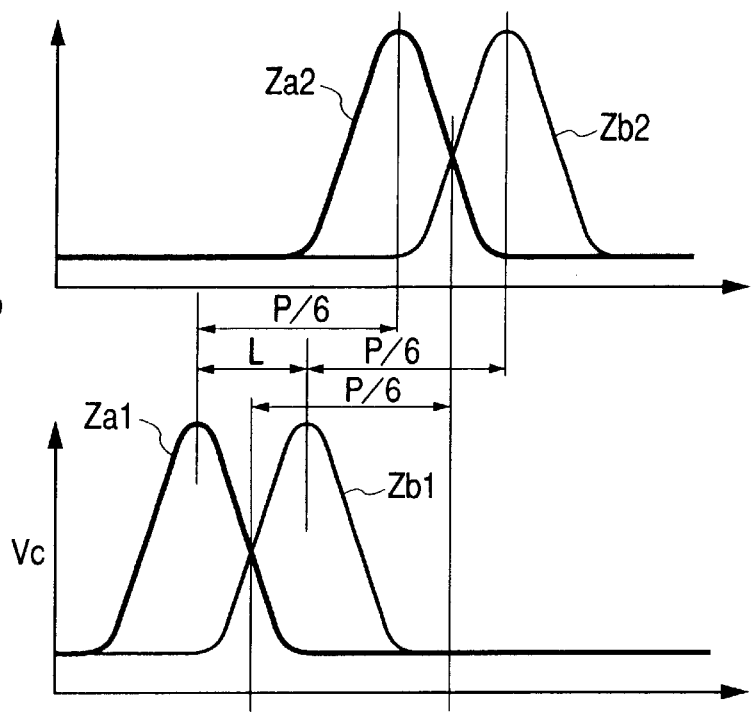
FIG. 33 shows the relative relation between the signals of Za1 phase to Zb2 phase.

From FIG. 32, the signals indicated by Za1 phase and Za2 phase and the signals indicated by Zb1 phase and Zb2 phase are signals deviated from each other by P/6 in terms of distance, and the signals indicated by Za1 phase and Zb1 phase and the signals indicated by Za2 phase and Zb2 phase become signals deviated from each other by L in terms of distance. When as shown in FIG. 33, in the four origin signals Za1, Za2, Zb1, Zb2, the differentials between Za1 phase and Zb1 phase and between Za2 phase and Zb2 phase are taken and a rectangular wave origin signal is made with a position at which the signal outputs of the two become equal to each other, there can be formed the Z signal of FIG. 34 in which the rectangular portion is P/6.

Figure 34:
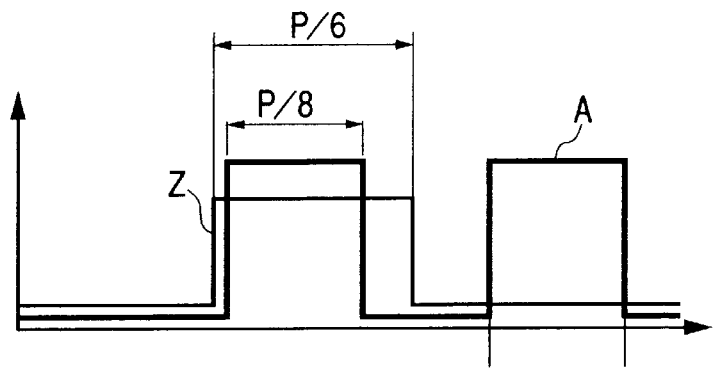
FIG. 34 shows Z signal of origin detection and the A signal of an incremental signal.
Figure 35:
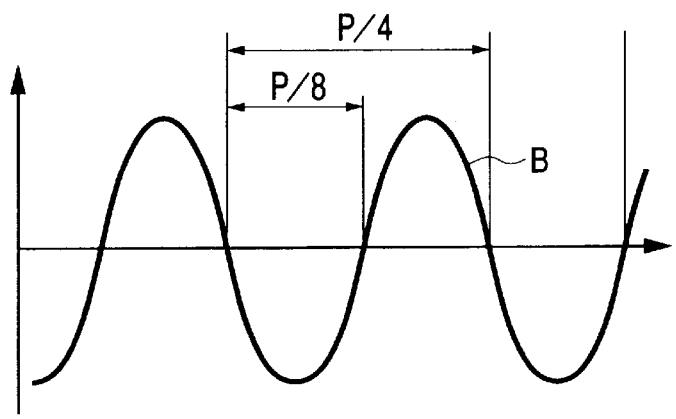
FIG. 35 shows the B signal of the incremental signal.

The incremental signal is taken out by a detecting system, not shown, on the basis of a principle similar to that of Japanese Patent Application Laid-Open No. 2-93324, and becomes an incremental signal B of a sine wave of ¼ of the grating pitch P as shown in FIG. 35. When a rectangular wave signal is made from the incremental signal B, it becomes A signal of which the rectangular portion is P/8 as shown in FIG. 34, and when the logic sum is taken by A signal and Z signal and this is newly made into an origin signal, the synchronism between the incremental signal which has become a rectangular wave signal and the origin signal can be taken.

The effect of Embodiment 7 is similar to that of Embodiment 1, but since the slit 5e for the reference is comprised of four portions, the original signal from which the rectangular wave signal Z is made can be made by the differential, as compared with Embodiment 1, and therefore, there is the effect that even if a variation in quantity of light occurs to the light source, outputting can always be done at a constant position and an origin signal of good accuracy is produced.

Figure 36:
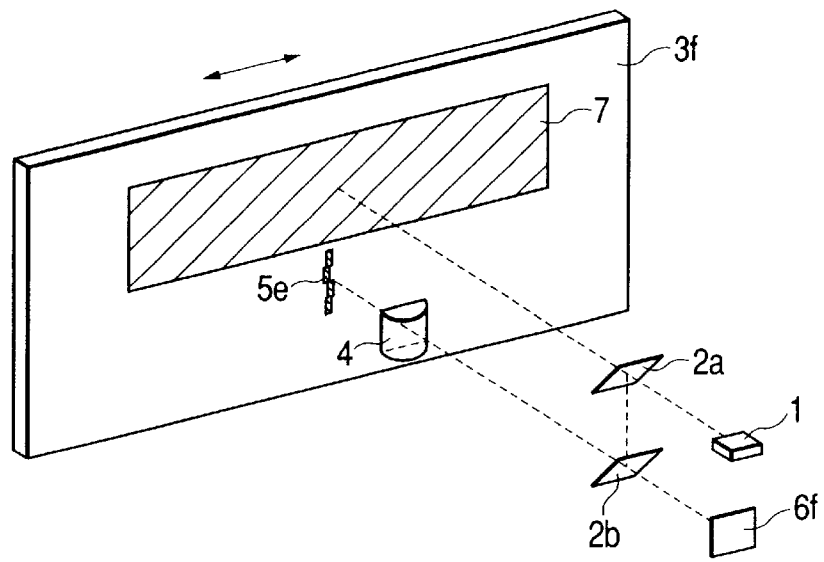
FIG. 36 shows the origin detecting system of a linear encoder according to Embodiment 8.
Figure 37:
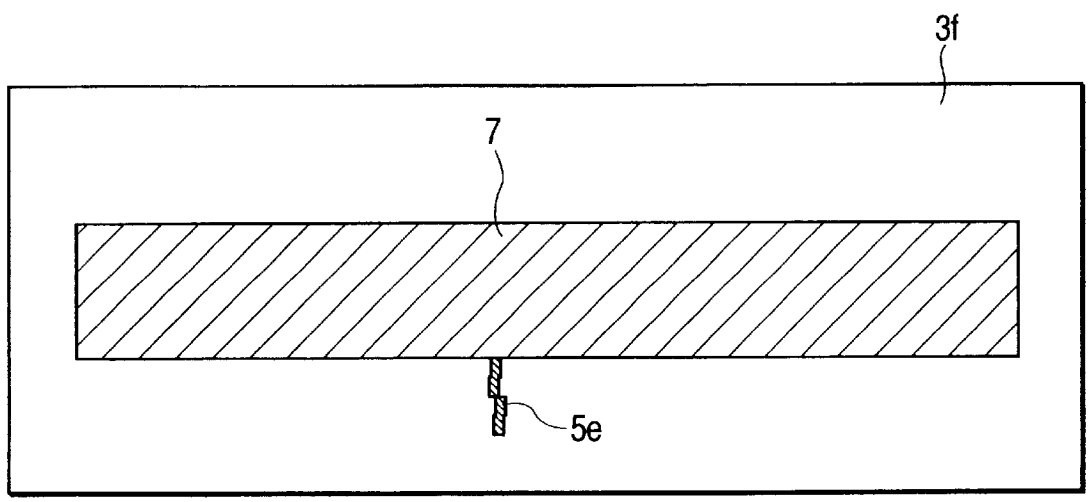
FIG. 37 shows the scale of the encoder used in Embodiment 8.

FIG. 36 shows the construction of the origin measuring sensor of an optical type linear encoder according to Embodiment 8 of the present invention. FIG. 37 shows a scale plate and a slit for producing an origin signal in Embodiment 8. For the convenience of description, the same constituent members as those in the previous embodiment are designated by the same reference characters.

In FIG. 36, reference numeral 1 designates a light-emitting element, reference numeral 2 denotes half mirrors, reference character 3f designates a scale provided with a grating for an incremental signal and a slit for producing an origin signal, reference numeral 4 denotes a cylindrical lens for condensing a light beam into a linear shape, reference character 5e designates a slit for producing an origin signal, reference character 6e denotes a light receiving element divided into four, and reference numeral 7 designates a grating portion for the incremental signal on the scale 3f.

A light beam emitted from the light-emitting element 1 has its optical path divided by the half mirrors 2a and 2b. The light beam transmitted through the half mirror 2a is directly directed toward the grating portion 7 for the incremental signal. The incremental signal detecting system is known and therefore is not shown. The light beam reflected by the half mirror 2a and further reflected by the half mirror 2b is incident on the cylindrical lens 4. The cylindrical lens 4 is disposed so that the lengthwise direction of the condensed light beam coincides with the lengthwise direction of the 5e for the origin.

The slit 5e for producing the origin signal in Embodiment 8 is of the same shape as that in Embodiment 7, and the shape of an irradiation beam formed by the cylindrical lens 4 is also of the same shape as that in Embodiment 7 and therefore, the mechanism of the subsequent signal generation and the signal processing system are the same as those in Embodiment 7. Accordingly, when the differential among four origin signals Za1, Za2, Zb1, Zb2 is taken to make a rectangular wave origin signal, there can be formed the Z signal of FIG. 34 in which the rectangular portion is P/6. Subsequently, when the logic sum of A signal having a rectangular portion of P/8 made from an incremental signal B of a sine wave of ¼ of the grating pitch P and Z signal is taken and this is newly made into an origin signal, the synchronism between the incremental signal which has become a rectangular wave signal and the origin signal can be taken.

The effects obtained by the embodiment 8 is same as those in the embodiment 2. On the other hand, according to the embodiment 8, since the slit for producing the origin signal is composed of four segments and the signals by which the rectangular wave signal Z is produced can be made by the differential, there are obtained effects that the output can be always executed at a fixed position even in case of change in light amount of the light source and quite precise origin signal can be produced.

Figure 38:
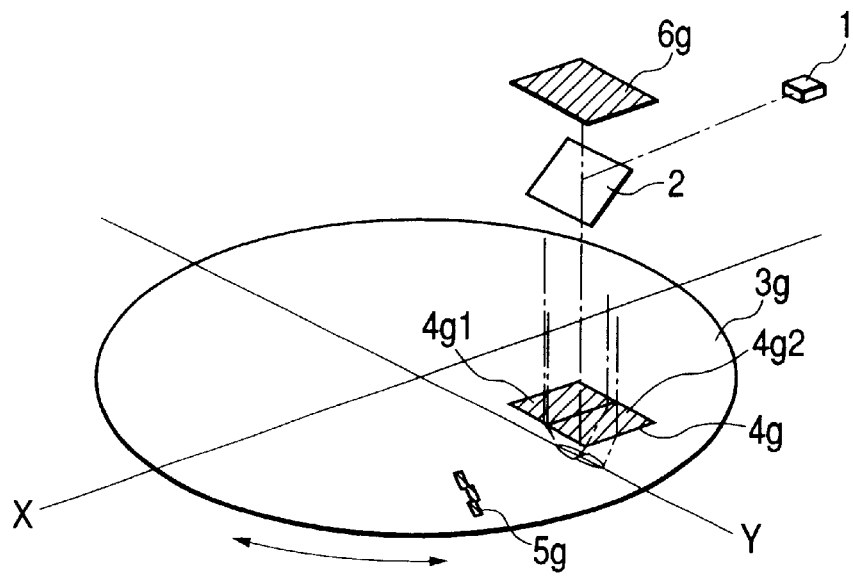
FIG. 38 shows the origin detecting system of a linear encoder according to Embodiment 9.
Figure 39:
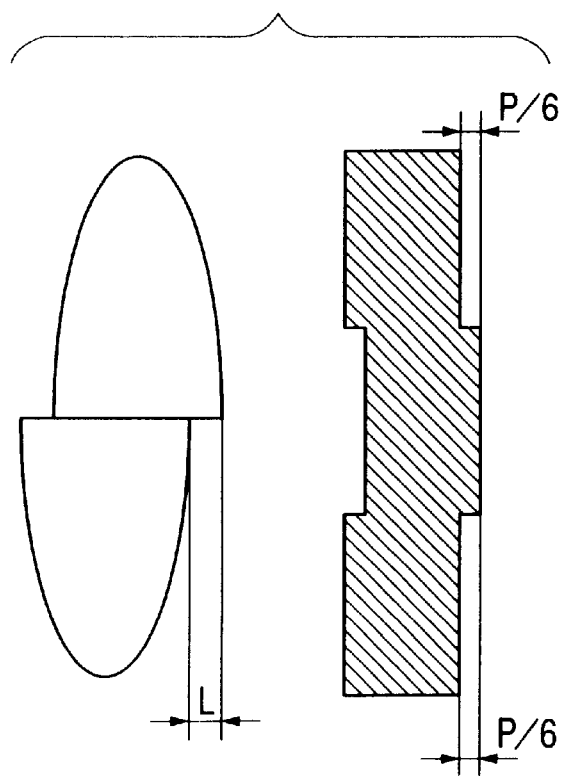
FIG. 39 shows the relation between a detection beam and a slit for producing an origin signal.

FIG. 38 shows the construction of the origin measuring sensor of an optical type rotary encoder according to Embodiment 9 of the present invention. FIG. 39 shows a slit for producing an origin signal and a light beam applied to the slit, and for the convenience of description, the same constituent members as those in the previous embodiment are designated by the same reference characters. The grating portion 7 is arranged similarly to that shown in FIG. 21, and so, not shown.

In FIG. 38, reference numeral 1 designates a light-emitting element, reference numeral 2 denotes a half mirror, reference character 3g designates a disc provided with a grating for an incremental signal and a slit for producing an origin signal, reference character 4g denotes a dividing Fresnel lens for condensing a light beam into two linear beams, reference character 5g designates a slit for producing an origin signal, reference character 6g denotes a light receiving element divided into four, and reference numeral 7 designates a grating portion for the incremental signal on the disc 3g.

A light beam emitted from the light-emitting element 1 is bent by the half mirror 2, and is incident on the dividing Fresnel lens 4g. The dividing Fresnel lens 4g is comprised of two Fresnel lenses 4g1 and 4g2 having the action of a cylindrical lens, and forms a light beam extending in the same direction as the lengthwise direction of the slit 5g for producing the origin signal at the position of this slit 5g. The Fresnel lenses 4g1 and 4g2 condense light beams with a deviation of L therebetween in a direction perpendicular to the lengthwise direction of the slit 5g, and are disposed so that the light beams are applied to the whole of the slit 5g for detecting the origin. The dividing Fresnel lens 4g may also be comprised of a dividing cylindrical lens.

The slit 5g for producing the origin signal is of a shape divided into three. When as shown in the uppermost slit is regarded as the reference, the disposition is such that the second slit is shifted by P/6 and the third slit is returned to the same position as the uppermost slit. Although divided into three, the central portion works as the common portion of Za phase and Zb phase in Embodiment 7, and is a slit equivalently divided into four. That is, the uppermost slit of the slit for producing the origin signal corresponds to Za2 phase, the central slit corresponds to Za1 phase and Zb2 phase, and the lowermost portion corresponds to Zb1 phase, and the sensor 6g divided into four is also disposed so as to correspond to Za1, Za2, Zb1, Zb2 phases in conformity with the equivalent division of the divided slit.

Signals of Za1, Za2, Zb1, Zb2 phases obtained from the four-division sensor 6g are shown in FIG. 32, and the subsequent signal processing can be effected in accordance with FIGS. 33 to 35. It is the effect of the applied light divided into two that the three-division slit equivalently becomes a four-division slit and the origin signal as shown in FIG. 34 can be produced. There is also the effect that the slit for producing the origin signal may be of a three-division and therefore manufacture is easy and the alignment during assembly is also easy.

Figure 40:
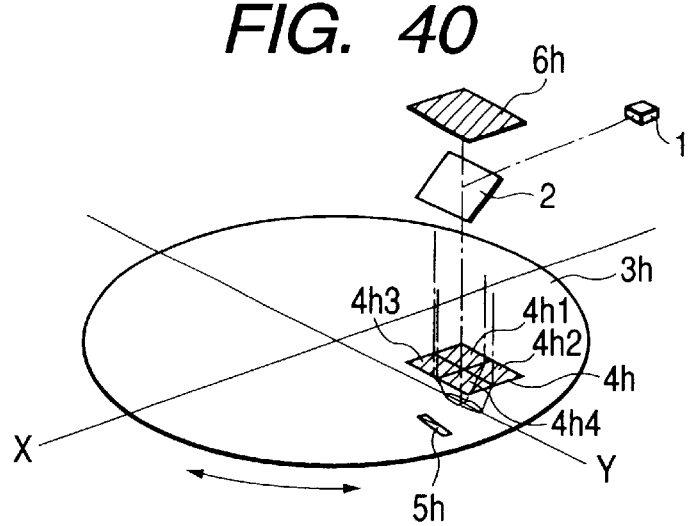
FIG. 40 shows the origin detecting system of a linear encoder according to Embodiment 10.
Figure 41:
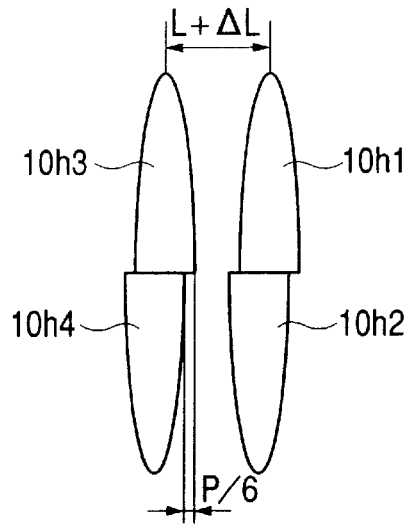
FIG. 41 shows the shape of a detection beam in Embodiment 10.

FIG. 40 shows the construction of the origin measuring sensor of an optical type rotary encoder according to Embodiment 10 of the present invention. FIG. 41 shows two slits for producing an origin signal and a four-division light beam applied to the slits, and for the convenience of description, the same constituent members as those in the previous embodiment are designated by the same reference characters. The grating portion 7 is arranged similarly to that shown in FIG. 21, and so, not shown.

In FIG. 40, reference numeral 1 designates a light-emitting element, reference numeral 2 denotes a half mirror, reference character 3h designates a disc provided with a grating for an incremental signal and a slit for producing an origin signal, reference character 4h denotes a dividing Fresnel lens for condensing a light beam into four linear beams, reference numeral 5h designates a slit for producing an origin signal, reference numeral 6h denotes a light receiving element divided into four, and reference numeral 7 designates a grating portion for the incremental signal on the disc 3h.

A light beam emitted from the light-emitting element 1 is bent by the half mirror 2, and is incident on the dividing Fresnel lens 4h. The dividing Fresnel lens 4h is comprised of four Fresnel lenses 4h1, 4h2, 4h3 and 4h4 having the action of a cylindrical lens, and forms a light beam extending in the same direction as the lengthwise direction of the slit 5h for producing the origin signal at the position of this slit 5h. The dividing Fresnel lens may also be comprised of a dividing cylindrical lens.

The Fresnel lenses 4h1, 4h2, 4h3 and 4h4, correspondingly thereto, form light beams 10h1, 10h2, 10h3 and 10h4 so as to be applied to the whole of the slit 5h for producing the origin signal. The light beams 10h1 and 10h2 form a pair and the light beams 10h3 and 10h4 form a pair, and they have a deviation of P/6 in a direction perpendicular to the lengthwise direction of the light beams. Also, the light beams 10h1 and 10h3 form a pair and the light beams 10h2 and 10h4 form a pair, and they have a deviation of L+ΔL in a direction perpendicular to the lengthwise direction of the light beams.

The slit 5h for producing the origin signal is of a simple construction comprising a line.

The light beam 10h1 corresponds to a signal of phase Za1, the light beam 10h2 corresponds to a signal of Za2 phase, the light beam 10h3 corresponds to a signal of Zb1 phase, and the light beam 10h4 corresponds to a signal of Zb2 phase, and the signals of Za1, Za2, Zb1, Zb2 phases obtained from the four-division sensor 6h are shown in FIG. 32. The subsequent signal processing is the same as that shown in FIGS. 33 to 35. In the present embodiment, the slit for detecting the origin may be a simple line, and this leads to the effect that manufacture is easy and the alignment during assembly is also easy.

Figure 42:
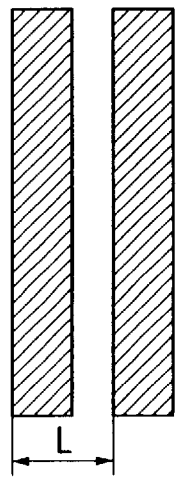
FIG. 42 shows slits for producing an origin signal in a modification of Embodiment 10.

As a modification of the present embodiment, the four-division Fresnel lens may be comprised of only two-division Fresnel lenses 4h1 and 4h2 and the light beams 10h1 and 10h2 may be formed, and as shown in FIG. 42, a slit 5h' for producing the origin signal may be comprised of two lines spaced apart by a distance L from each other.

Figure 43:
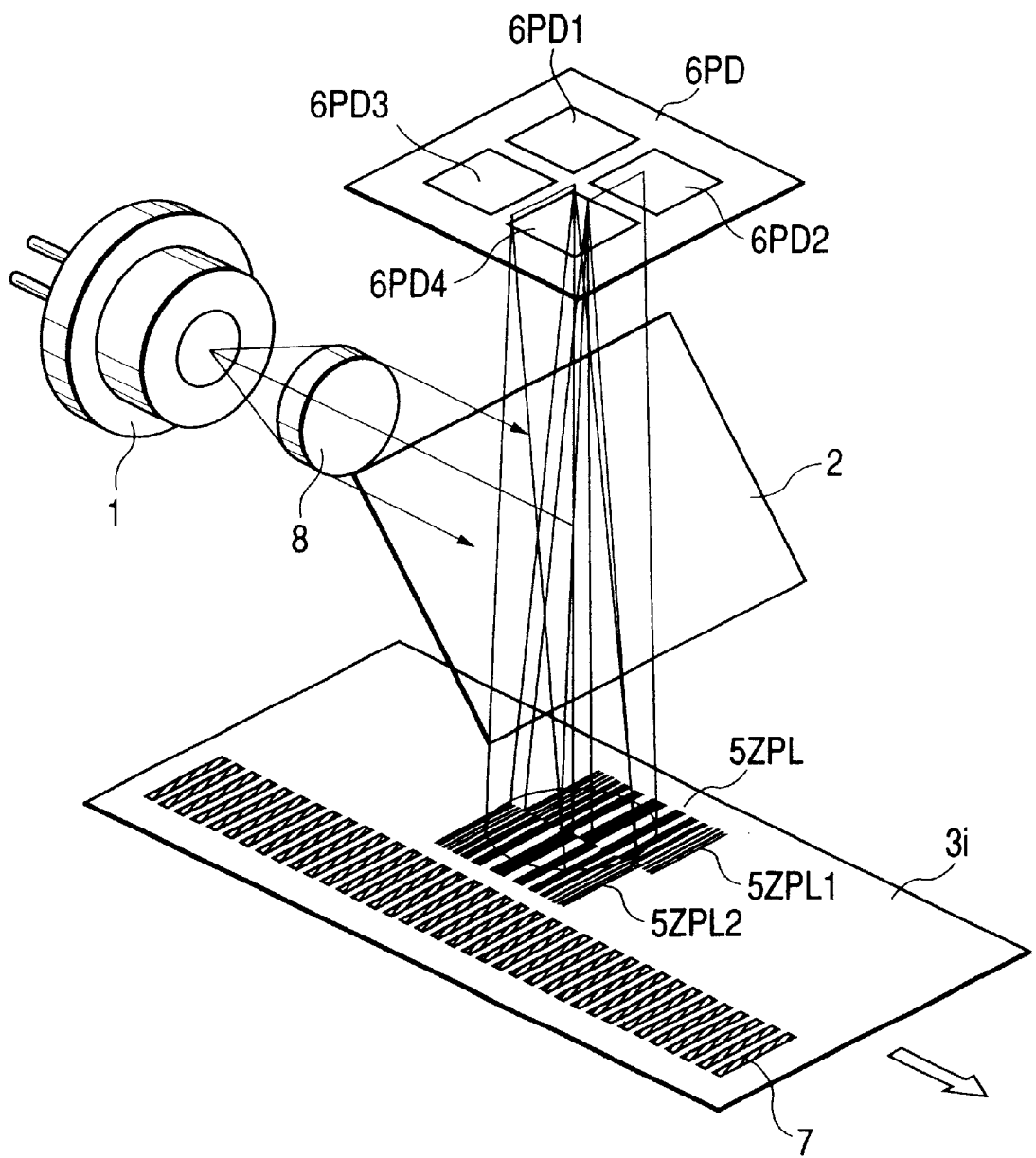
FIG. 43 shows the origin detecting system of a rotary encoder according to Embodiment 11.

FIG. 43 shows the construction of the origin measuring sensor of a liner encoder according to Embodiment 11 of the present invention. For the convenience of description, the same constituent members as those in the previous embodiment are designated by the same reference characters.

In FIG. 43, reference numeral 1 designates a light-emitting element which is a monochromatic light source, reference numeral 8 denotes a collimator lens, reference numeral 2 designates a half mirror, reference character 3i denotes a scale provided with a grating for an incremental signal and a diffraction lens for producing an origin signal, reference character 5ZPL designates a diffraction lens for detecting the origin signal, reference character 6PD denotes a light receiving element, and reference numeral 7 designates a grating portion for the incremental signal on the scale 3i.

A divergent light beam emitted from the light source 1 is made into a substantially parallel light beam by the collimator lens 8, is reflected by the half mirror 2 and is applied to a track on the diffraction lens 5ZPL for producing the origin signal formed on the scale 3i. The diffraction lens 5ZPL comprises two diffraction lenses 5ZPL1 and 5ZPL2, and is provided with reflecting film on an uneven phase grating on a transparent substrate so as to function as a reflection type diffraction grating. If by the movement of the scale, the diffraction lenses 5ZPL1 and 5ZPL2 are present in an irradiated area, a reflected condensed light beam will be created and the irradiating light will travel in the direction of the original optical path thereof.

The two diffraction lenses 5ZPL1 and 5ZPL2 are spatially deviated relative to the direction of movement of the scale 3i. The diffraction lenses 5ZPL1 and 5ZPL2 are integrally moved as a whole and therefore are moved in the space while their condensing positions keep a constant interval therebetween. In the embodiment FIG. 43, the diffraction lens 5ZPL is of a construction having the effect of a cylindrical lens and therefore, the irradiating light beam is linearly condensed at a focus position, but if it is made into the construction of a circular ring-shaped diffraction lens, a point-like condensed pattern can be obtained.

In the present embodiment, four light receiving elements 6PD1, 6PD2, 6PD3 and 6PD4 are disposed in a space through which the condensed light beams by the diffraction lenses 5ZPL1 and 5ZPL2 pass with the movement of the scale 3i. The light receiving elements 6PD1 and 6PD2 are arranged side by side in the direction of movement of the condensed light beam from the diffraction lens 5ZPL1, and the gap between the light receiving elements is set so as to be sufficiently smaller than the diameter (width) of the condensed light beam. In the construction of FIG. 43, the pair of light receiving elements 6PD1 and 6PD2 and the pair of light receiving elements 6PD3 and 6PD4 are disposed adjacent to each other and therefore, a light receiving element packaged as a four-division light receiving element can be used.

Since as previously described, the two reflecting diffraction lenses 5ZPL1 and 5ZPL2 formed on the scale 3i are deviated relative to each other, the condensed light beam detected by the light receiving elements 6PD1 and 6PD2 and the condensed light beam detected by the light receiving elements 6PD3 and 6PD4 deviate from each other by the amount of deviation between the reflecting diffraction lenses.

Figure 44:
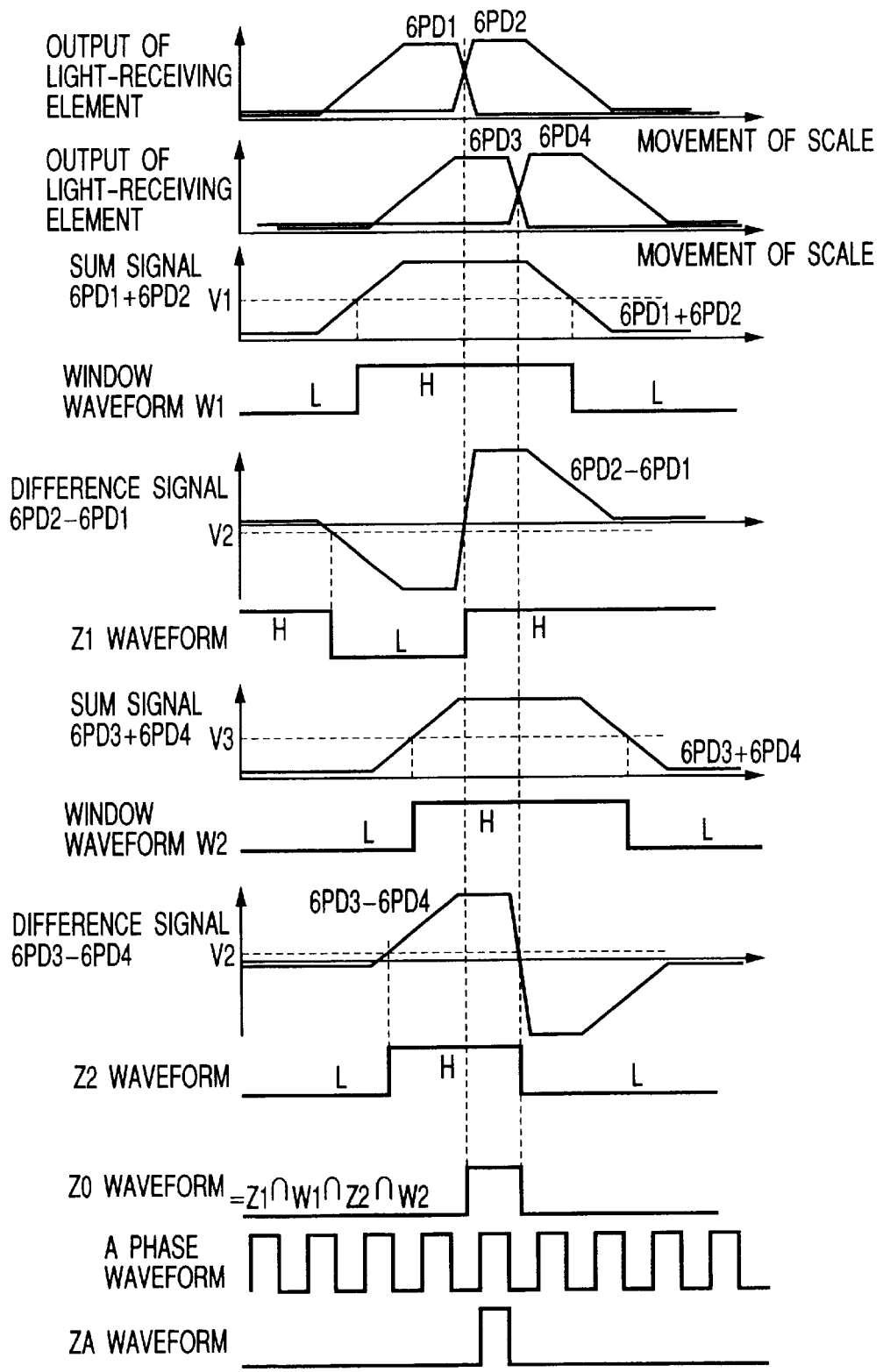
FIG. 44 shows the signal outputs and processing waveforms of Embodiment 11.

FIG. 44 shows the output of each light receiving element resulting from the movement of the scale 3i.

When the scale 3i is moved, a light beam first enters the light receiving element 6PD1. When the movement further continues, the quantity of light incident on the light receiving element 6PD1 decreases and the incidence of the light on the light receiving element 6PD2 begins, and the light receiving elements 6PD1 and 6PD2 become equal to each other and next, the quantity of light incident on the light receiving element 6PD2 becomes maximum.

The outputs of the light receiving elements 6PD3 and 6PD4 follow similar progress, but in the light receiving elements 6PD1, 6PD2 and the light receiving elements 6PD3, 6PD4, it is a feature that the timings of their output deviate from each other.

Figure 45:
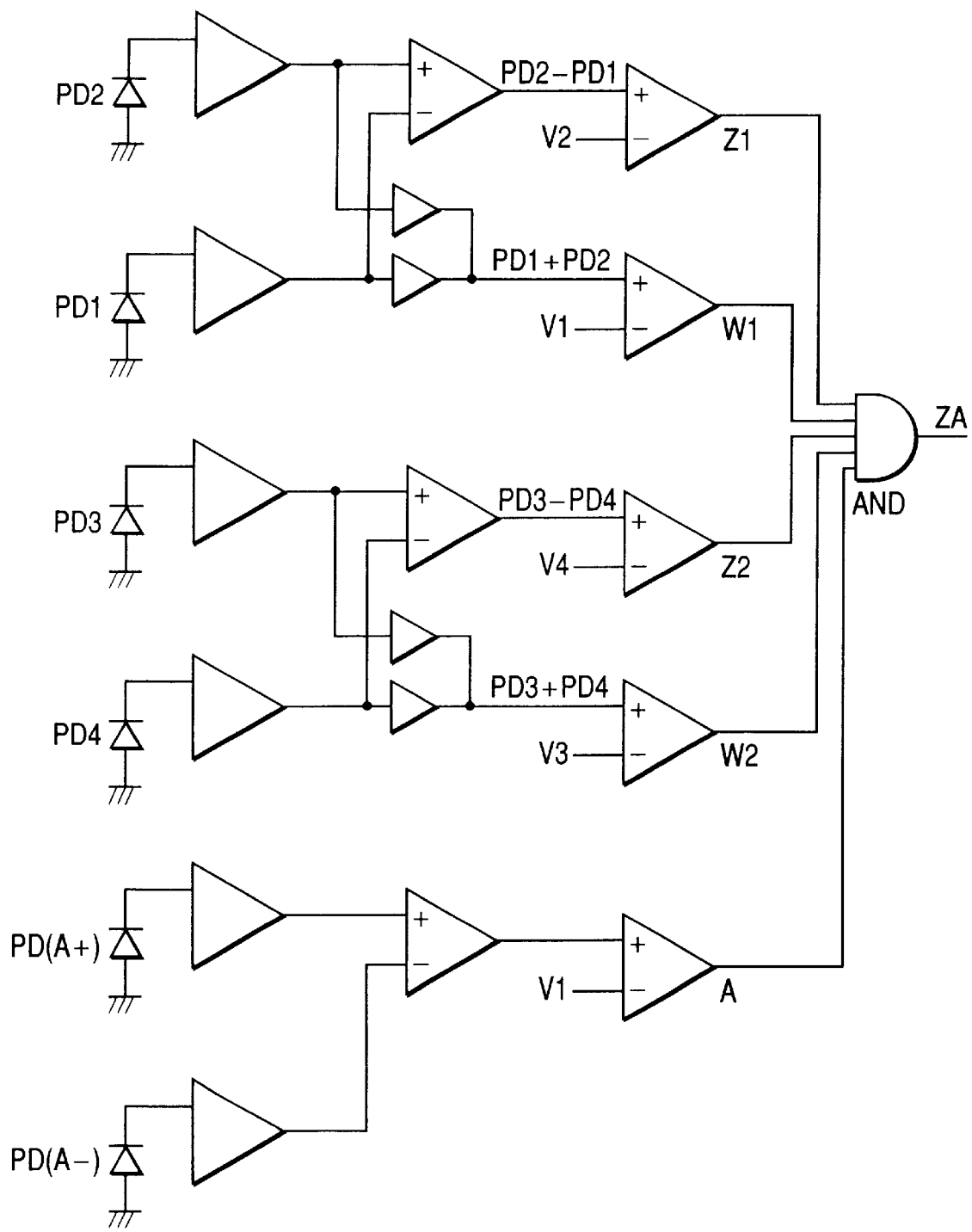
FIG. 45 shows an origin signal producing processing circuit in Embodiment 11.

The signals from the light receiving elements 6PD1, 6PD2, 6PD3 and 6PD4 are converted into digital signals by the processing circuit of FIG. 45.

The outputs of the light receiving elements 6PD1 and 6PD2 are added to each other (averaged) and converted into a mountain-shaped waveform by an operational amplifier OP1, whereafter a window waveform W1 is made by reference potential V1. Also, an operational amplifier OP2 outputs a difference signal between the light receiving elements 6PD1 and 6PD2, and a differential binary waveform Z1 is made with a cross voltage V2 as the reference.

Likewise, the outputs of the light receiving elements 6PD3 and 6PD4 are added to each other (averaged) and converted into a mountain-shaped waveform by an operational amplifier OP3, whereafter a window waveform W2 is made by reference potential V3. Also, an operational amplifier OP4 outputs a difference signal between the light receiving elements 6PD3 and 6PD4, and a differential binary waveform Z2 is made with a cross voltage V4 as the reference.

The present embodiment is directed to make an origin signal waveform having a width equal to that of an incremental signal waveform of high resolving power and synchronized therewith and therefore, the timing of the cross between the light receiving elements 6PD1 and 6PD2 and the timing of the cross between the light receiving elements 6PD3 and 6PD4 are set so as to correspond to nearly a period of the incremental signal. When the logic sum (AND) of all of the converted outputs Z1, W1, Z2 and W2 is calculated, there is made a waveform ZO linking the timings of the two crosses (cross points) together. The width of the waveform ZO is a width substantially equal to that of A phase signal of the incremental signal, and an A phase signal pulse is contained in a width of ZO. ZO is an origin signal generating position area which outputs the origin signal.

The encoder may intactly output ZO as the origin signal, and may further output a waveform ZA taking the logic sum of the incremental A phase signal and the ZO signal.

In the present embodiment, the detection of the two cross point positions by the two diffraction lenses can be done, and an origin signal Z or ZA synchronized with the incremental signal (A phase) of high resolving power can be made by the subsequent processing circuit. The mutual position adjustment of the cross points prescribing the two edges of the origin signal ZO and the incremental signal (A phase) can be effected by adjusting the relative position of the entire package of the light receiving elements 6PD.

In FIG. 43 showing Embodiment 11, there has been shown a construction in which a reflected condensed light beam is created by the diffraction lens 6PD and is detected by the light receiving elements disposed on the light source side through the half mirror, but a construction in which the diffraction lens is made into a transmitting type can also be realized easily. In the case of the diffraction lens of the transmitting type, uneven phase grating structure is provided on a transparent substrate, and the light receiving elements are disposed on the side opposite to the light source. With regard to the subsequent detection and processing, the same process as that in the reflection type can be adopted.

The present embodiment can be applied not only to a linear encoder, but also to a rotary encoder. Also, a substantially parallel light beam can be applied onto the scale or the disc to thereby detect the origin signal with high resolving power and therefore, as compared with the type in which a light beam is condensed on the scale or the disc, there is the effect that a construction which is strong in an error in the direction of gap can also be adopted.

In the encoders described above, basically two or more detection signals are utilized to determine the pulse signal, and this leads to the feature that the reproducibility of the two edges of a signal having origin information is good and it is easy to form a minute signal.

Particularly in a construction wherein four signals are generated and a signal having origin information is made from the differential signal of these four signals, the stability of environment becomes good without being affected by any fluctuation in the quantity of light of the light source and it becomes possible to more easily take synchronism with the incremental signal.

Figure 46:
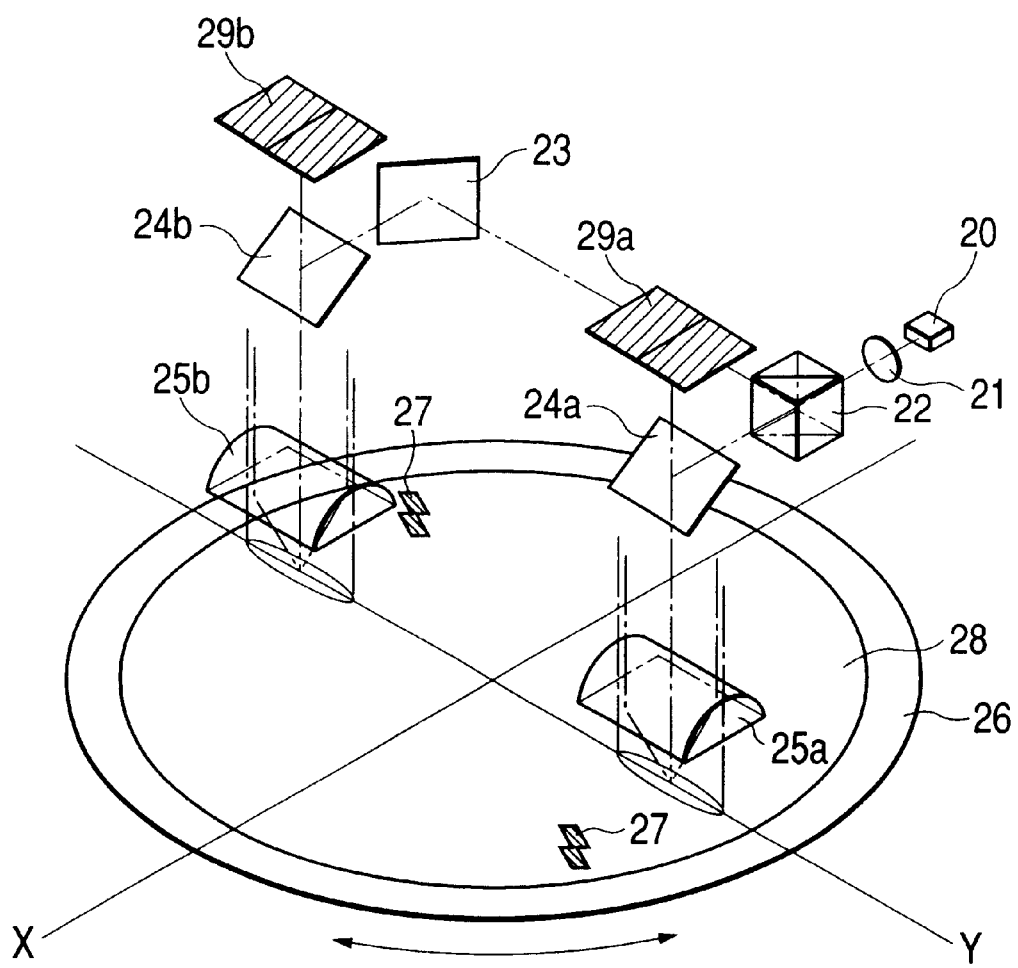
FIG. 46 is a perspective view of an optical type rotary encoder according to Embodiment 12.
Figure 47:
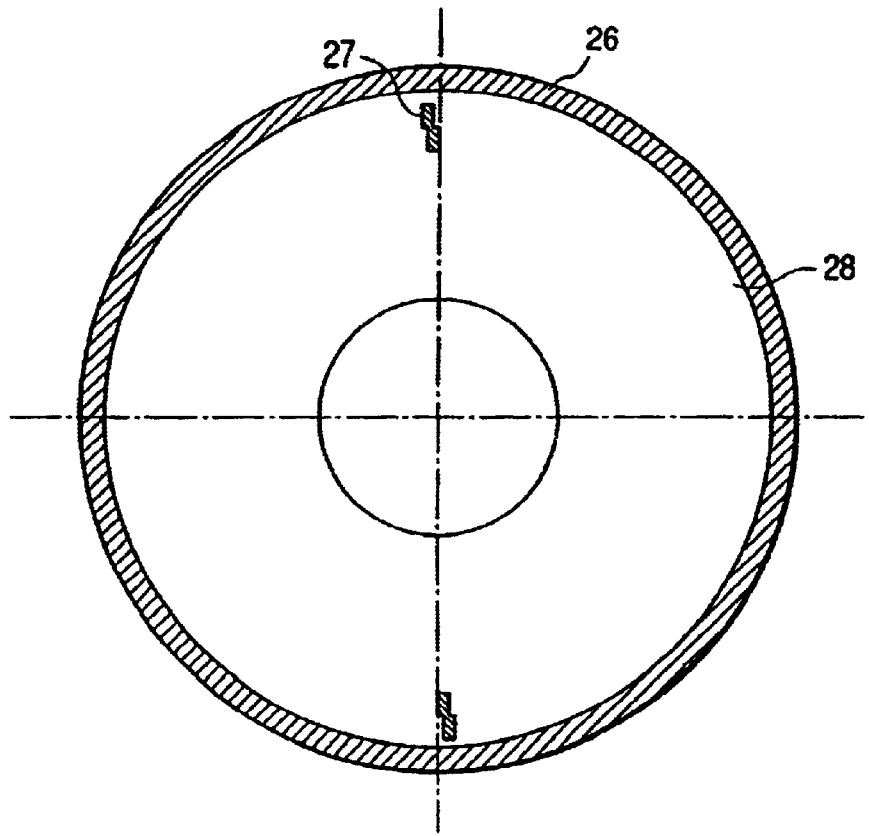
FIG. 47 is a plan view of a disc.

Referring now to FIG. 46 which is a perspective view of an origin detecting apparatus according to Embodiment 12 of the present invention, a collimator lens 21 and a beam splitter 22 are arranged forwardly of a light emitting element 20, and a mirror 23 is disposed in the direction of reflection of the beam splitter 22. Half mirrors 24a and 24b are disposed in the direction of transmission of the beam splitter 22 and the direction of reflection of the mirror 23, respectively, and cylindrical lenses 25a and 25b are disposed in the directions of reflection of these half mirrors 24a and 24b. A disc 28 formed with radially arranged gratings 26 for a rotational displacement signal and slits 27 for detecting the origin, as shown in FIG. 47, are disposed in the directions of transmission of the cylindrical lenses 25a and 25b. Two-division sensors 29a and 29b comprising two light receiving element for receiving light beams reflected by the slits 27 are disposed above the half mirrors 24a and 24b, respectively.

A light beam emitted from the light emitting element 20 is made into a parallel light beam by the collimator lens 21, and is incident on the beam splitter 22. In the beam splitter 22, the light beam is divided into two, and one light beam is directed to the half mirror 24a and is bent by the half mirror 24a, and is incident on the cylindrical lens 25a. The other light beam is reflected by the mirror 23, and is further bent by the half mirror 24b and is incident on the cylindrical lens 25b.

Figure 48:
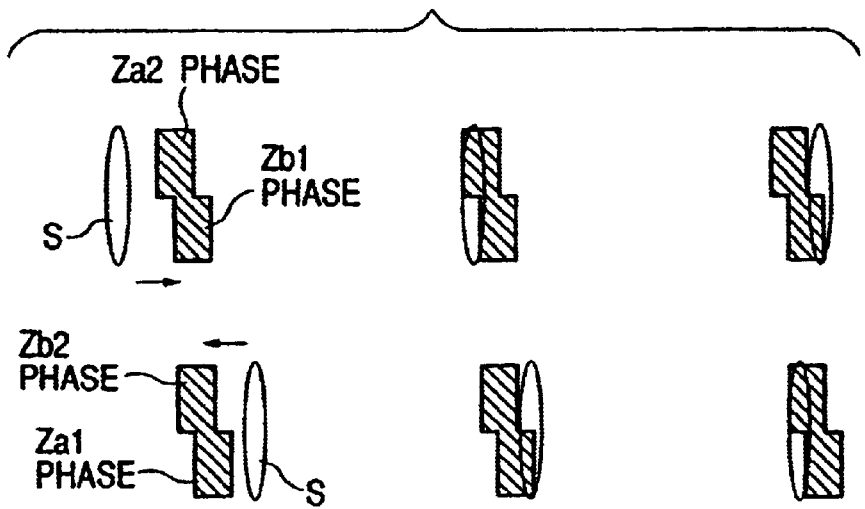
FIG. 48 is an illustration of the position relation between a slit and a light beam.
Figure 49:
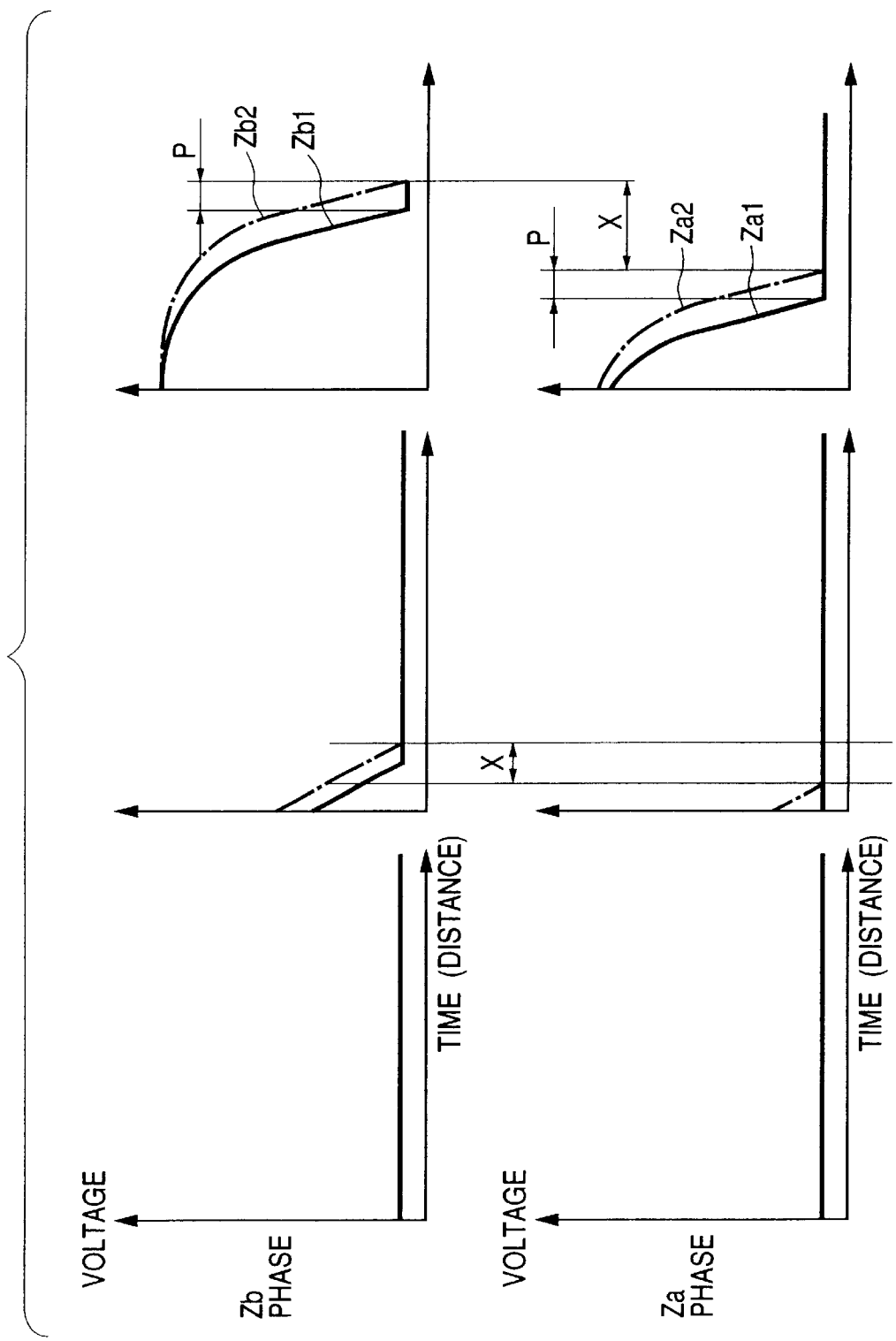
FIG. 49 is a graph of the outputs of a two-division sensor.

By the cylindrical lenses 25a and 25b, the light beams are condensed on the side on which the slits 27 for detecting the origin are formed and arrive at the disc 28. When the disc 28 is rotated and as shown in FIG. 48, the slits 27 come to the applied positions of the light beams S, the light beams S are reflected by the slits 27 and again return along the cylindrical lenses 25a, 25b and the half mirrors 24a, 24b, and are imaged on the two-division sensors 29a and 29b. origin outputs as shown in FIG. 49 which corresponds to FIG. 48 are obtained from the two-division sensors 29a and 29b.

Figure 50:
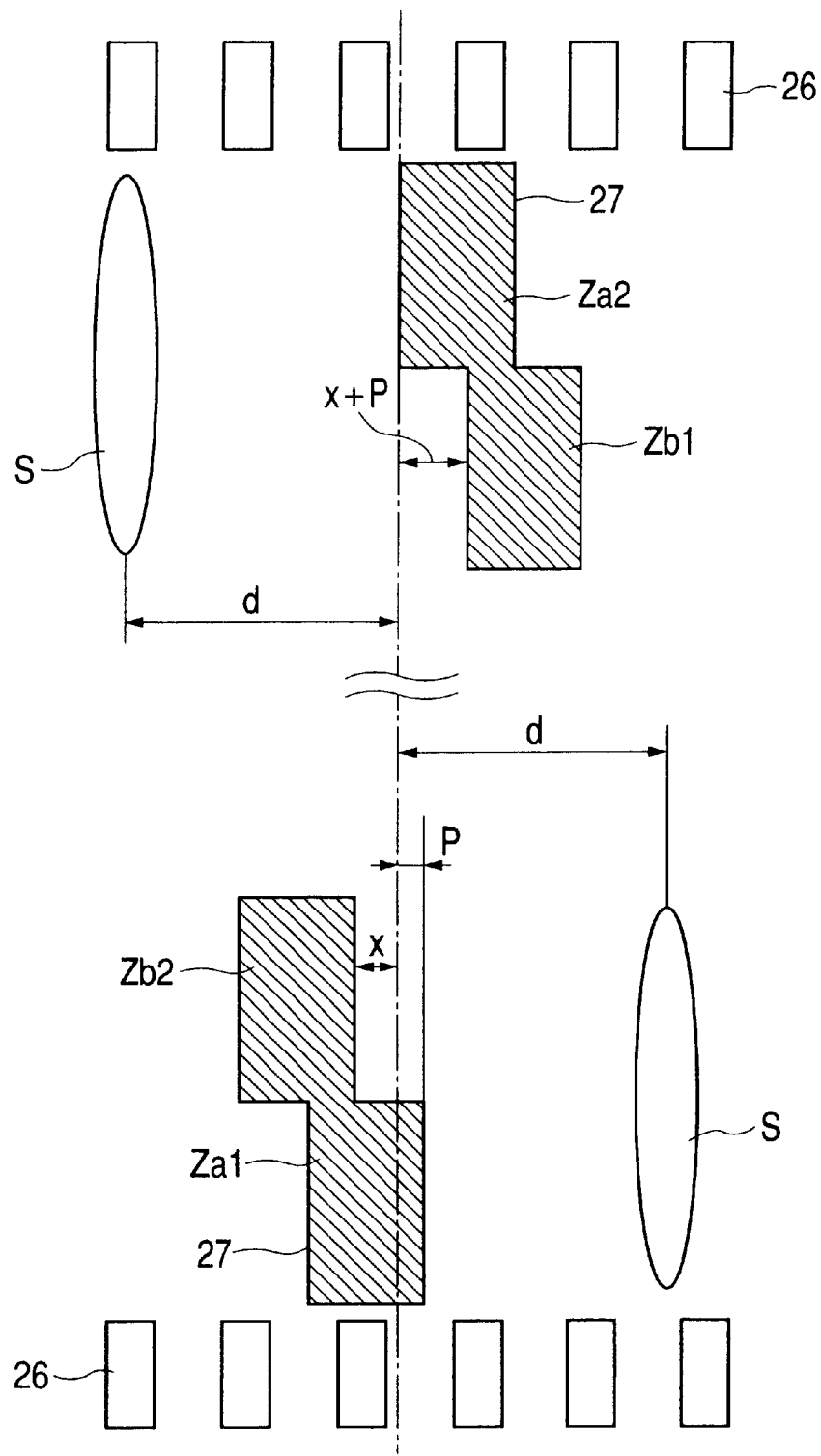
FIG. 50 is an illustration of slits for detecting the origin and gratings for a rotational displacement signal.

The slits 27 for detecting the origin are divided into two as shown also in FIG. 50, and marks lying on the same side are disposed at diagonal positions with a deviation of X±P therebetween. Here, X is an arbitrary length, and P is the length of a period of the rotational displacement signal. Accordingly, two marks Za1 and Zb1 for determining the position of the origin signal are disposed with a deviation of the length X relative to the respective light beams, and marks Za2 and Zb2 are also disposed with a deviation of the length X relative to the respective light beams. The marks Za1 and Za2 and the marks Zb1 and Zb2 are disposed with a deviation of the length P therebetween relative to a segment passing through the center of the disc 28.

Figure 51A:
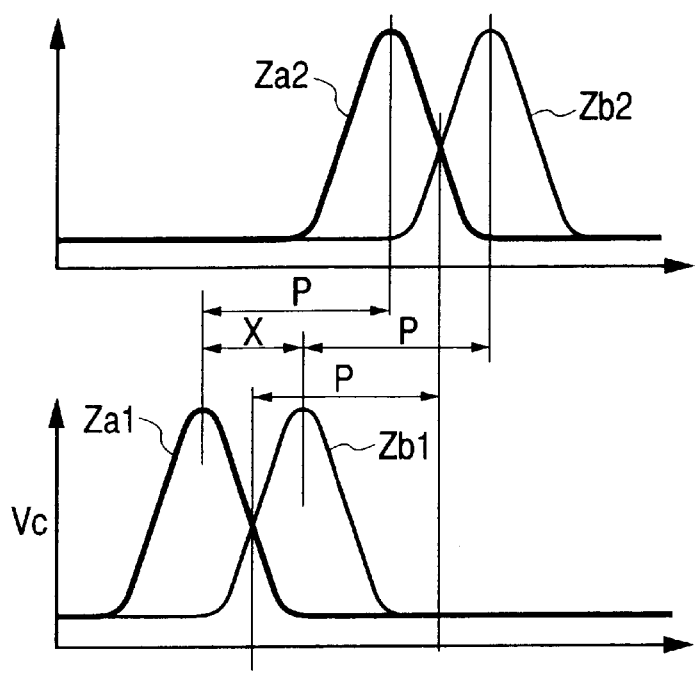
FIGS. 51A, 51B and 51C are graphs of output signals.

When the light beams from the cylindrical lenses 25a and 25b irradiate the slits 27, if the light beams S irradiating these marks Za1 to Zb2 are on the diagonal, those light beams are received by each two light receiving elements of the two-division sensors 29a and 29b, whereby there are obtained four signals of Za1 phase, Za2 phase, Zb1 phase and Zb2 phase having phase shifts X and P as shown in FIG. 51A.

Figure 51B:
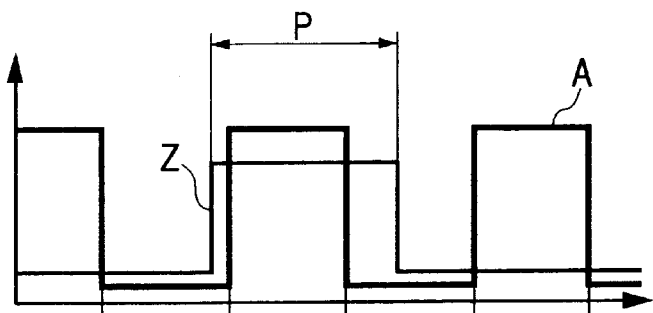
Figure 51C:
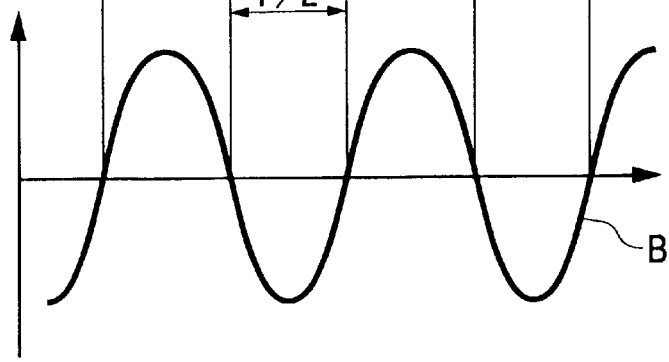

Here, when a rectangular wave origin signal is made by the use of these four origin position signal Za1 phase, Za2 phase, Zb1 phase, Zb2 phase, it becomes Z signal of which the rectangular portion is P as shown in FIG. 51B, and becomes A signal as when a rectangular wave signal is made from a rotational displacement signal B shown in FIG. 51C. By taking the theoretical sum of these A signal and Z signal, synchronism can be taken between the rotation displacement signal which is a rectangular wave signal and the origin signal.

Figure 52:
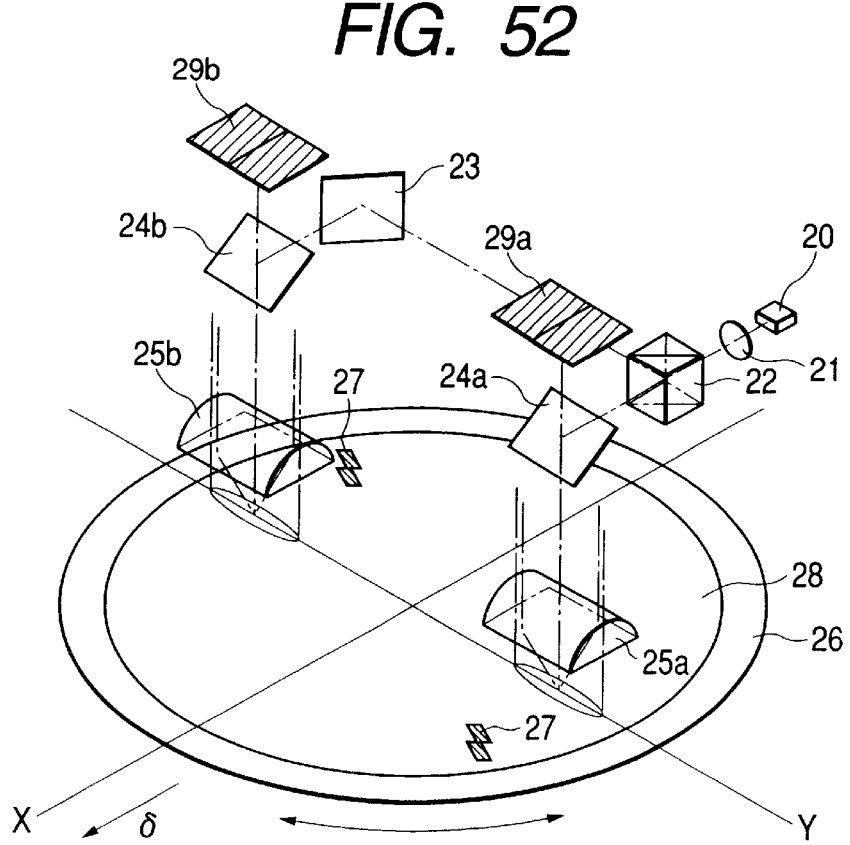
FIG. 52 is a perspective view of the eccentricity of a disc.
Figure 53:
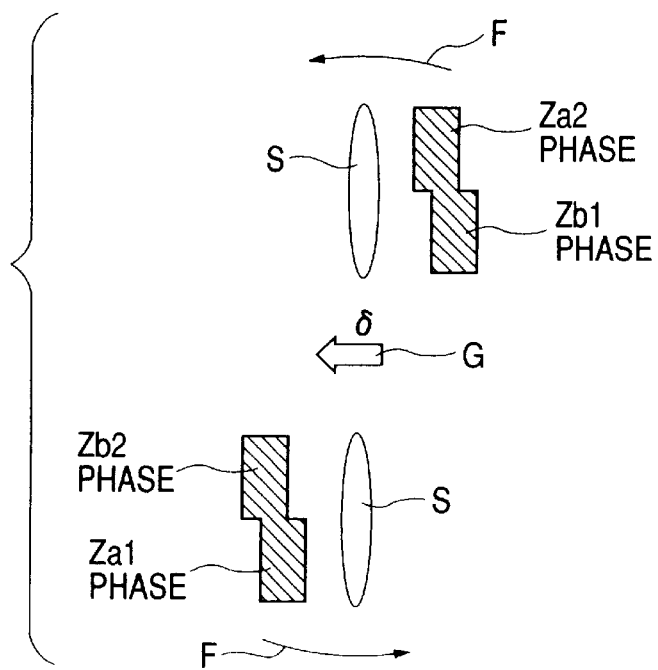
FIG. 53 is an illustration of the positional relation between an origin mark and a light beam.

FIGS. 52 and 53 show a case where a positional deviation such as eccentricity has occurred to the disc 28 by δ, for example, in the direction of the X-axis, and the outputs from Za2 phase and Zb1 phase, as compared with the origin signal when the disc is not eccentric, are put out with an advance of δ relative to the angle of rotation, while on the other hand, Za1 phase and Zb2 phase are outputted likewise with a delay. In FIG. 54A, the solid line represents the output before the disc 28 becomes eccentric, and the dotted line represents the output when the disc 28 is eccentric. As can be seen from this, by using a mark in which a set of signals are diagonally disposed in order to determine the rising or falling position of the rectangular wave signal of the origin output, the two signals in the one set move by a distance δ in just opposite directions. As the result, the position of the point of intersection between the signals which determine the rising or falling of this rectangular wave origin signal comes not to fluctuate as shown in FIGS. 54B and 54C, and a stable origin signal is obtained.

Figure 1:
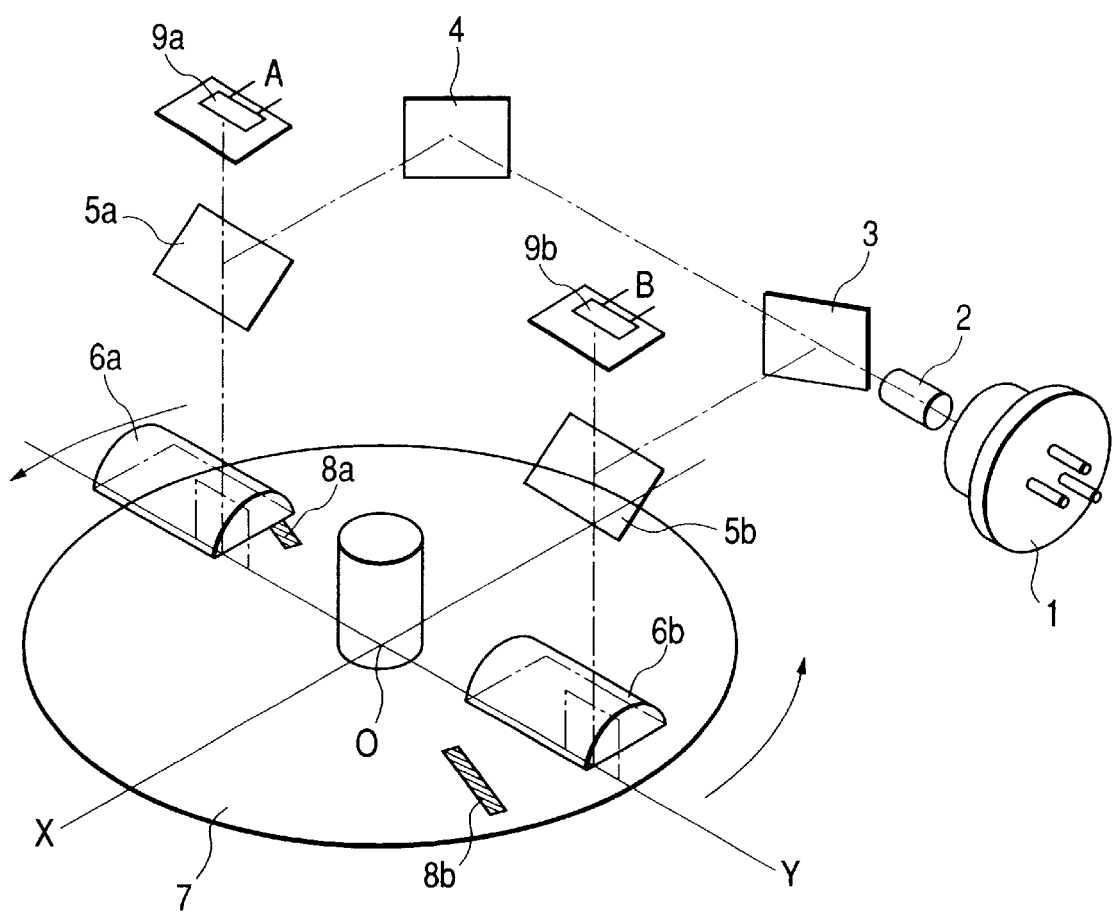
FIG. 1 is a perspective view of a rotary encoder according to the prior art.
Figure 55:
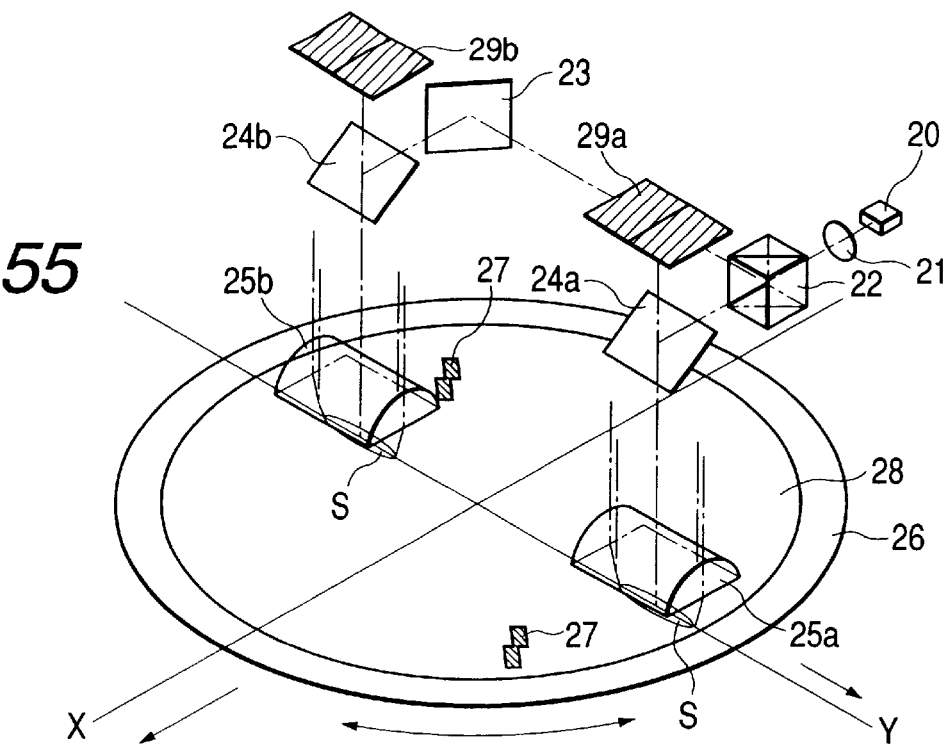
FIG. 55 is a perspective view of Embodiment 13.
Figure 56:
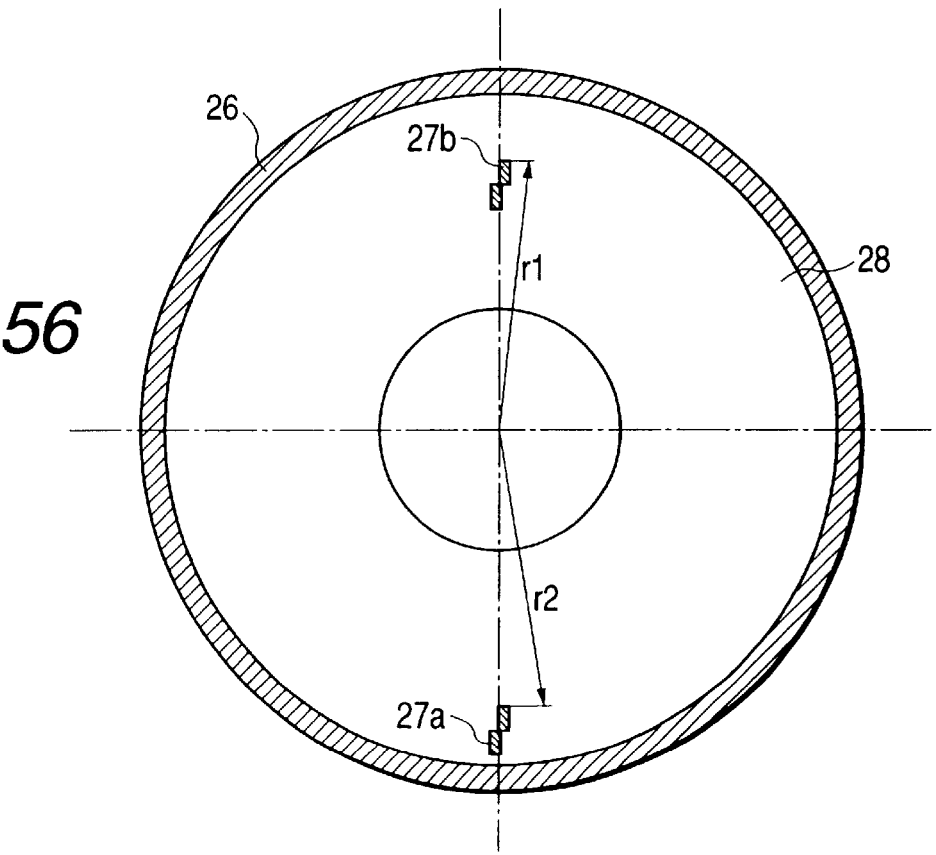
FIG. 56 is a plan view of a disc.

FIG. 55 is a perspective view of Embodiment 13 of the present invention, and FIG. 56 is a plan view of a disc. In the present embodiment, slits 27a and 27b for detecting the origin are disposed at different positions r2>r1 relative to the radial direction of a disc 28 and therefore, an origin signal is such that a signal of a pulse is outputted for one full rotation of the disc 28. An optical system for applying light beams to these slits 27a and 27b for detecting the origin is of a construction similar to that of FIG. 1, and as in Embodiment 12, four phase shift signals of Za1 phase, Za2 phase, Zb1 phase and Zb2 phase as shown in FIGS. 51A to 51C are obtained, and by taking the theoretical sum of the rectangular wave signal Z of an origin displacement signal as shown in FIG. 51B and the rectangular wave signal A of a rotational displacement signal B shown in FIG. 51C from these four origin position signals Za1, Za2, Zb1, Zb2, the synchronism between the rectangular wave signals Z and A can be taken.

Here, when the disc 28 deviates in the direction of the X-axis due to eccentricity or the like, two signals in a set move in just opposite directions as indicated by arrows as shown in FIG. 54A and therefore, the position of the point of intersection between signals determining the rising and falling of the origin signal is offset and comes not to fluctuate. Further, even if the disc 28 deviates in the direction of the Y-axis, the interval between the light beam and the slits 27a, 27b for detecting the origin does not change and therefore, the output timing of the signal does not change, and likewise the origin position signal is outputted with good accuracy, and it becomes easy to take the synchronism with the rotational displacement signal.

Figure 57:
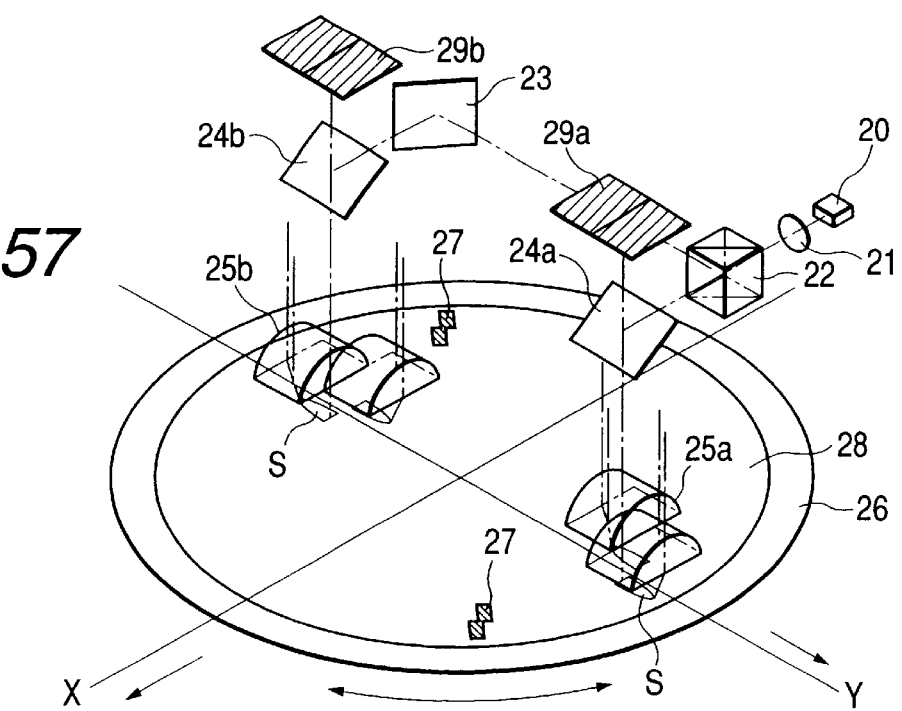
FIG. 57 is a perspective view of Embodiment 14.
Figure 58:
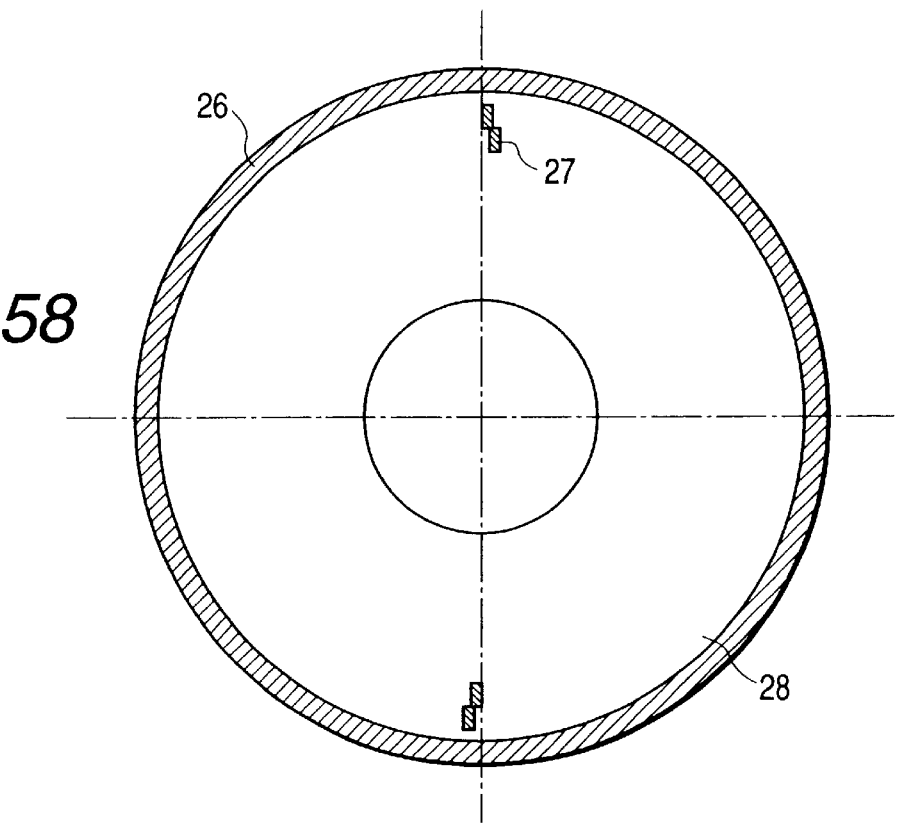
FIG. 58 is a plan view of a disc.

FIG. 57 is a perspective view of Embodiment 14 of the present invention, and FIG. 58 is a plan view of a disc. In the present embodiment, each of cylindrical lenses 25a and 25b is divided into two, and they are disposed with a distance L therebetween. The cylindrical lenses 25a and 25b may be two-division zone plates.

A light beam emitted from a light-emitting element 20 is made into a parallel light beam by a collimator lens 21, and enters a beam splitter 22. The light beam is divided into two there, and one light beam impinges on and is bent by a half mirror 24a, and is incident on a cylindrical lens 25a. The other light beam is bent by a mirror 23, is bent by a half mirror 24b, and is incident on a cylindrical lens 25b. The light beams which have entered the cylindrical lenses 25a and 25b are condensed in the same direction relative to slits 27 for detecting the origin, and become light beams S of which the condensed positions deviate by a distance L from each other, and are incident on a disc 28.

When the disc 28 is moved and the slits 27 for detecting the origin come to the applied positions of the light beams S, the light beams S are reflected by the slits 27, and the reflected light beams reversely return along the optical paths and enter light receiving sensors 29a and 29b, and an origin output is obtained. As shown in FIG. 58, the slits 27 for detecting the origin are each divided into two and are disposed with a deviation of an arbitrary length X and the length P of a period of the rotational displacement signal therebetween and therefore, when the light beams IS are applied to the slits 27, there are obtained four signals of Za1 phase, Za2 phase, Zb1 phase and Zb2 phase having phase shifts P, L−X and L+P−X as shown in FIG. 60A.

Figure 60A:
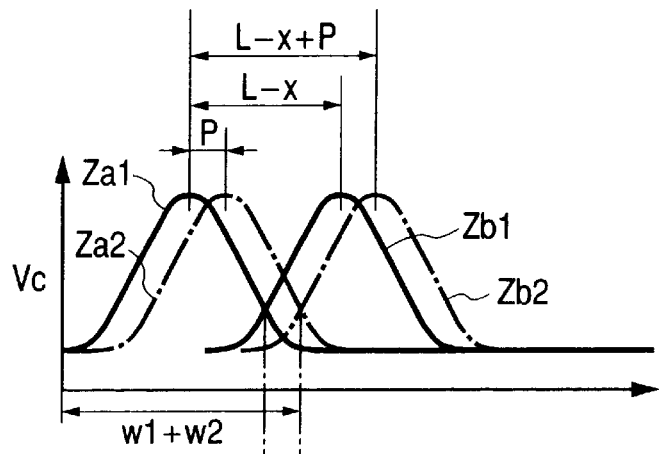
FIGS. 60A, 60B and 60C are graphs of output signals.
Figure 60B:
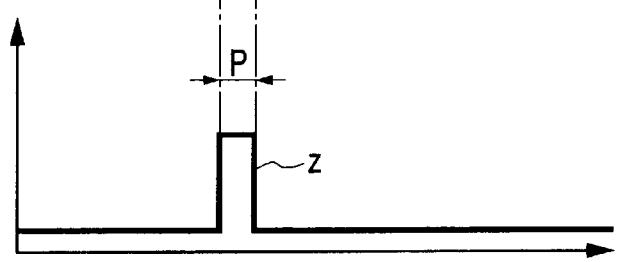
Figure 60C:
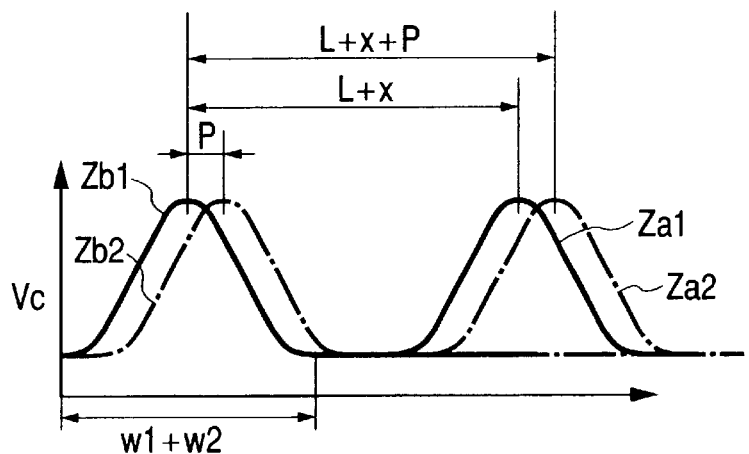

Here, when a rectangular wave origin signal is made by the use of the four origin position signals Za1, Za2, Zb1, Zb2, it becomes the Z signal of FIG. 60B of which the rectangular portion is P. By taking the theoretical sum by this origin position signal Z and the rectangular wave signal A of the rotational displacement signal, the synchronism between the rotational displacement signal and the origin signal can be taken. Further, when the disc 28 is rotated by 180° and comes to a position in which as shown in FIG. 60C, the light beam irradiates the upper mark, the intervals among the signal outputs of the origin position signals Za1, Za2, Zb1, Zb2 become P, L+X and L+X+P. At this time, the signals of Za1 phase and Zb1 phase and the signals of Za2 phase and Zb2 phase which determine the origin position do not intersect with each other and therefore, an origin rectangular wave signal is not outputted. That is, even if the marks 27 determining the position of the origin exist on the same radius of the disc 28, the irradiating light beam and the origin marks 27 are disposed with a deviation therebetween as shown in FIG. 58, whereby there can be constructed an optical system which puts out an origin output of a pulse when the disc 28 has made one full rotation.

Here, among the length L of the deviation of the condensed positions of the light beams, the amount of deviation X between the origin marks, the width W2 of the light beam and the width W1 of the marks, there is established the relation that L+X>W1+W2. Accordingly, it will be seen that if the width W2 of the light beam on the disc 28 is 8 μm and the width W1 of he marks is 16 μm and X is 6 μm, L must be 18 μm or greater.

Figure 59:
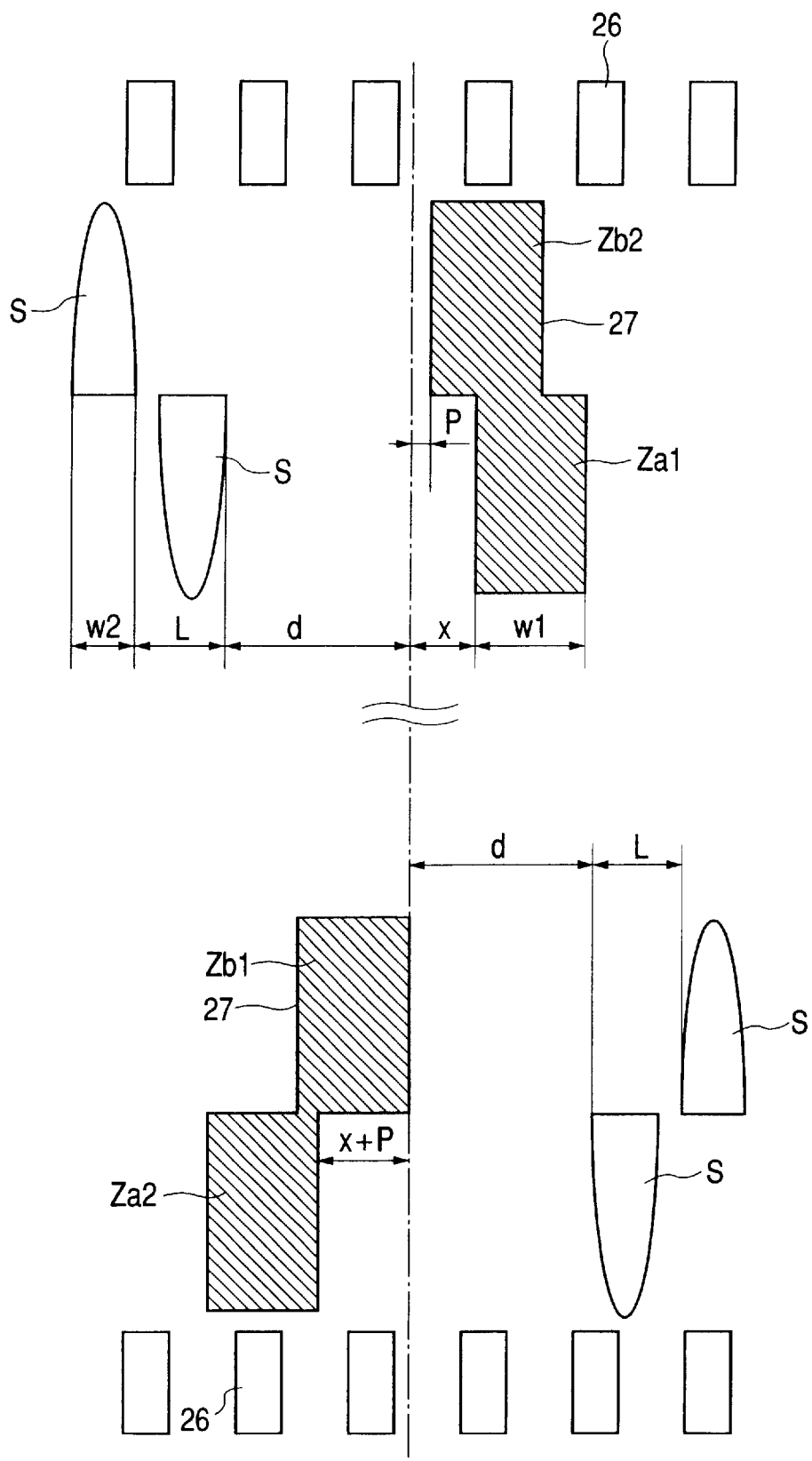
FIG. 59 is an illustration of slits for detecting the origin and gratings for a rotational displacement signal.

If the slits 27 for detecting the origin are disposed as shown in FIG. 59, the two marks Za1 and Zb1 for determining the position of the origin signal are disposed with a deviation of a distance L to X relative to the respective light beams, and the marks Za2 and Zb2 are also disposed with a deviation of L to X relative to the respective light beams, as shown in FIG. 60A. Since the marks Za1 and Za2 and the marks Zb1 and Zb2 are disposed with a deviation of P relative to a segment passing the center of the disc 28, the origin rectangular wave signal obtained is Z signal of which the rectangular portion is P.

If in FIG. 57, the disc deviates in the direction of the X-axis due to eccentricity or the like, Za2 phase and Zb1 phase are outputted with an advance of δ relative to the angle of rotation and Za1 phase and Zb phase are likewise outputted with a delay, as compared with the origin signal when the disc is not eccentric, as shown in FIGS. 54A to 54C, because the slits 27 which are the pair of the pair signals which determine the rising and falling of the rectangular signal are provided on the opposite sides of the disc 28. As the result, the two signals in a set move in just opposite directions and therefore, the position of the point of intersection between the signals which determine the rising or falling of the origin signal comes not to fluctuate, and a stable origin signal is obtained.

Also, even when the disc deviates in the direction of the Y-axis of FIG. 57, the interval d between the light beam of FIG. 58 and the slits 27 for detecting the origin does not vary and therefore, the timing at which, the signal comes out does not vary and a stable origin signal is outputted. Thereby, the origin position signal is outputted with good accuracy and it becomes easy to take synchronism with the rotational displacement signal.

Figure 61:
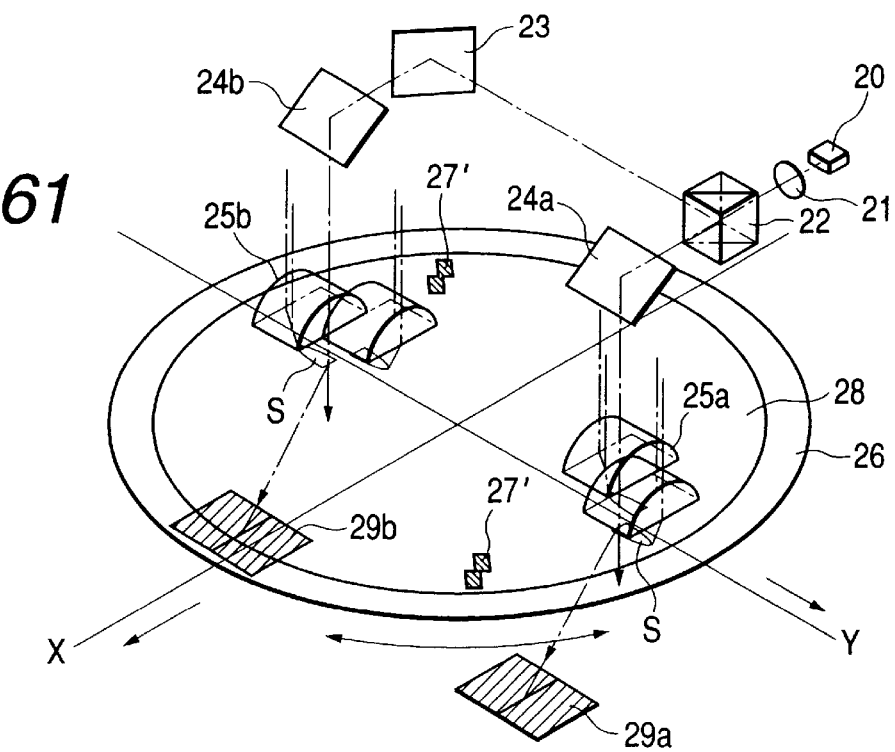
FIG. 61 is a perspective view of Embodiment 15.
Figure 62:
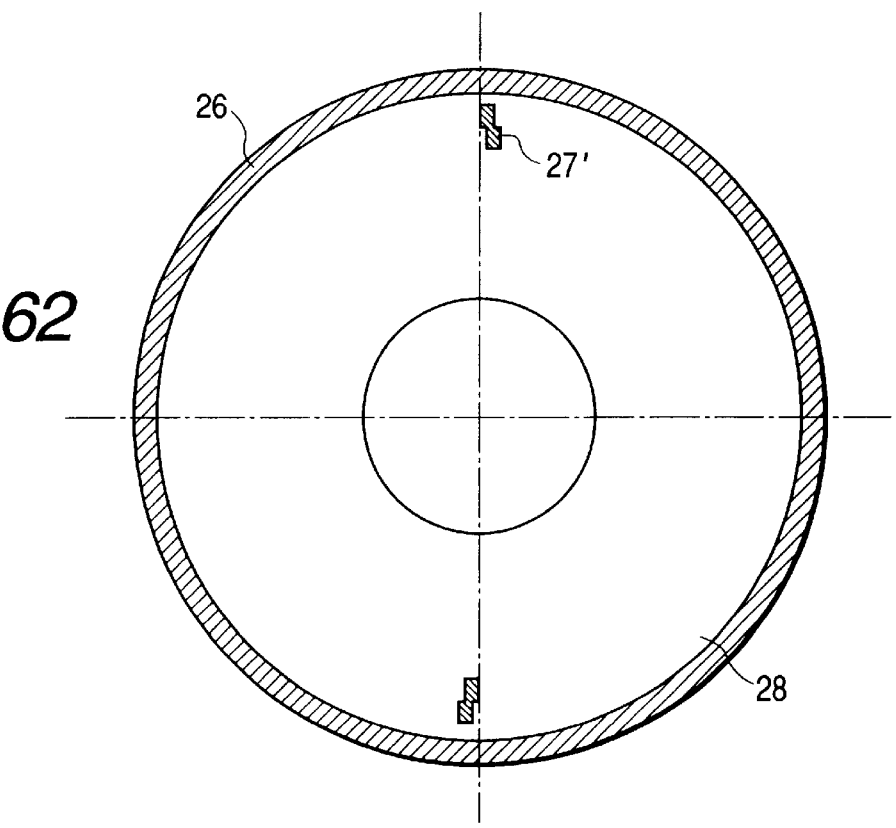
FIG. 62 is a plan view of a disc.

FIG. 61 is a perspective view of Embodiment 15 of the present invention, and FIG. 62 is a plan view of a disc. In the present embodiment, diffraction gratings 27' for detecting the origin are provided at two locations on the disc 28, and two-division sensors 29a and 29b are disposed on the side opposite to a light source 20 with respect to the disc 28. When the disc 28 is moved and the diffraction gratings 27' come to the applied positions of light beams, the light beams are diffracted and enter the two-division sensors 29a and 29b and an origin output is obtained. Accordingly, in the same manner as in Embodiment 14, the synchronism between the origin position signal and the rotational displacement signal can be taken.

As described above, phase gratings are used as the marks for detecting the origin provided on the disc 28, whereby the quantity of light for the detection of the origin is increased and an origin signal of a good SN ratio is obtained, and since only the gratings are formed on the disc 28, the manufacture of the disc becomes easy. Also, by making the pitch of the gratings into a desired value, the angles of diffracted light beams can be adjusted to thereby mitigate the influence of stray light.

While in the above-described embodiment, the rising and falling of the rectangular wave signal are determined from the position of intersection between the two detection signals, the rising and falling of the rectangular wave signal may be determined from the position of intersection between the respective detection signals of two marks disposed substantially symmetrically about the center of rotation and a slice level.

The rotary encoder described above can produce a signal having origin information which does not depend on the fluctuation in the mark detected position due to an error such as the eccentricity of the disc, and can effect the determination of the origin position of an accurate and minute width by the use of this signal. Also, since the construction is simple, assembly is easy and it becomes possible to achieve downsizing, and since the encoder is an origin detecting system which does not depend on the eccentricity of the disc, the incorporation of the disc becomes easy. Further, the origin signal is stably outputted irrespective of the eccentricity of the disc and therefore, the synchronism with the rotational displacement signal can be taken easily.

What is claimed is:
1. An optical encoder apparatus comprising:
a scale with a grating portion;
first light emitting means for irradiating said grating portion;
first light receiving means for detecting a light beam from said grating portion when a light beam from said light emitting means is projected onto said grating portion, an incremental signal being obtained by detection by said first light receiving means resulting from the displacement of said scale;
two or more mark portions formed on said scale;
second light emitting means for irradiating said two or more mark portions;
second light receiving means for detecting a light beam from said two or mark portions when a light beam from said second light emitting means is projected on said two or more mark portions, an origin signal being obtained by processing one or more detection signals detected by said second light receiving means in relation to the position of said scale; and
synchronized origin position signal producing means for producing a synchronized origin position signal by processing the incremental signal and the origin signal.
2. The apparatus of claim 1, wherein said origin signal has a pulse width substantially equal to the pulse width of a pulse of the incremental signal.
3. The apparatus of claim 1, wherein the logic sum of the original signal and the incremental signal is taken to produce the synchronized origin signal.
4. The apparatus of claim 1, wherein each of said mark portions for producing the origin signal has two or more marks deviated from each other by a predetermined distance, and said second light receiving means has two or more light receiving elements for independently detecting said two or more marks.
5. The apparatus of claim 4, wherein said two or more marks are provided to have positional deviation from each other relative to the direction of relative movement of said scale.
6. The apparatus of claim 5, wherein said second light emitting means projects light beams equally onto said two or more marks.
7. The apparatus of claim 6, wherein said two or more marks are two or more slit marks provided with their positions deviated from each other by a specific distance relative to the direction of relative movement of said scale, and a light beam of a slit-shaped illuminating area is applied to said slit marks.
8. The apparatus of claim 6, wherein said two or more marks are two or more diffraction lenses provided with their positions deviated from each other by a specific distance relative to the direction of relative movement of said scale, and a substantially parallel light beam is applied to said diffraction lenses.
9. The apparatus of claim 1, wherein said second light emitting means projects a plurality of light beams onto said mark portions for producing the origin signal, and said second light receiving means has a plurality of light receiving elements for independently detecting signals from respective ones of the plurality of light beams in conformity with the number of the light beams.
10. The apparatus of claim 9, wherein the plurality of light beams have a positional deviation therebetween relative to the direction of relative movement of said scale.
11. The apparatus of claim 10, wherein the amount of relative positional deviation between the plurality of light beams is adjustable.

12. The apparatus of claim 10, wherein the plurality of light beams form a slit-shaped illuminating area, and are applied to the slit-shaped marks of said mark portions for producing the origin signal.

13. The apparatus of claim 12, wherein said slit-shaped illuminating area is formed by a cylindrical lens.

14. The apparatus of claim 12, wherein said slit-shaped illuminating area is formed by a Fresnel lens.

15. The apparatus of claim 9, wherein the plurality of light beams are adapted to be applied equally to the marks of said mark portions for producing the origin signal.

16. The apparatus of claim 4, wherein said second light emitting means projects a plurality of light beams onto said mark portions for producing the origin signal, and said second light receiving means has a plurality of light receiving elements for independently detecting a predetermined number of signals created by the combination of said two or more marks and the plurality of light beams.

17. The apparatus of claim 16, wherein said two or more marks and the plurality of light beams are disposed with their positions deviated relative to the direction of relative movement of said scale.

18. The apparatus of claim 17, wherein the amount of relative positional deviation between the plurality of light beams is adjustable.

19. The apparatus of claim 16, wherein the plurality of light beams are adapted to be applied equally to said two or more marks.

20. The apparatus of claim 19, wherein said two or more marks are two or more slit marks provided with a deviation of a predetermined interval therebetween, and the plurality of light beams of a slit-shaped illuminating area are applied to said slit marks.

21. The apparatus of claim 20, wherein said slit-shaped illuminating area is formed by a cylindrical lens.

22. The apparatus of claim 20, wherein said slit-shaped illuminating area is formed by a Fresnel lens.

23. The apparatus of claim 5, wherein when the period of the grating of said scale for producing the incremental signal is P, said two or more mark portions are two slit marks between which the deviation is P/6, and said second light receiving means determines the rising of a signal providing the origin signal by the use of two detection signals produced from said two slit marks when a single light beam having a slit-shaped illuminating area is applied to said two slit marks.

24. The apparatus of claim 23, wherein each of said mark portions for producing the origin signal is comprised of a single slit, and when the period of the grating of said scale for producing the incremental signal is P, said second light receiving means applies to said slit light beams of two slit-shaped illuminating areas between which the deviation is P/6 and determines the rising of a signal providing the origin signal by the use of two detection signals produced from the two light beams.

25. The apparatus of claim 5, wherein when the period of the grating of said scale for producing the incremental signal is Pb, said two or more mark portions are two slit marks between which the deviation is X·Pb, said scale has two groups having an amount of deviation L with said two marks as a group, and said second light receiving means determines the rising and falling of a signal providing the origin signal by the use of the differential signal of four detection signals produced from said four slit marks when a single light beam having a slit-shaped illuminating area is applied to said four slit marks.

26. The apparatus of claim 25, wherein the amount of deviation X·Pb satisfies 0.5 Pb<X·Pb<1.5 Pb.

27. The apparatus of claim 17, wherein when the period of the grating of said scale for producing the incremental signal is Pb, said two or more mark portions are two slit marks between which the deviation is X·Pb, said scale has two groups having an amount of deviation L with said two marks as a group, and said synchronized origin position signal production means determines the rising and falling of a signal providing the origin signal by the use of the differential signal of four detection signals produced from said four slit marks when two light beams having slit-shaped illuminating areas deviated from each other by an amount of deviation δP are applied to said four slit marks so as to correspond to the respective groups.

28. The apparatus of claim 27, wherein the amount of deviation X·Pb satisfies 0.5 Pb<X·Pb<1.5 Pb.

29. The apparatus of claim 28, wherein the amount of deviation SP between the two light beams is adjustable.

30. The apparatus of claim 5, wherein when the period of the grating of said scale for producing the incremental signal is P, said two or more mark portions are two slit marks between which the deviation is P/6, said scale has two groups having an amount of deviation L with said two marks as a group, and said synchronized origin position signal producing means determines the rising and falling of a signal providing the origin signal by the use of the differential signal of four detection signals produced from said four slit marks when a single light beam having a slit-shaped illuminating area is applied to said four slit marks.

31. The apparatus of claim 1, wherein each of said mark portions for producing the origin signal is provided with a diffraction lens, and said synchronized origin position signal producing means applies a substantially parallel light beam to each of said diffraction lenses and detects each of two condensed light beams obtained from said two diffraction lenses by a two-division light receiving element, and determines the rising and falling of a signal providing the origin signal from the differential signal of said two-division light receiving elements.

32. The apparatus of claim 31, wherein the logic sum of the origin signal and the incremental signal is taken, whereby the origin signal is obtained.

33. The apparatus of claim 32, wherein said diffraction lenses are disposed with a deviation in the direction of relative movement of said scale.

34. The apparatus of claim 33, wherein said two sets of two-division light receiving elements constitute a four-division light receiving element.

35. The apparatus of claim 31, wherein the diffraction lenses on said scale are of a construction in which reflecting film is provided on phase grating structure.

36. The apparatus of claim 31, wherein the diffraction lenses on said scale have phase grating structure.

37. The apparatus of claim 1, wherein said scale is of a disc construction having a periodic grating for detecting rotational displacement, and said mark portions for producing the origin signal are provided at positions substantially symmetrical with respect to the center of said disc.

38. The apparatus of claim 37, wherein each of said mark portions for producing the origin signal has two or more marks deviated from each other by a predetermined distance in the direction of rotation.

39. The apparatus of claim 38, wherein said synchronized origin position signal producing means has light receiving elements for independently detecting respective ones of said two or more marks.

40. The apparatus of claim 37, wherein by said synchronized origin position signal producing means, two or more variation signals are obtained at a predetermined rotational position from respective ones of said mark portions for producing the origin signal, and of four or more variation signals obtained by the rotation of said disc, by the use of one or more signals outputted from each of said substantially symmetrical positions, the rising position or the falling position of at least one pulse signal indicative of the origin is determined.

41. The apparatus of claim 37, wherein a pulse signal indicative of the origin determined by two or more variation signals obtained from respective ones of said mark portions for producing the origin signal by said synchronized origin position signal producing means and at least one displacement measuring signal by said periodic grating are synchronized with each other.

42. The apparatus of claim 37, wherein said mark portions for producing the origin signal are line-symmetrical with respect to a segment passing the center of said disc, and are disposed with a deviation relative to the direction of rotation of said disc.

43. The apparatus of claim 42, wherein said second light receiving means is of a substantially straight line shape containing the center of said disc and light beam applying positions are disposed so as to sandwich the center therebetween.

44. The apparatus of claim 37, wherein said mark portions for producing the origin signal are disposed on the opposite sides of the center of said disc and with the radial positions of said disc made different from each other.

45. The apparatus of claim 37, wherein of four or more variation signals obtained from said two or more mark portions for producing the origin signal, by the use of two signals once intersecting with each other during one full rotation of said disc, the rising position or the falling position of at least one pulse signal indicative of the origin is determined.

46. The apparatus of claim 37, wherein said mark portions for producing the origin signal are provided with a diffraction grating for deflecting a light beam.

47. A scale for an encoder comprising:
   a scale substrate;
   a grating portion for producing an incremental signal provided on said scale substrate; and
   an origin signal producing portion provided on said scale substrate, said origin signal producing portion having a construction for producing four or more variation signals, for producing an origin signal, in a state differing by the displacement of said scale, wherein a synchronized origin signal is produced by synchronizing the incremental signal and the origin signal.

48. The scale of claim 47, wherein said scale substrate is of linear type.

49. The scale of claim 47, wherein said scale substrate is of rotary type.

50. An original encoder for optically reading the displacement of a scale, comprising:
   a light-emitting element;
   a light receiving element for detecting light from the scale when a light beam from said light-emitting element is projected onto the scale, an incremental signal resulting from displacement of the scale being obtained by detection by said light receiving element; and
   an origin detecting system, four or more variation signals for producing an origin signal being obtained by detecting operation for the scale by said origin detecting system,
   wherein a synchronized origin signal is produced by synchronizing the incremental signal and the origin signal.

51. An optical encoder apparatus comprising:
   a scale with a grating portion;
   first light emitting means for irradiating said grating portion;
   first light receiving means for detecting a light beam from said grating portion when a light beam from said light emitting means is projected onto said grating portion, an incremental signal being obtained by detection by said first light receiving means resulting from the displacement of said scale;
   two or more mark portions formed on said scale;
   second light emitting means for irradiating said two or more mark portions;
   second light receiving means for detecting a light beam from said two or mark portions when a light beam from said second light emitting means is projected on said two or more mark portions, an origin signal being obtained by processing one or more detection signals detected by said second light receiving means in relation to the position of said scale; and
   synchronized origin position signal producing means for producing a synchronized origin position signal by processing the incremental signal and the origin signal,
   wherein the origin signal has a pulse width substantially equal to the pulse width of a pulse of the incremental signal.

52. The apparatus of claim 51, wherein the origin signal is obtained by the logic sum of the two or more detection signals and the incremental signal.

53. The apparatus of claim 51, wherein two or more detection signals are obtained from respective ones of said mark portions for producing the origin signal.

54. An optical rotary encoder apparatus comprising:
   a disc scale with a grating portion;
   first light emitting means for irradiating said grating portion;
   first light receiving means for detecting a light beam from said grating portion when a light beam from said light emitting means is projected onto said grating portion, an incremental signal being obtained by detection by said first light receiving means resulting from the displacement of said disc scale;
   two or more mark portions formed at portions substantially symmetrical with respect to the center of a disc on said disc scale;
   second light emitting means for irradiating said two or more mark portions;
   second light receiving means for detecting a light beam from said two or mark portions when a light beam from said second light emitting means is projected on said two or more mark portions, an origin signal being obtained by processing one or more detection signals detected by said second light receiving means in relation to the position of said disc scale; and
   synchronized origin position signal producing means for producing a synchronized origin position signal by processing the incremental signal and the origin signal.

55. The apparatus of claim 54, wherein each of said mark portions for producing the origin signal is formed with two marks deviated from each other in the direction of rotation.

* * * * *

UNITED STATES PATENT AND TRADEMARK OFFICE
CERTIFICATE OF CORRECTION

PATENT NO. : 6,674,066 B1
DATED : January 6, 2004
INVENTOR(S) : Yasushi Kaneda et al.

It is certified that error appears in the above-identified patent and that said Letters Patent is hereby corrected as shown below:

Column 5,
Line 3, "is" should read -- in --.

Column 7,
Lines 46, 49 amd 58, "shifted" should read -- shifted toward --.

Column 9,
Line 32, "need" should read -- needs to --.

Column 10,
Line 6, "Sc" should read -- 5c --.

Column 12,
Line 34, "equal" should read -- equally --.

Column 13,
Line 5, "original" should read -- origin --;
Line 38, "the 5e" should read -- the slit 5e --;
Line 57, "embodiment 8 is" should read -- Embodiment 8 is the --;
Line 58, "embodiment 2." should read -- Embodiment 2, --; and
Line 59, "embodiment 8," should read -- Embodiment 8, --;

Column 17,
Line 44, "lens 6PD" should read -- lens 5PD --.

Column 18,
Line 23, "element" should read -- elements --;
Line 41, "origin" should read -- Origin --; and
Line 67, "signal" should read -- signals --.

Column 20,
Line 20, "IS" should read -- S --; and
Line 52, "he" should read -- the --.

Column 21,
Line 17, "which," should read -- which --.

UNITED STATES PATENT AND TRADEMARK OFFICE
CERTIFICATE OF CORRECTION

PATENT NO. : 6,674,066 B1
DATED : January 6, 2004
INVENTOR(S) : Yasushi Kaneda et al.

It is certified that error appears in the above-identified patent and that said Letters Patent is hereby corrected as shown below:

Column 22,
Line 15, "two or" should read -- two or more --.

Column 26,
Lines 19 and 54, "two or" should read -- two or more --.

Signed and Sealed this

Fifth Day of October, 2004

JON W. DUDAS
*Director of the United States Patent and Trademark Office*